United States Patent
Abraham et al.

(10) Patent No.: US 10,524,278 B2
(45) Date of Patent: Dec. 31, 2019

(54) SCHEDULING AND TOKEN BUCKET FOR COMMUNICATION CO-EXISTENCE

(71) Applicant: QUALCOMM Incorporated, San Diego, CA (US)

(72) Inventors: Santosh Abraham, San Diego, CA (US); Naga Bhushan, San Diego, CA (US); Jing Jiang, San Diego, CA (US); Tingfang Ji, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/769,730

(22) PCT Filed: Nov. 18, 2016

(86) PCT No.: PCT/US2016/062898
§ 371 (c)(1),
(2) Date: Apr. 19, 2018

(87) PCT Pub. No.: WO2017/087877
PCT Pub. Date: May 26, 2017

(65) Prior Publication Data
US 2018/0324827 A1 Nov. 8, 2018

Related U.S. Application Data

(63) Continuation-in-part of application No. 15/194,320, filed on Jun. 27, 2016, now Pat. No. 10,009,912.
(Continued)

(51) Int. Cl.
H04W 72/00 (2009.01)
H04W 72/12 (2009.01)
(Continued)

(52) U.S. Cl.
CPC ....... *H04W 72/1215* (2013.01); *H04L 47/215* (2013.01); *H04W 74/0816* (2013.01); *H04W 88/06* (2013.01); *H04W 88/10* (2013.01)

(58) Field of Classification Search
CPC .......... H04W 72/1215; H04W 74/0816; H04L 47/215
(Continued)

(56) References Cited

U.S. PATENT DOCUMENTS 5,136,582 A   8/1992   Firoozmand
9,107,126 B2  8/2015   Elsherif et al.
(Continued)

FOREIGN PATENT DOCUMENTS

CN   103477684 A   12/2013
CN   103843439 A   6/2014
(Continued)

OTHER PUBLICATIONS

Taiwan Search Report—TW105137836—TIPO—dated Sep. 21, 2018.
(Continued)

*Primary Examiner* — Marcos Batista
(74) *Attorney, Agent, or Firm* — Loza & Loza, LLP

(57) ABSTRACT

The disclosure relates in some aspects to a scheduling and token bucket scheme for co-existence of different radio access technologies on a communication resource. In some aspects, the scheme may avoid traffic collisions on the resource and promotes access fairness on the resource.

28 Claims, 31 Drawing Sheets

Related U.S. Application Data

(60) Provisional application No. 62/258,363, filed on Nov. 20, 2015.

(51) Int. Cl.
  *H04L 12/819* (2013.01)
  *H04W 74/08* (2009.01)
  *H04W 88/10* (2009.01)
  *H04W 88/06* (2009.01)

(58) Field of Classification Search
  USPC .................................... 455/452.1; 370/338
  See application file for complete search history.

(56) References Cited

U.S. PATENT DOCUMENTS

| | | | |
|---|---|---|---|
| 9,210,717 | B2 | 12/2015 | Nguyen et al. |
| 2010/0293275 | A1 | 11/2010 | Rezaiifar et al. |
| 2011/0286408 | A1 | 11/2011 | Flore et al. |
| 2012/0051216 | A1 | 3/2012 | Zhang et al. |
| 2012/0140743 | A1 | 6/2012 | Pelletier et al. |
| 2013/0235852 | A1 | 9/2013 | Segev et al. |
| 2013/0286842 | A1* | 10/2013 | Nakatsugawa ....... H04L 47/125 370/235 |
| 2015/0063323 | A1 | 3/2015 | Sadek et al. |
| 2015/0085684 | A1 | 3/2015 | Sadek |
| 2015/0208413 | A1 | 7/2015 | Takano |
| 2015/0215100 | A1 | 7/2015 | Jeon et al. |
| 2015/0223244 | A1 | 8/2015 | Tabet et al. |
| 2015/0312793 | A1 | 10/2015 | Jeon et al. |
| 2017/0026295 | A1* | 1/2017 | Yin .................... H04L 43/0894 |
| 2017/0150513 | A1 | 5/2017 | Abraham et al. |

FOREIGN PATENT DOCUMENTS

| | | |
|---|---|---|
| KR | 20140010450 A | 1/2014 |
| TW | 201347584 A | 11/2013 |
| WO | 2014078076 | 5/2014 |
| WO | 2015034944 A1 | 3/2015 |

OTHER PUBLICATIONS

3GPP TSG-RAN2., "Complexity Aspects of UE Based Solution," Discussion and Decision, Meeting #56bls, Tdoc R2-070296, Jan. 15-19, 2007, pp. 1-3, XP050133384 [retrieved on Jan. 12, 2007].
International Search Report and Written Opinion—PCT/US2016/062898—ISA/EPO—dated Apr. 19, 2017.
Partial International Search Report—PCT/US2016/062898—ISA/EPO—dated Feb. 28, 2017.

* cited by examiner

SCHEDULING AND TOKEN BUCKET FOR COMMUNICATION CO-EXISTENCE

CROSS-REFERENCE TO RELATED APPLICATION(S)

This application claims priority to and the benefit of Provisional Application No. 62/258,363 filed in the U.S. Patent and Trademark Office on Nov. 20, 2015, and Non-Provisional application Ser. No. 15/194,320 filed in the U.S. Patent and Trademark Office on Jun. 27, 2016, the entire contents of each of which are incorporated herein by reference.

INTRODUCTION

Aspects of the present disclosure relate generally to wireless communication and more particularly, but not exclusively, to co-existence techniques for a communication resource.

Wireless communication networks are widely deployed to provide various communication services such as telephony, video, data, messaging, broadcasts, and so on. Such networks, which are usually multiple access networks, support communication for multiple users by sharing the available network resources.

As the demand for mobile broadband access continues to increase, research and development continue to advance wireless communication technologies not only to meet the growing demand for mobile broadband access, but to advance and enhance the user experience.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: communicate on a first radio frequency (RF) band, wherein the communication on the first RF band uses a first type of radio access technology (RAT); determine, at a time based on a token arrival time, whether a second RF band is available for communication, wherein the determination includes monitoring the second RF band using a second type of RAT; reserve the second RF band for communication of an access block if the determination indicates that the second RF band is available, wherein the reservation includes sending a first reservation signal using the second type of RAT; and communicate on the second RF band during the access block using the first type of RAT as a result of the reservation.

Another aspect of the disclosure provides a method for communication including: communicating on a first radio frequency (RF) band, wherein the communication on the first RF band uses a first type of radio access technology (RAT); determining, at a time based on a token arrival time, whether a second RF band is available for communication, wherein the determination includes monitoring the second RF band using a second type of RAT; reserving the second RF band for communication of an access block if the determination indicates that the second RF band is available, wherein the reservation includes sending a first reservation signal using the second type of RAT; and communicating on the second RF band during the access block using the first type of RAT as a result of the reservation.

Another aspect of the disclosure provides an apparatus configured for communication. The apparatus including: means for communicating on a first radio frequency (RF) band, wherein the communication on the first RF band uses a first type of radio access technology (RAT); means for determining, at a time based on a token arrival time, whether a second RF band is available for communication, wherein the determination includes monitoring the second RF band using a second type of RAT; and means for reserving the second RF band for communication of an access block if the determination indicates that the second RF band is available, wherein the reservation includes sending a first reservation signal using the second type of RAT; wherein the means for communicating is configured to communicate on the second RF band during the access block using the first type of RAT as a result of the reservation.

Another aspect of the disclosure provides a non-transitory computer-readable medium storing computer-executable code, including code to: communicate on a first radio frequency (RF) band, wherein the communication on the first RF band uses a first type of radio access technology (RAT); determine, at a time based on a token arrival time, whether a second RF band is available for communication, wherein the determination includes monitoring the second RF band using a second type of RAT; reserve the second RF band for communication of an access block if the determination indicates that the second RF band is available, wherein the reservation includes sending a first reservation signal using the second type of RAT; and communicate on the second RF band during the access block using the first type of RAT as a result of the reservation.

In one aspect, the disclosure provides an apparatus configured for communication that includes a memory and a processor coupled to the memory. The processor and the memory are configured to: communicate on a first radio frequency (RF) band, wherein the communication on the first RF band uses a first type of radio access technology (RAT); receive a communication schedule and token bucket information; monitor, at a time based on the token bucket information, for a signal on a second RF band; and communicate on the second RF band during the access block according to the communication schedule if the signal is detected by the monitoring, wherein the communication on the second RF band uses the first type of RAT.

Another aspect of the disclosure provides a method for communication including: communicating on a first radio frequency (RF) band, wherein the communication on the first RF band uses a first type of radio access technology (RAT); receiving a communication schedule and token bucket information; monitoring, at a time based on the token bucket information, for a signal on a second RF band; and communicating on the second RF band during the access block according to the communication schedule if the signal is detected by the monitoring, wherein the communication on the second RF band uses the first type of RAT.

Another aspect of the disclosure provides an apparatus configured for communication. The apparatus including: means for communicating on a first radio frequency (RF) band, wherein the communication on the first RF band uses a first type of radio access technology (RAT); means for receiving a communication schedule and token bucket information; and means for monitoring, at a time based on the token bucket information, for a signal on a second RF band, wherein the means for communicating is configured to communicate on the second RF band during the access block according to the communication schedule if the signal is detected by the monitoring, and wherein the communication on the second RF band uses the first type of RAT.

Another aspect of the disclosure provides a non-transitory computer-readable medium storing computer-executable code, including code to: communicate on a first radio frequency (RF) band, wherein the communication on the first RF band uses a first type of radio access technology (RAT); receive a communication schedule and token bucket information; monitor, at a time based on the token bucket information, for a signal on a second RF band; and communicate on the second RF band during the access block according to the communication schedule if the signal is detected by the monitoring, wherein the communication on the second RF band uses the first type of RAT.

In one aspect, the disclosure provides an apparatus configured for communication that includes a memory and a processor coupled to the memory. The processor and the memory are configured to: determine at least one parameter for a token bucket; send the at least one parameter to another apparatus; and determine, based on the at least one parameter, whether to communicate with the other apparatus via a radio frequency (RF) band.

Another aspect of the disclosure provides a method for communication including: determining at least one parameter for a token bucket; sending the at least one parameter to another apparatus; and determining, based on the at least one parameter, whether to communicate with the other apparatus via a radio frequency (RF) band.

Another aspect of the disclosure provides an apparatus configured for communication. The apparatus including: means for determining at least one parameter for a token bucket; means for sending the at least one parameter to another apparatus; and means for determining, based on the at least one parameter, whether to communicate with the other apparatus via a radio frequency (RF) band.

Another aspect of the disclosure provides a non-transitory computer-readable medium storing computer-executable code, including code to: determine at least one parameter for a token bucket; send the at least one parameter to another apparatus; and determine, based on the at least one parameter, whether to communicate with the other apparatus via a radio frequency (RF) band.

In one aspect, the disclosure provides an apparatus configured for communication that includes a memory and a processor coupled to the memory. The processor and the memory are configured to: receive at least one parameter for a token bucket from another apparatus that uses the token bucket to access a radio frequency (RF) band; and determine, based on the at least one parameter, whether to communicate with the other apparatus via the RF band.

Another aspect of the disclosure provides a method for communication including: receiving at least one parameter for a token bucket from another apparatus that uses the token bucket to access a radio frequency (RF) band; and determining, based on the at least one parameter, whether to communicate with the other apparatus via the RF band.

Another aspect of the disclosure provides an apparatus configured for communication. The apparatus including: means for receiving at least one parameter for a token bucket from another apparatus that uses the token bucket to access a radio frequency (RF) band; and means for determining, based on the at least one parameter, whether to communicate with the other apparatus via the RF band.

Another aspect of the disclosure provides a non-transitory computer-readable medium storing computer-executable code, including code to: receive at least one parameter for a token bucket from another apparatus that uses the token bucket to access a radio frequency (RF) band; and determine, based on the at least one parameter, whether to communicate with the other apparatus via the RF band.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
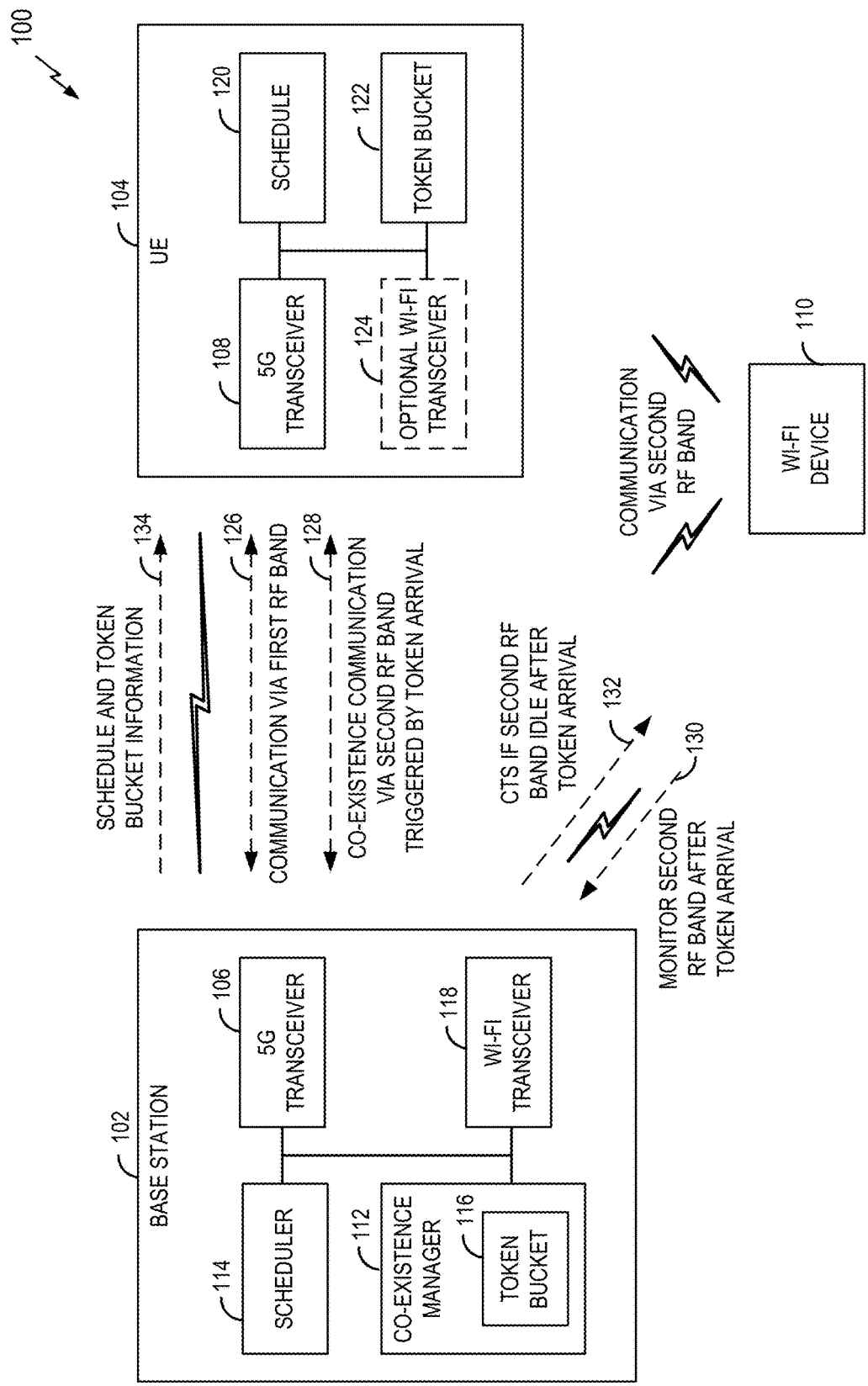
FIG. 1 is a block diagram illustrating an example of a scheduling and token bucket scheme in accordance with some aspects of the disclosure.

The disclosure relates in some aspects to a scheduling and token bucket scheme for co-existence of different radio access technologies on a communication resource. The industrial, scientific, and medical radio band (ISM band) and the unlicensed national information infrastructure radio band (U-NII band) are candidates for $5^{th}$ Generation (5G) radio access technologies. Current users in these RF bands typically use Wi-Fi radio access technology, with an ever growing share of the number of devices in this band. For 5G technology to effectively operate in these RF bands, 5G operation may incorporate mechanisms to avoid collisions with Wi-Fi traffic and to ensure fairness among users of each RF band as taught herein. For example, Wi-Fi traffic error recovery uses a re-transmission scheme, while rate adaptation in Wi-Fi algorithms responds to errors by reducing the physical (PHY) layer signaling rate. Thus, a 5G solution that leads to collisions with Wi-Fi could result in lower medium (e.g., RF band) availability for 5G communication.

The disclosure relates in some aspects to token bucket-based access techniques and frame structures for effective co-existence of an infra-structure-like network (e.g., a 5G network, as opposed to a peer-to-peer network) with a wireless local area network (WLAN) such as a Wi-Fi network. For example, a device may use these techniques to access a 20 MHz band (or some other bandwidth) within an 80 MHz unlicensed band that is typically used by Wi-Fi devices. These techniques are also applicable to other types of radio access technologies (e.g., 3G, 4G, WiMax, and so on).

In some aspects, the token bucket is used to moderate the amount of time that 5G communication is used on a medium that is shared with devices that use another RAT (e.g., Wi-Fi). For example, a first device (e.g., a base station) may use the token bucket to ensure that the first device's 5G communication with a second device (e.g., a user equipment) uses the medium on a periodic basis, rather than a continual basis. To this end, token bucket parameters are shared between the devices so that the second device will know the token arrival times at the first device. Thus, the devices can, in synchronization, commence 5G communication (e.g., wake up) based on the token arrival times. Moreover, a device can use the token bucket to accumulate authorization to access the medium when the device is not actively using the medium. Thus, a device can access the medium more often during those times when the device actually needs to use the medium.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

FIG. 1 illustrates an example of a communication system 100 that supports communication co-existence in accordance with the teachings herein. The communication system 100 includes a base station 102 that communicates 126 with a user equipment (UE) 104 via a first radio frequency (RF) band. Typically, the communication system 100 will include other wireless communication devices (e.g., other base stations and UEs). To reduce the complexity of FIG. 1, however, only one base station and one UE are shown.

The base station 102 includes a 5G transceiver 106 and the UE 104 includes a 5G transceiver 108 for the communication 126 via the first RF band (and optionally other RF bands). As discussed below, each transceiver may include PHY layer functionality and media access control (MAC) layer functionality. In accordance with the teachings herein, the base station 102 and the UE 104 may also communicate 128 via a second RF band that is being used by a Wi-Fi device 110. To this end, the base station 102 includes a co-existence manager 112, a scheduler 114, and a token bucket 116 that collectively avoid collisions and ensure access fairness on the second RF band.

The first and second RF bands might or might not overlap. In some scenarios, the second RF band does not overlap with the first RF band. In some scenarios, the second RF band partially overlaps with the first RF band. In some scenarios, the second RF band is entirely within the first RF band. In some scenarios, the first RF band is entirely within the second RF band.

The base station 102 uses the token bucket 116 to ensure access fairness, for example, by limiting access to the second RF band according to a token arrival rate. Once a token arrives (e.g., is added to the token bucket 116), the co-existence manager 112 may monitor 130 the second RF band (e.g., using a Wi-Fi transceiver 118) to determine whether the second RF band is idle. If so, the co-existence manager 112 causes a clear-to-send (CTS) or some other suitable type of signal to be sent 132 over the second RF band (e.g., using the Wi-Fi transceiver 118) to reserve the second RF band for 5G communication. If the base station 102 ends up using the second RF band (e.g., during a scheduled access block), a token is deleted from the token bucket. If the base station 102 does not end up using the second RF band during the access block (e.g., the second RF band is not idle), a token is not deleted from the token bucket. Thus, tokens may be accumulated at the base station 102, up to a maximum token limit.

The scheduler 114 defines the schedule to be used by the base station 102 and the UE 104 for 5G communication on the second RF band. In one aspect, relatively short frames are scheduled (e.g., for an access block) to ensure that Wi-Fi devices (e.g., including the Wi-Fi device 110) have adequate access to the second RF band.

The base station 102 sends its schedule and token bucket information 134 to the UE 104. For example, the base station 102 may send this information via a control channel such as a physical downlink control channel (PDCCH) or via some other suitable signaling technique. The schedule and token bucket information 134 may include, for example, an indication of the specific time slots that are scheduled for 5G communication on the second RF band as well as token bucket parameters (e.g., token arrival rate, maximum number of tokens, etc.).

Thus, the UE 104 maintains its own instance of a schedule 120 for 5G communication on the second RF band and its own instance of a token bucket 122 (e.g., that mirrors the token bucket 116). This enables the UE 104 to monitor the second RF band at the times the base station 102 is expected to commence 5G communication on the second RF band. For example, at a defined token arrival time (e.g., as defined by the schedule 120 and/or the parameters of the token bucket 122), the UE 104 may switch its 5G communication from the first RF band (or wake from a low power state) to communicate via the second RF band. The UE 104 may confirm that a 5G communication from the base station 102 is beginning during a scheduled access block on the second RF band upon receipt of a downlink signal from the base station 102. If the UE 104 detects a downlink signal, the UE 104 proceeds with the 5G communication and deletes a token from the token bucket 122. If the UE 104 does not detect a downlink signal, the UE 104 does not delete a token from the token bucket 122 and may go back to sleep until the next token arrival time. In some implementations, the UE 104 may include a Wi-Fi transceiver 124 for monitoring the second RF band to determine whether the second RF band is clear (or sufficiently clear for 5G communication) in the vicinity of the UE 104.

Figure 2:
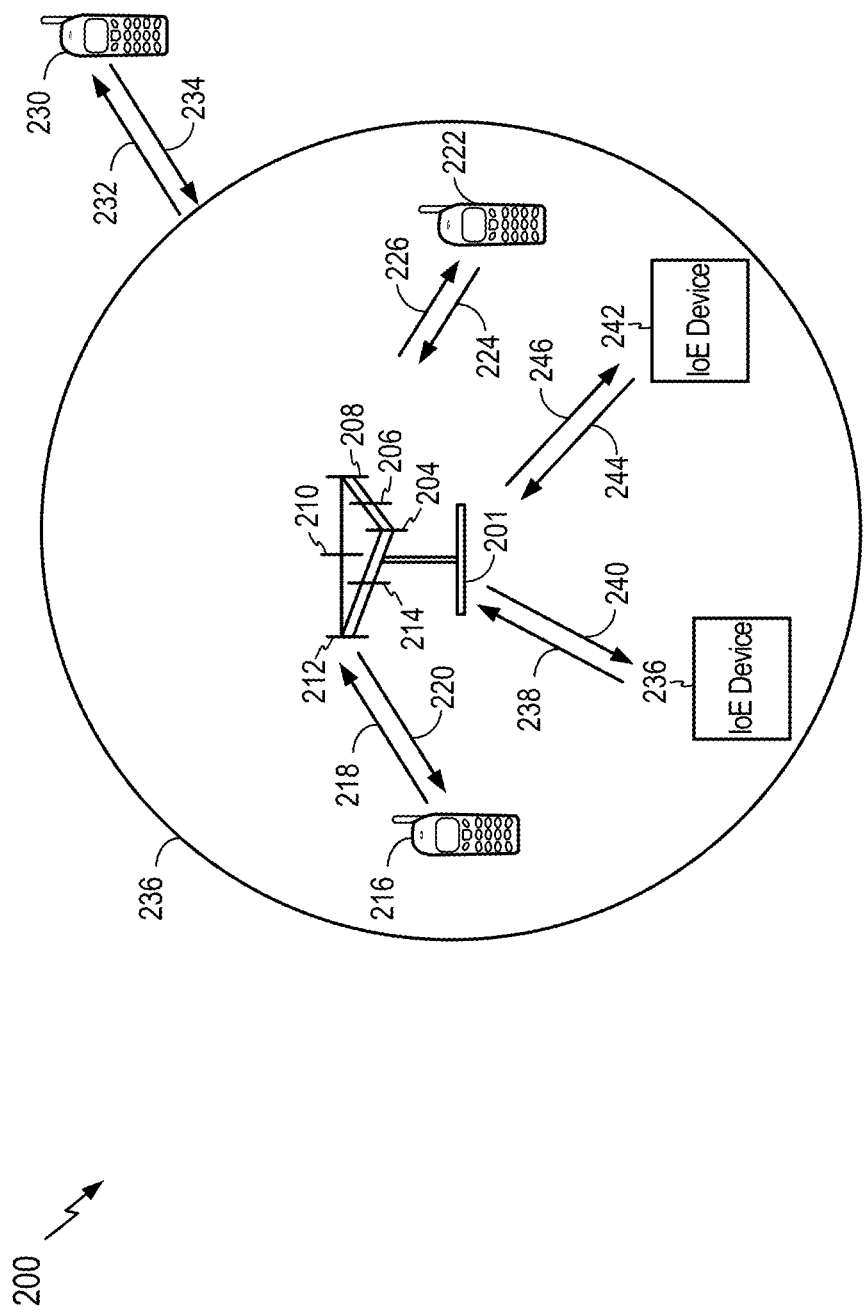
FIG. 2 is a diagram illustrating an example of a multiple access wireless communication system within which aspects of the disclosure may find application.

FIG. 2 illustrates an example of a communication network 200 in which aspects of the present disclosure may be performed. For purposes of illustration, the communication network 200 is shown as including a base station (BS) 201 and several wireless communication nodes. It should be appreciated that the communication network 200 would typically include other devices as well (e.g., one or more of: other base stations, other wireless communication nodes, or network entities). Each base station may correspond to, for example, the base station 102 of FIG. 1. Each wireless communication node may correspond to, for example, the UE 104 of FIG. 1.

A base station may include one or more antennas. In the example of FIG. 2, the base station 201 includes multiple antenna groups, one group including antennas 204 and 206, another group including antennas 208 and 210, and an additional group including antennas 212 and 214. In FIG. 2, two antennas are shown for each antenna group, however, more or fewer antennas could be utilized for each antenna group.

The base station 201 communicates with one or more wireless communication nodes via these antennas. A wireless communication node 216 may be in communication with the antennas 212 and 214, where the antennas 212 and 214 transmit information to the wireless node 216 over a forward link 220 and receive information from the wireless communication node 216 over a reverse link 218. A wireless communication node 222 may be in communication with the antennas 204 and 206, where the antennas 204 and 206 transmit information to the wireless communication node 222 over a forward link 226 and receive information from the wireless communication node 222 over a reverse link 224.

The base station 201 may also be in communication with other wireless communication nodes, which may be, for example, Internet-of-Everything (IoE) devices. An IoE device 236 may be in communication with one or more other antennas of the base station 201, where the antennas transmit information to the IoE device 236 over a forward link 240 and receive information from the IoE device 236 over a reverse link 238. An IoE device 242 may be in communication with one or more other antennas of the base station 201, where the antennas transmit information to the IoE device 242 over a forward link 246 and receive information from the IoE device 242 over a reverse link 244.

In a Frequency Division Duplex (FDD) system, the communication links 218, 220, 224, 226, 238, 240, 244, and 246 may use different frequencies for communication. For example, the forward link 220 may use a different frequency than that used by the reverse link 218, and the forward link 240 may use a different frequency than that used by the reverse link 238.

The various concepts presented throughout this disclosure may be implemented across a broad variety of telecommunication systems, network architectures, and communication standards. For example, the Third Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc.

5G with Wi-Fi Co-Existence

Figure 3:
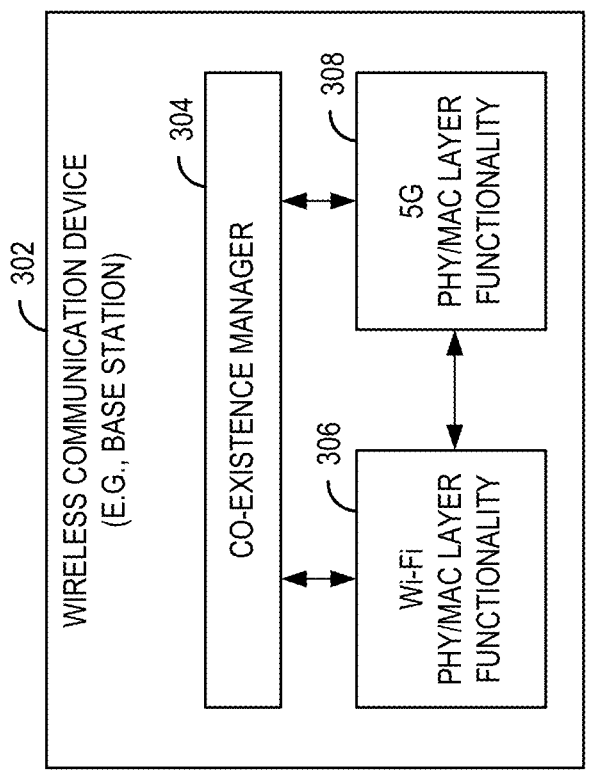
FIG. 3 is a block diagram conceptually illustrating an example of a wireless communication device supporting co-existence in accordance with some aspects of the disclosure.

Examples of co-existence access techniques for wireless communication devices (e.g., a base station and a UE) will now be described with reference to FIGS. 3-15. FIG. 3 illustrates an example of a wireless communication device 302 that includes a co-existence manager 304 that manages co-existence on a communication medium (e.g., on one or more RF bands). The wireless communication device 302 also includes Wi-Fi PHY/MAC layer functionality 306 and 5G PHY/MAC layer functionality 308, each of which is capable of transmitting and/or receiving signals according to the corresponding radio access technology. The wireless communication device 302 may correspond to, for example, the base station 102 of FIG. 1.

A UE (not shown) may operate as a subordinate device (e.g., a schedule device) to the wireless communication device 302 (e.g., a scheduling device) in this example. For example, a UE might only transmit when scheduled by the wireless communication device 302. Thus, in some implementations, the UE does not monitor the state of the unlicensed medium to be used for 5G communication.

The co-existence manager 304 may initiate a sub-frame sequence for 5G communication on a medium that is being (or may be) used by Wi-Fi devices. In one example, each sub-frame is 0.5 milliseconds (ms). To ensure fairness on the channel, only a subset of the number of sub-frames that could be used on the channel is utilized for 5G communication. For example, the number of contiguous sub-frames used for 5G could be limited to ten sub-frames or some other suitable number. This helps to ensure that the medium is not blocked for too long of a period of time (e.g., no longer than 5 ms).

A token bucket-based access technique that may be used by a base station (e.g., the wireless communication device 302 of FIG. 3) to control communication on the next scheduled access block of sub-frames (or slots) will now be described with reference to FIG. 4. In some aspects, this technique may allow for UEs (e.g., stations, STAs) to wake up close to (e.g., shortly before) the scheduled block of sub-frames.

Each base station may be configured with the following token bucket information: a token fill rate and a maximum number of tokens. For each token in the token bucket, a device (e.g., a base station or a UE) is allowed to access the medium during an access block (e.g., a 5 ms block) that occurs at the time of availability of the token (e.g., the token arrival time).

As discussed above, every UE served by a particular base station may be provided with that base station's token bucket parameters. Accordingly, a UE will know the token arrival time for the base station and can therefore determine the exact time that the base station has a token. Thus, a UE may elect to wake up from a low power (e.g., sleep) mode at the time the UE determines that the base station has a token.

Tokens may accumulate in a token bucket. For example, a base station may accumulate a token for every block of time the base station does not utilize (e.g., due to lack of traffic to send or due to traffic on the channel). The number of tokens accumulated in the token bucket can be controlled to ensure that the number does not exceed a maximum number.

Figure 4:
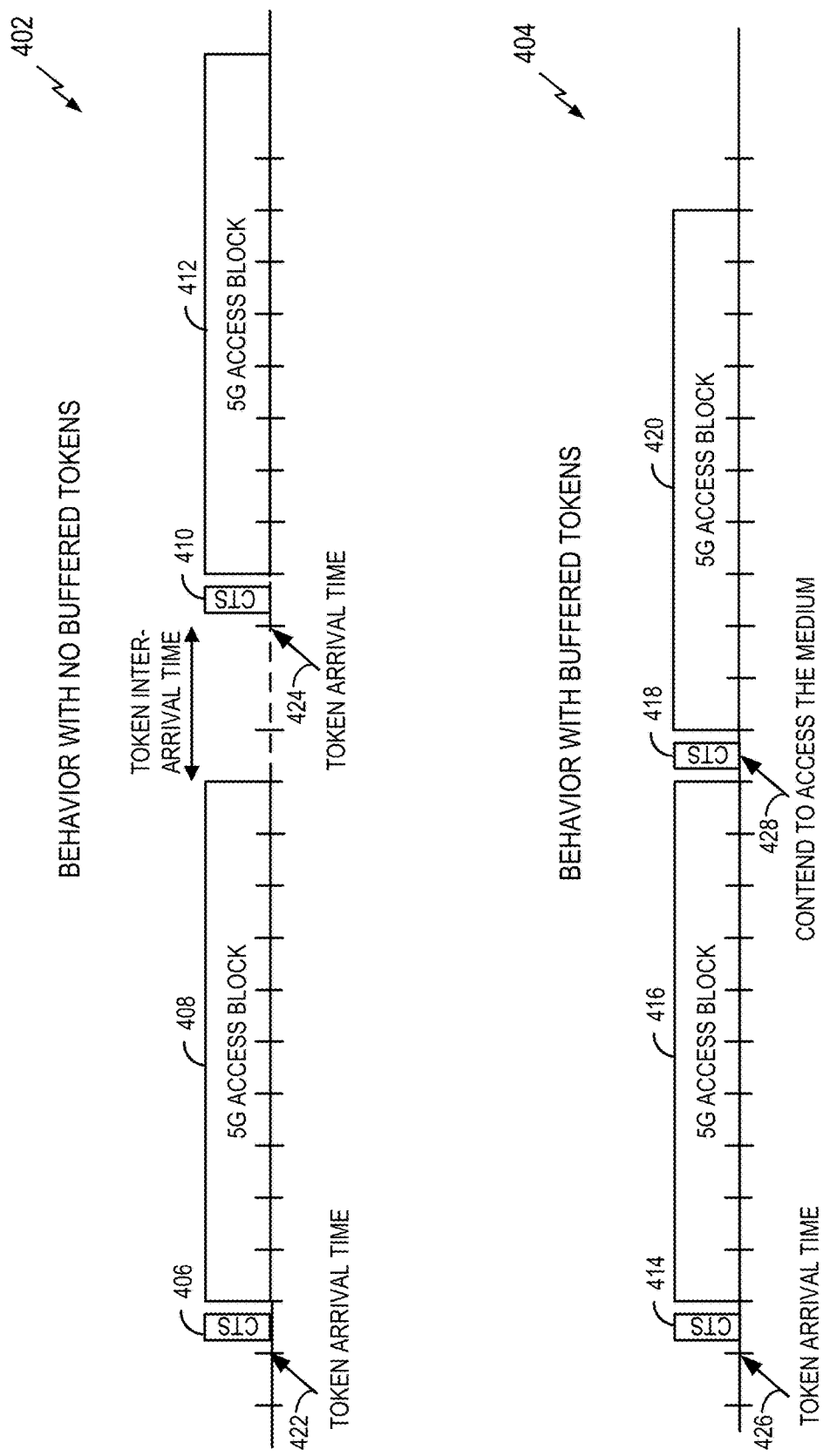
FIG. 4 is a timing diagram illustrating an example of scheduling in accordance with some aspects of the disclosure.

FIG. 4 illustrates example timing diagrams 402 and 404 for a token bucket-based access technique. The timing diagram 402 corresponds to a scenario where the token bucket is empty upon completion of a first access block. The timing diagram 404 corresponds to a scenario where the token bucket still contains at least one token upon completion of a first access block.

Referring initially to the timing diagram 402, the following access operation may be performed by base station when a token is present (e.g., following a token arrival time 422). A Wi-Fi MAC of the base station begins a clear channel assessment (CCA) procedure or some other type of medium contention procedure a period of time (e.g., X microseconds, μs) prior to the first scheduled sub-frame. For example, if the medium is detected as idle, the base station may send out a CTS 406 to reserve the medium for a period of time corresponding to an access block 408 (e.g., the subsequent 10 sub-frames). In some implementations, an address of the CTS 406 may be set to an address reserved for 5G operation. In this way, a device that receives the CTS 406 can determine that the CTS 406 relates to a scheduled 5G communication. Since the token bucket is empty after completion of the access block 408 in this example, the base station may wait until the next token arrival time 424 to send another CTS 410 (reservation signal) to reserve the time for another access block 412.

The following access operations may be performed at the UEs. As discussed above, the UEs can track the token bucket used by the base station. Accordingly, a UE can wake up slightly prior to the start of a 5G access block and determine whether the base station has a token. Upon determining that the base station has started the sequence of sub-frames of an access block, the UE participates in each of the sub-frames according to the schedule provided by the base station. In some implementations, the first sub-frame of a 5G access block begins with a downlink transmission (e.g., even if the sub-frame is designated as uplink-centric). Thus, a UE may monitor for this downlink transmission (not shown in FIG. 4) to determine whether the base station will be communicating during the 5G access block.

Referring to the timing diagram 404, the following access operation may be performed by a base station when a token bucket contains multiple tokens (e.g., following a token arrival time 426). If the medium is detected as idle, the base station sends out a CTS 414 to reserve the medium for a period of time corresponding to an access block 416. Since there is still at least one token in the token bucket after completion of the access block 416 in this example, the base station may immediately (e.g., at a time 428 prior to a next token arrival time) send another CTS 418 to contend for access to the medium (e.g., reserve the time for another access block 420).

Due to CCA conditions, access during the first possible sub-frame might not be possible. In this case, the base station may persist with the contention procedure until the CTS is sent. At the sub-frame that is subsequent to this CTS, the base station initiates communication for the 5G sub-frames (e.g., the remaining portion of the 5G access block).

If the CCA procedure at the base station does not allow for CTS transmission within the sub-frame prior to the desired start of the 5G access block, one of two options may be followed in a representative implementation. In a first option (Option 1), the base station persists with the CCA/contention until the CTS can be sent. Here, UEs (STAs) may remain awake until communication commences on one of the 5G sub-frames. A new token may arrive during the contention period.

In a second option (Option 2), the base station persists with CCA/contention for a known duration (e.g., a defined number of sub-frames). If a CTS still cannot be sent (e.g., after two sub-frames), the base station stores the token and restarts the 5G access operation at the next token arrival time.

In view of Options 1 and 2, the following operations may be performed in the event a base station has accumulated multiple tokens in the token bucket (e.g., the scenario associated with the timing diagram 404). As soon as a 5G access block is completed, the base station starts contending for the next CTS to send. Also, the UEs will be aware that the base station has more tokens in the token bucket. Consequently, the UEs may persist in the wake state. If the base station cannot access the medium again, the base station persists according to behavior described in Option 1 or Option 2.

In some implementations, CCA is also implemented at a UE. For example, a UE that detects high interference in its neighborhood may elect to not communicate during the next 5G access block.

Frame Structures

FIGS. 5-14 illustrate example frame structures may be used in conjunction with a token bucket-based access technique as taught herein.

Figure 5:
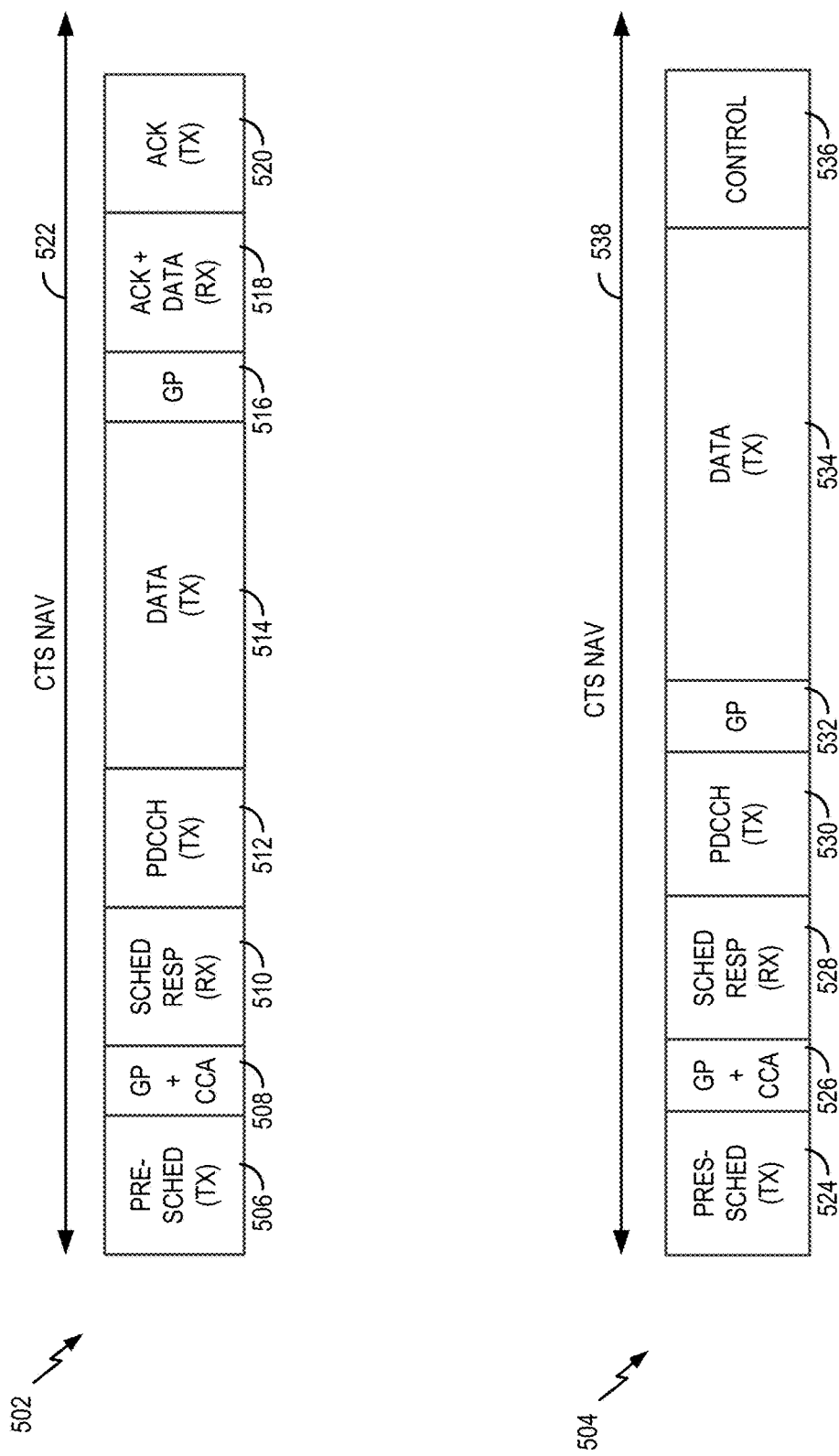
FIG. 5 is a diagram illustrating an example of a downlink sub-frame and an example of an uplink sub-frame in accordance with some aspects of the disclosure.

FIG. 5 illustrates an example of a downlink (DL) sub-frame structure 502 and an uplink (UL) sub-frame structure 504. Transmit (Tx) and receive (Rx) directions are as indicated.

The sub-frame structure 502 includes a Pre-Schedule (Pre-Sched) field 506, a guard period (GP)+CCA field 508, a Schedule Response (SchedResp) field 510, a Physical Downlink Control Channel (PDCCH) field 512, a Data field 514, a GP field 516, an Acknowledgement and Data (ACK+Data) field 518, and an Acknowledgement (ACK) field 520. A CTS network allocation vector (NAV) for the sub-frame structure 502 (e.g., due to a CTS, not shown, that precedes the sub-frame structure 502) may cover the time period indicated by the line 522.

The sub-frame structure 504 includes a Pre-Schedule (Pre-Sched) field 524, a GP+CCA field 526, a Schedule Response (SchedResp) field 528, a PDCCH field 530, a GP field 532, a Data field 534, and a Control field 536. A CTS network allocation vector (NAV) for the sub-frame structure 504 (e.g., due to a CTS, not shown, that precedes the sub-frame structure 504) may cover the time period indicated by the line 538.

When a token is available, the base station initiates a sequence of the appropriate sub-frames (for DL or UL). In a typical implementation, the first sub-frame of a sequence is a DL-centric frame. Thus, UEs can detect the start of a sub-frame sequence by detecting the PreSched field 506 as illustrated in FIG. 5. In implementations where the first sub-frame of a 5G access block is an UL-centric frame, a small downlink indication (not shown) from the base station may be added to the UL-centric frame.

Figure 6:
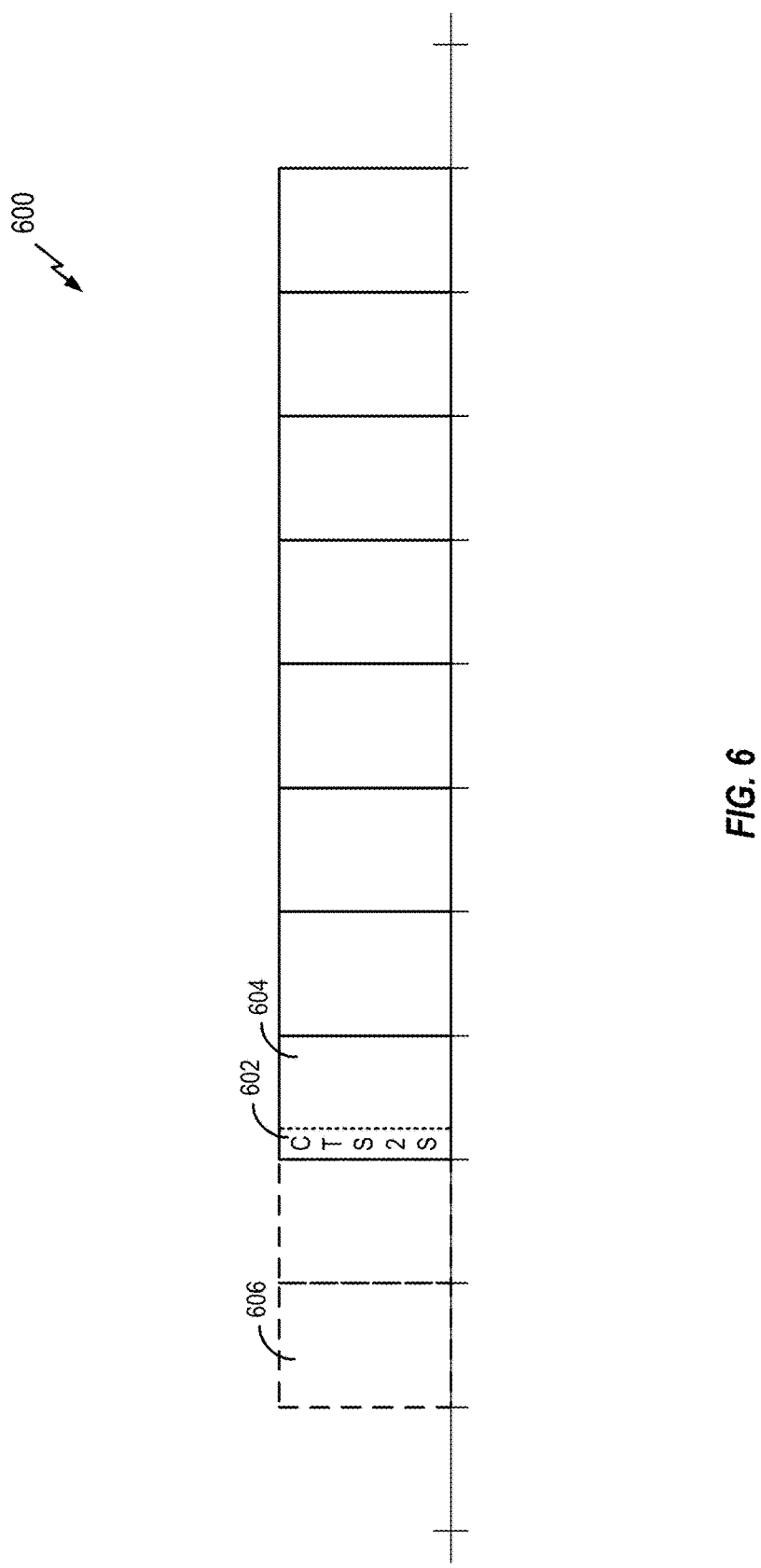
FIG. 6 is a diagram illustrating an example of an access block in accordance with some aspects of the disclosure.

In some implementations, a sub-frame of an access block may include a CTS. In this case, an access block might not be preceded by a CTS. FIG. 6 illustrates an example of such an implementation. Here, an access block 600 (consisting of ten sub-frames) is not preceded by a CTS. Instead, a CTS-to-self (CTS2S) 602 may be included in one or more of the sub-frames (e.g., as illustrated for a sub-frame 604) of the access block 600.

FIG. 6 also illustrates that a CTS (or data) might not be communicated in one or more of the sub-frames (e.g., as illustrated for a sub-frame 606, represented as a dashed block). For example, if the RF band is initially in-use, a base station may wait until the RF band is idle to send the CTS2S.

Figure 7:
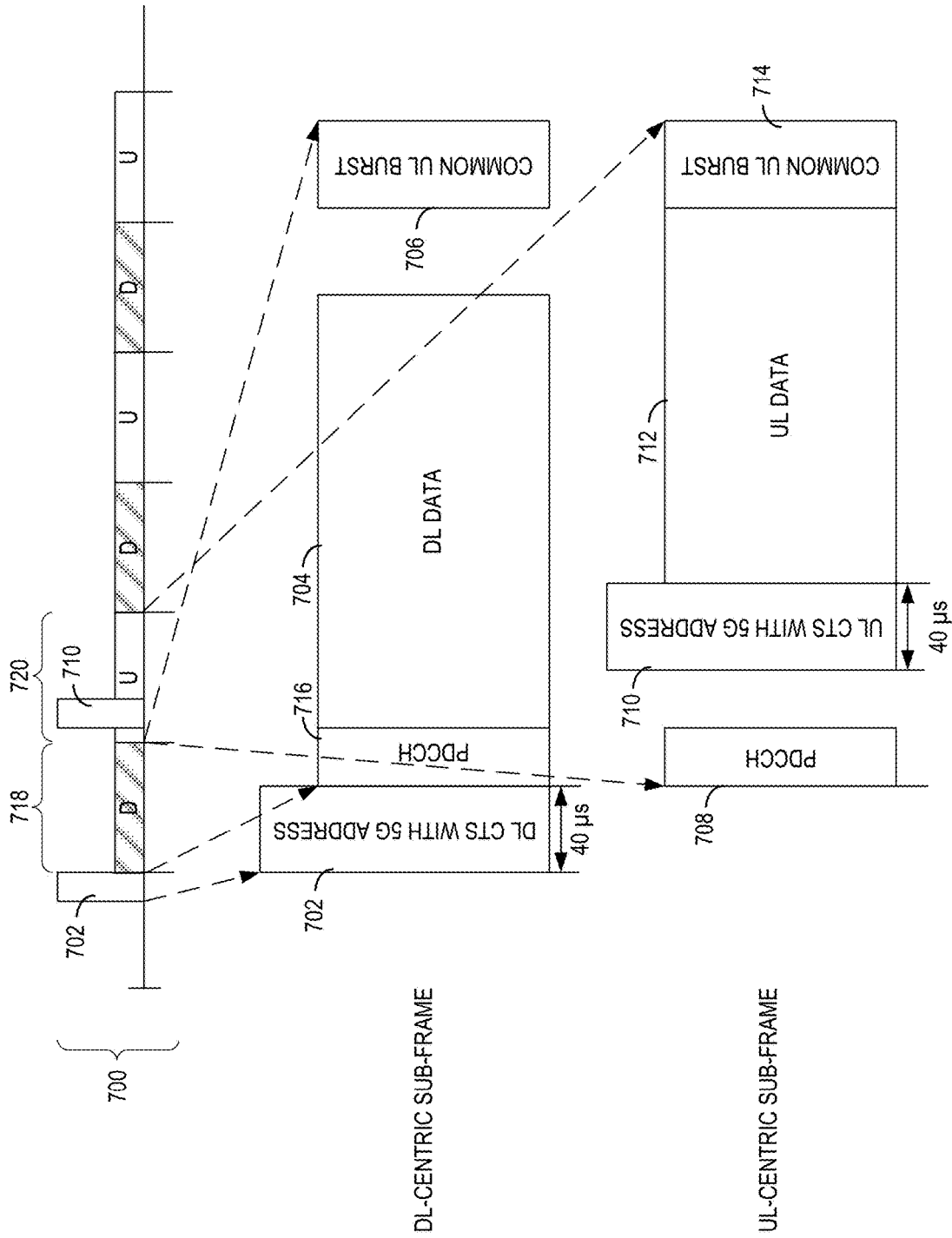
FIG. 7 is a diagram illustrating an example of a self-contained frame structure in accordance with some aspects of the disclosure.
Figure 8:
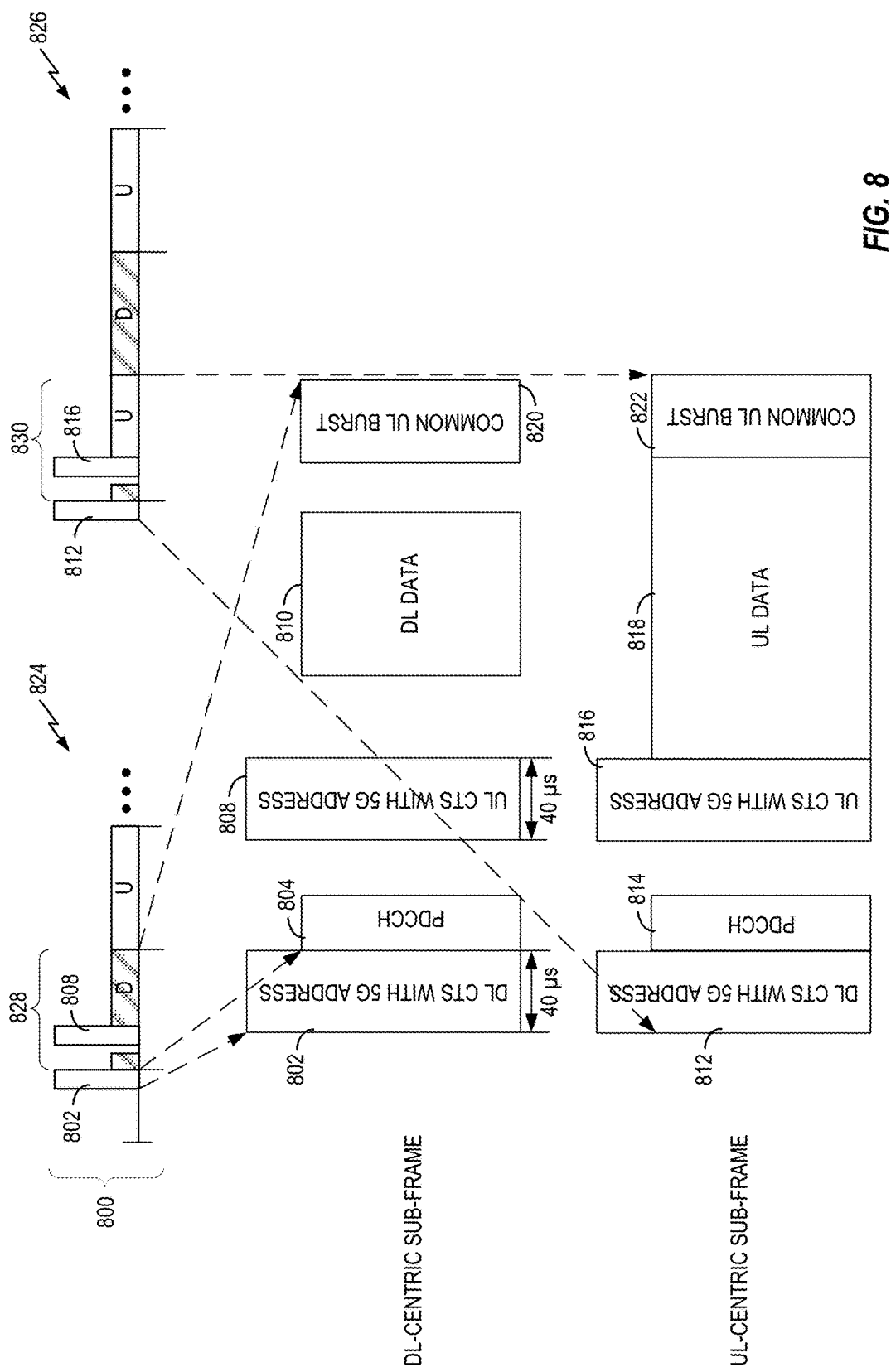
FIG. 8 is a diagram illustrating another example of a self-contained frame structure in accordance with some aspects of the disclosure.

FIGS. 7 and 8 illustrate examples of self-contained frame structures 700 and 800, respectively, for unlicensed access. As used herein, the term self-contained can mean that a frame structure may accommodate information (e.g., data) flow in one direction (e.g., the DL) and signaling (e.g., control flow, such as for ACKs) in the opposite direction (e.g., the UL). In each figure, the top portion of the figure shows the frame structure in a high-level manner to illustrate the scheduled uplink (U) and downlink (D) sub-frames. The remainder of each figure then shows the frame structure in an expanded form to illustrate the fields of a DL-centric sub-frame and an UL-centric sub-frame.

In the frame structure 700, the field 702 is for DL transmission of a DL CTS for a DL-centric sub-frame and the field 710 is for UL transmission of an UL CTS for an UL-centric sub-frame. The DL CTS in the field 702 is transmitted prior to the first sub-frame 718 (a DL-centric sub-frame) of the frame structure 700. The UL CTS in the field 710 is transmitted in the first UL-centric sub-frame 720 of the frame structure 700. As discussed herein, each CTS may include a corresponding 5G address. In the example of FIG. 7, each CTS has a duration of 40 µs. Different implementations may use different CTS durations.

Each sub-frame commences with a PDCCH and ends with a common UL burst. Depending on the sub-frame type (DL-centric or UL-centric), the sub-frame includes either DL data or UL data. Thus, in the DL-centric sub-frame, the field 716 is for DL transmission of PDCCH, the field 704 is for DL data transmission, and the field 706 is for transmission of an UL common burst (e.g., that includes control information such as an ACK in response to a DL data transmission). Similarly, in the UL-centric sub-frame, the field 708 is for DL transmission of PDCCH, the field 712 is for UL data transmission, and the field 714 is for transmission of a common UL burst.

When a token is available, a base station may initiate a sequence of self-contained frames. As discussed above, the base station may send out a CTS (e.g., in the field 702) prior to the first sub-frame. All UEs (STAs) under the base station may then send a CTS (e.g., together) in the first UL-centric frame (e.g., in the field 710) of the sub-frame sequence. Thus, an UL CTS may be transmitted immediately prior to transmission of UL data (in field 712) in the first sub-frame that is UL-centric.

As discussed herein, each CTS may be sent via Wi-Fi technology. Thus, Wi-Fi devices in the vicinity of the base station or the UE may back off the corresponding medium (e.g., a particular RF band) upon receiving such a CTS. Consequently, interference (or potential interference) in the vicinity of the base station and UE may be reduced or eliminated.

As mentioned above, the UL CTS may be sent in the first sub-frame that includes UL data. In practice, this scheme might not provide optimal protection against interference. For example, if several DL-centric sub-frames are sent in succession, without any intervening UL-centric sub-frames, there may be insufficient protection from interference at a UE (e.g., due to the distance between the base station and the UE and the limited range of the DL CTS). FIG. 8 illustrates an example of a frame structure 800 where an UL CTS is sent during a DL-centric sub-frame, thereby addressing this issue.

The frame structure 800 of FIG. 8 includes a first sub-frame sequence 824 and a second sub-frame sequence 826. A CTS is sent in the DL prior to the first sub-frame of each sub-frame sequence and a CTS is sent in the UL in the first sub-frame of each sub-frame sequence. Thus, the exchange of CTSs may be used in the first sub-frame of a sequence irrespective of whether the sub-frame is uplink oriented or downlink oriented. As compared to the example of FIG. 7, there may be slightly more overhead in the example of FIG. 8 if the first sub-frame is DL-centric frame since there are two "turn arounds" in the FIG. 8 example.

In FIG. 8, the fields 802 and 812 are for DL transmission of a DL CTS and the fields 808 and 816 are for UL transmission of an UL CTS. The DL CTS in the field 802 is transmitted prior to the first sub-frame 828 (a DL-centric sub-frame) of the first sub-frame sequence 824 while the corresponding UL CTS (in the field 808) is transmitted in the sub-frame 828. The DL CTS in the field 812 is transmitted prior to the first sub-frame 830 (an UL-centric sub-frame) of the second sub-frame sequence 826 while the corresponding UL CTS (in the field 816) is transmitted in the sub-frame 830. As discussed herein, each CTS may include a corresponding 5G address. In the example of FIG. 8, each CTS has a duration of 40 μs. Different implementations may use different CTS durations.

Each sub-frame commences with a PDCCH and ends with a common UL burst. Depending on the sub-frame type (DL-centric or UL-centric), the sub-frame includes either DL data or UL data. Thus, in the DL-centric sub-frame, the field 804 is for DL transmission of PDCCH, the field 810 is for DL data transmission, and the field 820 is for transmission of an UL common burst (e.g., that includes control information such as an ACK in response to a DL data transmission). Similarly, in the UL-centric sub-frame, the field 814 is for DL transmission of the PDCCH, the field 818 is for UL data transmission, and the field 822 is for transmission of a common UL burst.

In the examples of FIGS. 7 and 8 (as well as other example herein), a base station may use the PDCCH or some other channel to request UEs to send an UL CTS. For example, a base station may indicate in PDCCH that all UEs (e.g., all UEs currently served by the base station) are to send a CTS. As another example, the base station may indicate (e.g., identify) the UEs that are most likely to be scheduled and that should, therefore, send an UL CTS. In some scenarios, the base station may select the UEs that are to send a CTS based on the locations of the UEs. In some implementations, the base station uses a CTS sender bitmap to indicate which UEs are to send a CTS.

In some implementations, a UE being served by a base station may support CCA. For example, regulatory requirements may specify that UEs are to use a listen-before-talk procedure before accessing a particular medium. If CCA at a UE is indicated, a UE may record the CCA state prior to (e.g., 25 μs prior to) and after receiving the initial CTS (and, optionally, the PDCCH). Here, the UE may determine from the schedule when the base station is to send its CTS. In some implementations (e.g., where a UE includes a Wi-Fi PHY/MAC), recordation of the CCA state may involve decoding Wi-Fi signals on the medium. In some implementations (e.g., where a UE does not include a Wi-Fi PHY/MAC), recordation of the CCA state may involve detecting energy on the medium. If the CCA indicates that the medium is sufficiently clear (e.g., the idle period is greater than a threshold), the UE may send a CTS if instructed to do so by an indication in the PDCCH. Conversely, if the medium is not sufficiently clear, the UE may elect to not send a CTS and may refrain from communicating during the corresponding access block. In some implementations, a UE may store a CTS as a "canned waveform."

Figure 9:
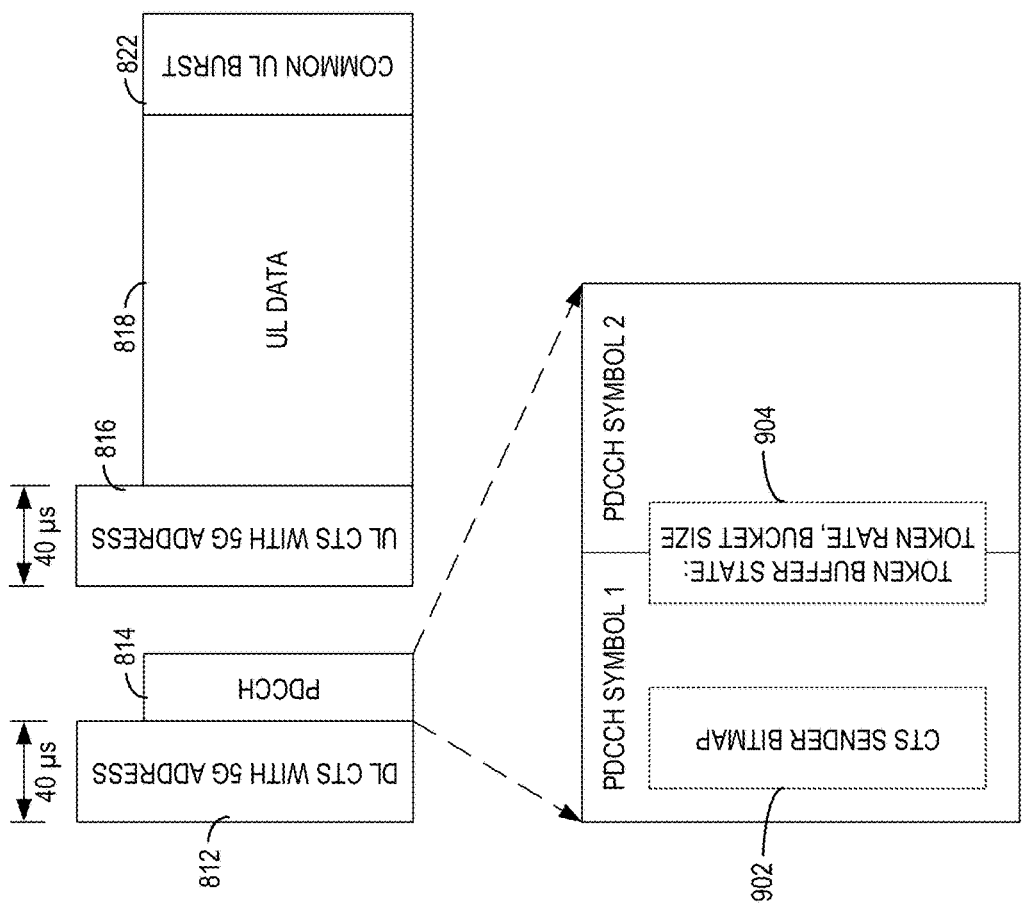
FIG. 9 is a diagram illustrating an example of a control channel carrying information in accordance with some aspects of the disclosure.

FIG. 9 illustrates an example of information that may be carried in a control channel. For purposes of illustration, this example depicts information carried by the PDCCH field 814 of FIG. 8. It should be appreciated that in other implementations some other signaling technique could be used to carry the information. In FIG. 9, a PDCCH symbol 1 of the PDCCH 814 carries a CTS sender bitmap 902 (e.g., as discussed above). In addition, a token buffer state 904 (e.g., the token rate and the token bucket size) is carried by the PDCCH symbol 1 and a PDCCH symbol 2 of the PDCCH 814. Alternatively, or in addition, this information could be carried by another symbol or other symbols.

Figure 10:
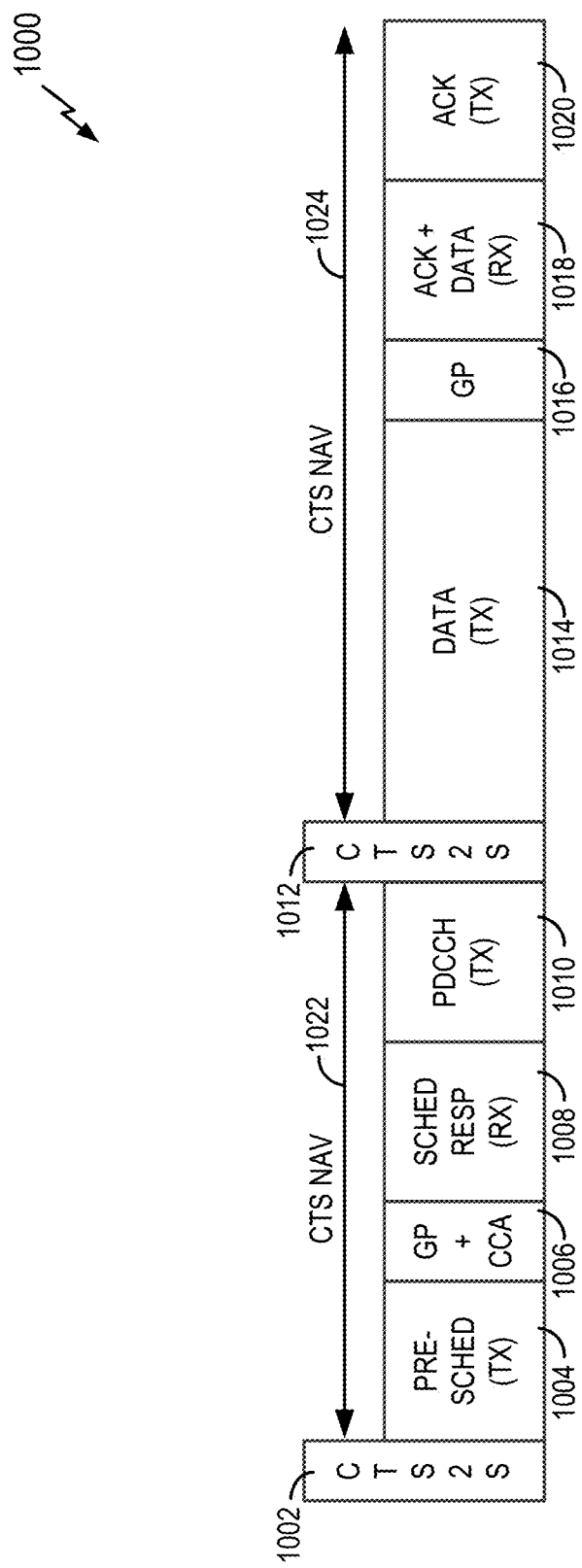
FIG. 10 is a diagram illustrating another example of a downlink sub-frame in accordance with some aspects of the disclosure.
Figure 11:
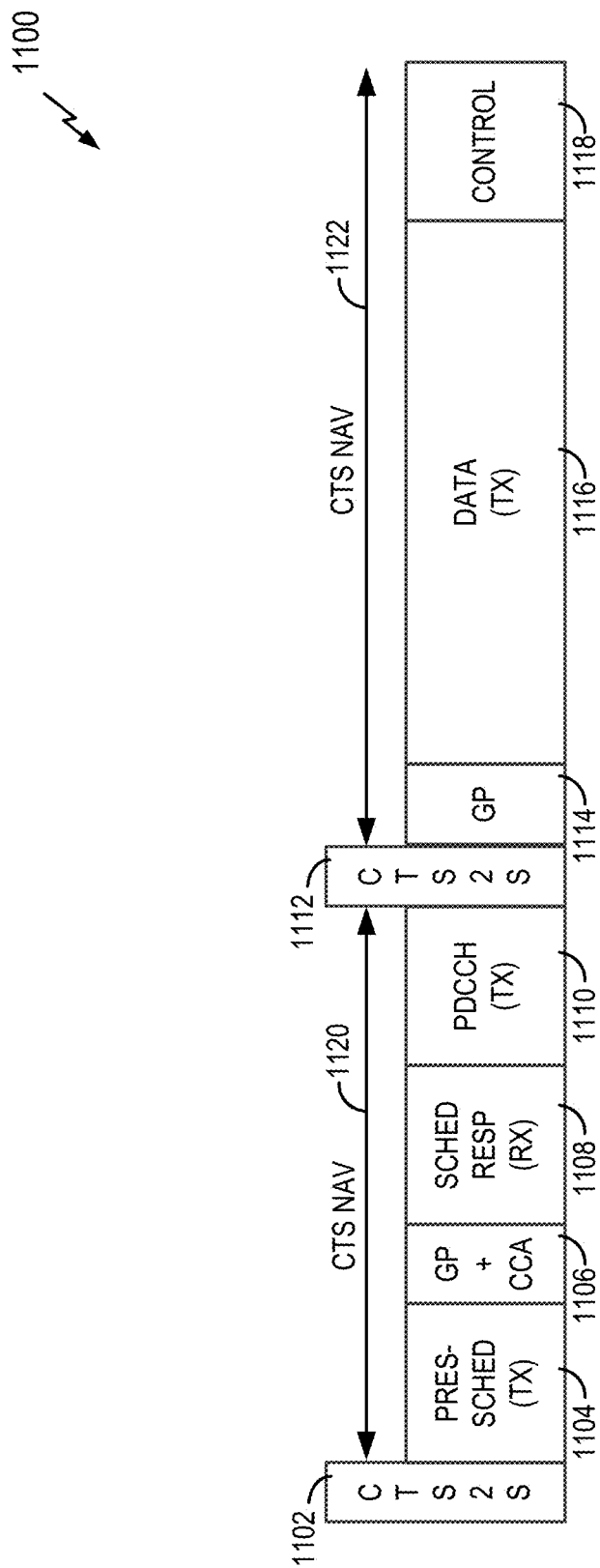
FIG. 11 is a diagram illustrating another example of an uplink sub-frame in accordance with some aspects of the disclosure.

FIGS. 10 and 11 illustrate examples of self-contained frame structures for unlicensed access where a sub-frame may be preceded by a CTS-2-Self and include a CTS-2-Self. FIG. 10 illustrates a DL-centric self-contained sub-frame 1000, while FIG. 11 illustrates an UL-centric self-contained sub-frame 1100.

The sub-frame 1000 is preceded by a first CTS-2-Self (CTS2S) field 1002. The sub-frame 1000 includes a Pre-Schedule (Pre-Sched) field 1004, a GP+CCA field 1006, a Schedule Response (SchedResp) field 1008, a PDCCH field 1010, a second CTS-2-Self field 1012, a Data field 1014, a GP field 1016, an Acknowledgement and Data (ACK+Data) field 1018, and an Acknowledgement (ACK) field 1020. As discussed herein, a base station may perform a CCA procedure before the first sub-frame (e.g., the sub-frame 1000) of a sub-frame sequence. The NAV duration for the first CTS-2-Self (in the first CTS-2-Self field 1002) is indicated by the line 1022. The NAV duration for the second CTS-2-Self (in the second CTS-2-Self field 1012) is indicated by the line 1024.

The sub-frame 1100 is preceded by a first CTS-2-Self field 1102. The sub-frame 1100 includes a Pre-Schedule (Pre-Sched) field 1104, a GP+CCA field 1106, a Schedule Response (SchedResp) field 1108, a PDCCH field 1110, a second CTS-2-Self field 1112, a GP field 1114, a Data field 1116, and a Control field 1118. Again, a base station may perform a CCA procedure before the first sub-frame (e.g., the sub-frame 1100) of a sub-frame sequence. The NAV duration for the first CTS-2-Self (in the first CTS-2-Self field 1102) is indicated by the line 1120. The NAV duration for the second CTS-2-Self (in the second CTS-2-Self field 1112) is indicated by the line 1122.

When a token is available, a base station initiates a sequence of self-contained sub-frames (e.g., consisting of the sub-frame 1000 or 1100) for a 5G access block. In a typical implementation, the first sub-frame of a sequence is a DL-centric frame. Thus, UEs can detect the start of a sub-frame sequence by detecting a PreSched field as illustrated in FIGS. 10 and 11. In implementations where the first sub-frame of a sequence is an UL-centric frame, the base station may add a small downlink indication (not shown in FIGS. 10 and 11) to the frame.

Figure 12:
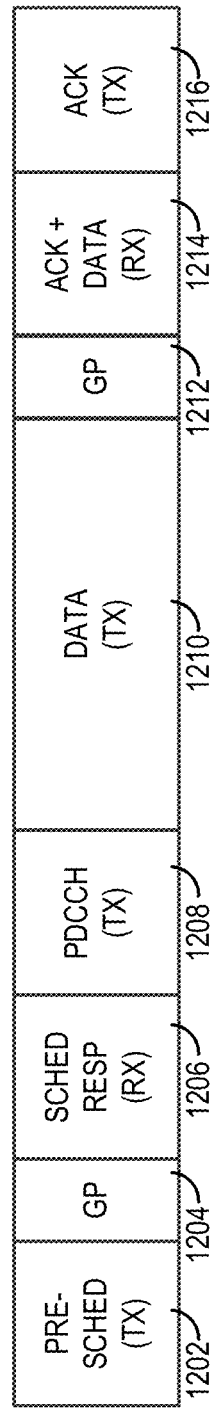
FIG. 12 is a diagram illustrating another example of a downlink sub-frame in accordance with some aspects of the disclosure.
Figure 13:
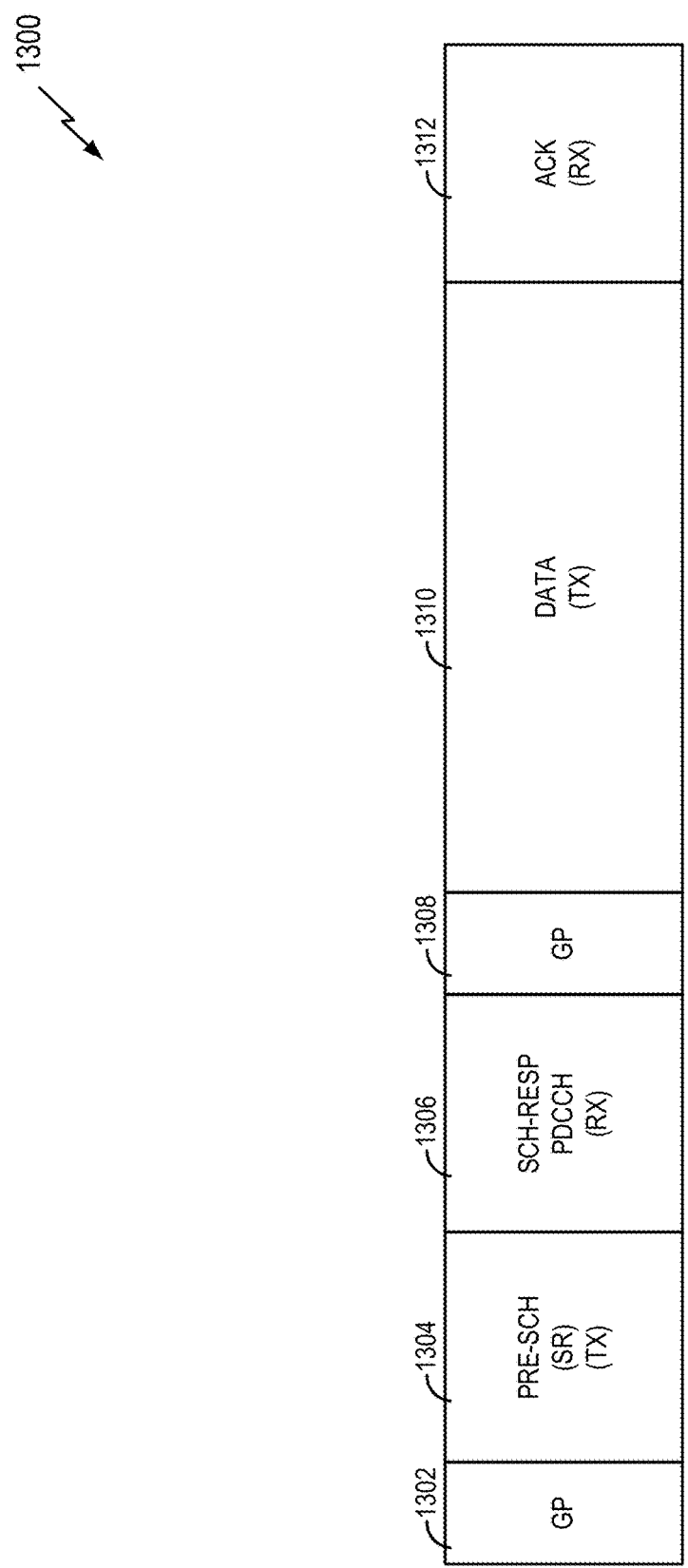
FIG. 13 is a diagram illustrating another example of an uplink sub-frame in accordance with some aspects of the disclosure.
Figure 14:
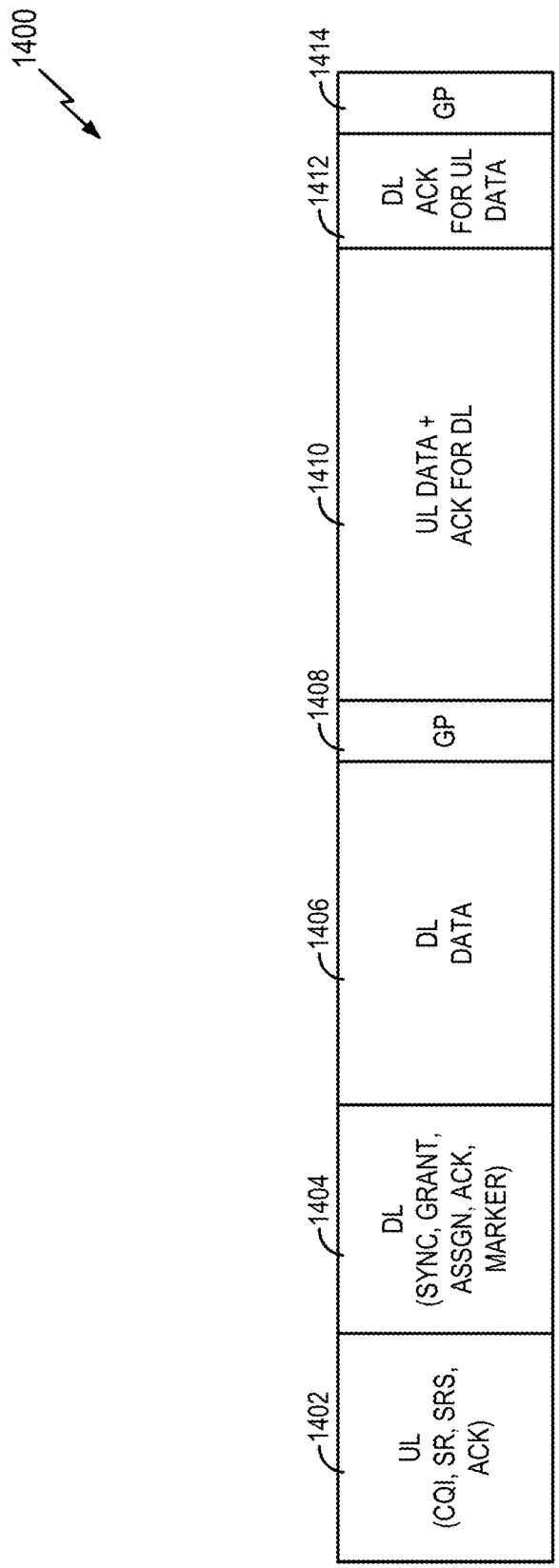
FIG. 14 is a diagram illustrating an example of a bi-directional sub-frame in accordance with some aspects of the disclosure.

FIGS. 12-14 illustrate additional examples of self-contained frame structures. FIG. 12 illustrates a DL-centric self-contained sub-frame 1200, FIG. 13 illustrates an UL-centric self-contained sub-frame 1300, and FIG. 14 illustrates a bidirectional self-contained sub-frame 1400.

The sub-frame 1200 includes a Pre-Schedule (Pre-Sched) field 1202, a GP field 1204, a Schedule Response (SchedResp) field 1206, a PDCCH field 1208, a Data field 1210, a GP field 1212, an Acknowledgement and Data (ACK+Data) field 1214, and an Acknowledgement (ACK) field 1216. Transmit (Tx) and receive (Rx) directions are as indicated.

The sub-frame 1300 includes a GP field 1302, a Pre-Schedule (Pre-Sch) field 1304 (e.g., including a scheduling request, SR), a Schedule Response (Sch-Resp) and PDCCH field 1306, a GP field 1308, a Data field 1310, and an Acknowledgement (ACK) field 1312. Transmit (Tx) and receive (Rx) directions are as indicated.

The sub-frame 1400 includes an uplink (UL) field 1402, a downlink (DL) field 1404, a DL Data field 1406, a GP field 1408, an UL Data+ACK for DL field 1410, a DL ACK for UL Data field 1412, and a GP field 1414. The UL field 1402 may include a channel quality indication (CQI), an SR, a sounding reference signal (SRS), and an ACK. The DL field 1402 may include synchronization signals (Sync), a Grant, assignment information (Assgn), an ACK, and a Marker. Transmit (Tx) and receive (Rx) directions are as indicated.

Access Coordination

Figure 15:
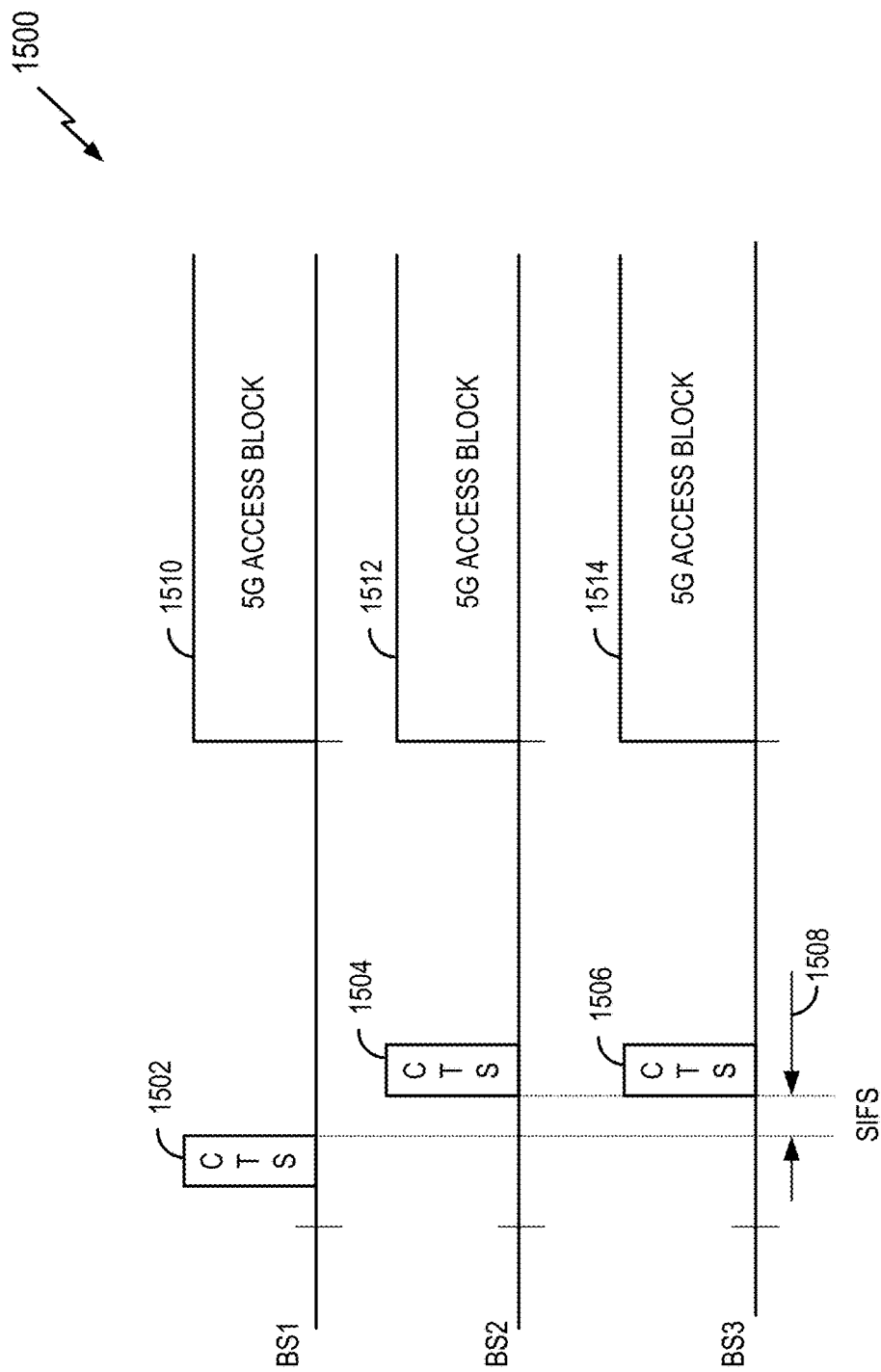
FIG. 15 is a timing diagram illustrating an example of coordination across wireless communication devices in accordance with some aspects of the disclosure.

Referring now to the timing diagram 1500 of FIG. 15, access co-ordination may be applied across multiple base stations (or other management devices). For example, when multiple base stations (e.g., the base stations BS1, BS2, and BS3 of FIG. 15) are present in proximity, the base stations may attempt to coordinate for minimum interference. This coordination may involve, for example, complete orthogonalization or slot alignment.

For complete orthogonalization, the 5G access blocks of one base station do not overlap with the 5G access blocks of other neighboring base stations. For example, the base stations could choose different channels or choose different time lines.

For slot alignment, the base stations may attempt to maximize the number of slots where the base stations' 5G communications are aligned in UL-centric or DL-centric mode. Base stations (or cells) that are within Wi-Fi range can use the technique shown in FIG. 15 to ensure that they are aligned. A first one of the base stations (the base station BS1) sends out a CTS 1502 (e.g., after the base station BS1 wins contention for the corresponding communication medium). Thus, Wi-Fi devices in the vicinity of the first base station BS1 will back off the medium. Moreover, the other base stations may determine that the CTS 1502 is for 5G communication because the CTS 1502 may include a globally unique 5G address or some other indication that the CTS 1502 is for 5G communication. Accordingly, upon hearing the CTS 1502, the other base stations send their CTSs as well (the base station BS2 sends a CTS 1504 and the base station BS3 sends a CTS 1506), thereby reserving the medium around them. In the example of FIG. 15, the base stations BS2 and BS3 send the CTSs 1504 and 1506 a short interframe space (SIFS) time period 1508 after the CTS 1502. Wi-Fi devices in the vicinity of the other base stations BS2 and BS3 will also back off the medium in response to the CTSs 1504 and 1506. Accordingly, the base stations BS1, BS2, and BS3 may now share the medium without interference from (or without interfering with) nearby Wi-Fi devices.

The base stations BS1, BS2, and BS3 may thus communicate with UEs during their respective access blocks 1510, 1512, and 1514. As indicated in FIG. 15, these access blocks may overlap. Accordingly, the base stations BS1, BS2, and BS3 may communicate using code division multiple access (cdma) or some other multiple access technique (e.g., a 5G multiple access technique).

Token Bucket Parameter Signaling

In some implementations, a token bucket may be based on dynamic parameters and/or semi-static parameters. Dynamic parameters of the token bucket may include, for example, the number of tokens in the token bucket, and the time to the next token. Semi-static parameters may include, for example, the maximum token bucket size (e.g., the maximum number of tokens that can be accumulated), and the token inter-arrival time (e.g., the token arrival rate).

These parameters may be signaled in different ways in different implementations. Three example options for signaling these parameters follow. In a first option (Option 1), a base station continuously broadcasts in PDCCH or some other channel the dynamic parameters and the semi-static parameters. In a second option (Option 2), the base station provides the semi-static parameters at connection set up and continuously broadcasts the dynamic parameters in PDCCH or some other channel. In a third option (Option 3), the base station provides the parameters (dynamic and/or semi-static parameters) on demand to the UEs. In Option 3, the base station may use broadcast signaling to indicate whether the semi-static parameters have changed. UEs may request (e.g., demand) parameters when they join the base station and/or when a change in parameters is indicated. A device (e.g., a base station or a UE) may associate a counter with the current parameter set, and increment the counter whenever the set changes. In this way, the devices in a system may coordinate changes in the parameters.

In addition to the above, a UE may query the base station if the current parameters have been persistent for a threshold period of time. This may be used to ensure freshness of the parameter. Such a case may be useful if the UE has been dormant for some time.

In a typical implementation, a base station uses a common token bucket for communication with all of the UEs being served by the base station. In this case, the base station may send the same token bucket information to each of the UEs. In other implementations, however, a base station may use multiple token buckets, where a given token bucket is used for communication with a particular UE. In this case, for each UE, the base station may send to that UE the particular token bucket information corresponding to that UE.

The following operations may be used to obtain initial token bucket synchronization between a base station and a UE in some implementations. The UE listens for the token bucket parameters that are transmitted in a control channel (e.g., in a PDCCH). On obtaining the token parameters that include the token rate and the current token bucket size, the UE can determine the arrival times of subsequent tokens based on the token arrival rate. The UE can then wake at the designated token intervals (e.g., corresponding to the token arrival rate) as discussed herein. An initial time of reference (e.g., an actual time of arrival for a particular token) may be indicated by signaling or may be predefined. For example, a particular sub-frame may be designated as an initial time of reference for calculating subsequent token arrival times based on the token arrival rate. Any subsequent changes to the token information may be communicated in a similar manner (e.g., via subsequent PDCCH signaling).

Other Aspects

By restricting 5G access to the WLAN through the use of a scheduling and token bucket scheme, fair access may be ensured for Wi-Fi traffic, with little or no impact on Wi-Fi latency. For example, in some aspects, the access scheme provided herein can restrict cellular traffic (or other similar traffic) on WLAN channels (or other similar channels) according to a fairness criterion (e.g., a token arrival rate or token bucket information). Also, advantages provided by the access scheme disclosed herein may be achieved even when complete erasure is assumed for 5G traffic when this traffic is subject to collision. Also, improvements in latency may be achieved through the use of a hybrid automatic repeat request (HARQ) recovery mechanism or similar mechanism for the 5G traffic.

In some aspects, the term token bucket refers to an algorithm that controls whether an action can be performed based on whether a token is available (e.g., whether there are any tokens in the token bucket). A token can be any indication suitable for controlling the action. It should be appreciated that the terms token and token bucket cover any type of technique that provides the above functionality or any other type of token bucket-related functionality, irrespective of whether that technique uses the term token or token bucket.

First Example Apparatus

Figure 16:
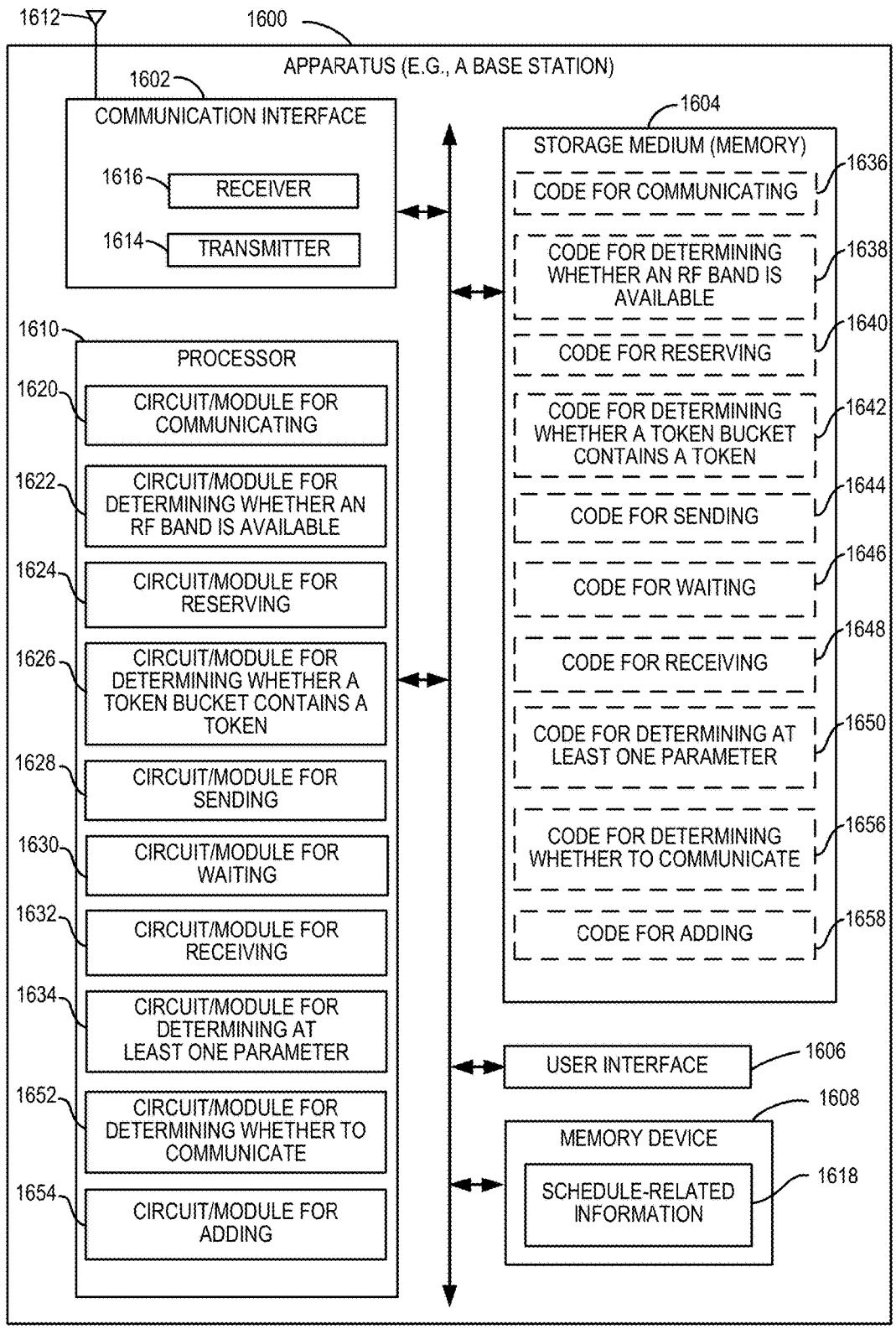
FIG. 16 illustrates a block diagram of an example hardware implementation for an apparatus (e.g., an electronic device) that can support communication in accordance with some aspects of the disclosure.

FIG. 16 is an illustration of an apparatus 1600 that may support scheduling according to one or more aspects of the disclosure. The apparatus 1600 could embody or be implemented within a base station, a mobile device, or some other type of device that supports wireless communication. In various implementations, the apparatus 1600 could embody or be implemented within an access point, an access terminal, or some other type of device. In various implementations, the apparatus 1600 could embody or be implemented within a mobile phone, a smart phone, a tablet, a portable computer, a server, a personal computer, a sensor, an entertainment device, a medical device, or any other electronic device having circuitry. The apparatus 1600 includes a communication interface (e.g., at least one transceiver) 1602, a storage medium 1604, a user interface 1606, a memory device 1608, and a processor 1610 (e.g., a processing circuit).

These components can be coupled to and/or placed in electrical communication with one another via a signaling bus or other suitable component, represented generally by the connection lines in FIG. 16. The signaling bus may include any number of interconnecting buses and bridges depending on the specific application of the processor 1610 and the overall design constraints. The signaling bus links together various circuits such that each of the communication interface 1602, the storage medium 1604, the user interface 1606, and the memory device 1608 are coupled to and/or in electrical communication with the processor 1610. The signaling bus may also link various other circuits (not shown) such as timing sources, peripherals, voltage regulators, and power management circuits, which are well known in the art, and therefore, will not be described any further.

The communication interface 1602 may be adapted to facilitate wireless communication of the apparatus 1600. For example, the communication interface 1602 may include circuitry and/or programming adapted to facilitate the communication of information bi-directionally with respect to one or more communication devices in a network. In some implementations, the communication interface 1602 may be configured for wire-based communication. In some implementations, the communication interface 1602 may be coupled to one or more antennas 1612 for wireless communication within a wireless communication system. The communication interface 1602 can be configured with one or more standalone receivers and/or transmitters, as well as one or more transceivers. In the illustrated example, the communication interface 1602 includes a transmitter 1614 and a receiver 1616.

The memory device 1608 may represent one or more memory devices. As indicated, the memory device 1608 may maintain schedule-related information 1618 along with other information used by the apparatus 1600. In some implementations, the memory device 1608 and the storage medium 1604 are implemented as a common memory component. The memory device 1608 may also be used for storing data that is manipulated by the processor 1610 or some other component of the apparatus 1600.

The storage medium 1604 may represent one or more computer-readable, machine-readable, and/or processor-readable devices for storing programming, such as processor executable code or instructions (e.g., software, firmware), electronic data, databases, or other digital information. The storage medium 1604 may also be used for storing data that is manipulated by the processor 1610 when executing programming. The storage medium 1604 may be any available media that can be accessed by a general purpose or special purpose processor, including portable or fixed storage devices, optical storage devices, and various other mediums capable of storing, containing or carrying programming.

By way of example and not limitation, the storage medium 1604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1604 may be embodied in an article of manufacture (e.g., a computer program product). By way of example, a computer program product may include a computer-readable medium in packaging materials. In view of the above, in some implementations, the storage medium 1604 may be a non-transitory (e.g., tangible) storage medium.

The storage medium 1604 may be coupled to the processor 1610 such that the processor 1610 can read information from, and write information to, the storage medium 1604. That is, the storage medium 1604 can be coupled to the processor 1610 so that the storage medium 1604 is at least accessible by the processor 1610, including examples where at least one storage medium is integral to the processor 1610 and/or examples where at least one storage medium is separate from the processor 1610 (e.g., resident in the apparatus 1600, external to the apparatus 1600, distributed across multiple entities, etc.).

Programming stored by the storage medium 1604, when executed by the processor 1610, causes the processor 1610 to perform one or more of the various functions and/or process operations described herein. For example, the storage medium 1604 may include operations configured for regulating operations at one or more hardware blocks of the processor 1610, as well as to utilize the communication interface 1602 for wireless communication utilizing their respective communication protocols.

The processor 1610 is generally adapted for processing, including the execution of such programming stored on the storage medium 1604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processor 1610 is arranged to obtain, process and/or send data, control data access and storage, issue commands, and control other desired operations. The processor 1610 may include circuitry configured to implement desired programming provided by appropriate media in at least one example. For example, the processor 1610 may be implemented as one or more processors, one or more controllers, and/or other structure configured to execute executable programming Examples of the processor 1610 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processor 1610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processor 1610 are for illustration and other suitable configurations within the scope of the disclosure are also contemplated.

According to one or more aspects of the disclosure, the processor 1610 may be adapted to perform any or all of the features, processes, functions, operations and/or routines for any or all of the apparatuses described herein. For example, the processor 1610 may be configured to perform any of the steps, functions, and/or processes described with respect to FIGS. 1-15 and 17-22. As used herein, the term "adapted" in relation to the processor 1610 may refer to the processor 1610 being one or more of configured, used, implemented, and/or programmed to perform a particular process, function, operation and/or routine according to various features described herein.

The processor 1610 may be a specialized processor, such as an application specific integrated circuit (ASIC) that serves as a means for (e.g., structure for) carrying out any one of the operations described in conjunction with FIGS. 1-15 and 17-22. The processor 1610 may serve as one example of a means for transmitting and/or a means for receiving. In various implementations, the processor 1610 may incorporate the functionality of the base station 102 of FIG. 1 (e.g., the co-existence manager 112 and/or the scheduler 114), the base station 201 of FIG. 2, or the wireless communication device 302 of FIG. 3 (e.g., the co-existence manager 304).

According to at least one example of the apparatus 1600, the processor 1610 may include one or more of a circuit/module for communicating 1620, a circuit/module for determining whether an RF band is available 1622, a circuit/module for reserving 1624, a circuit/module for determining whether a token bucket contains a token 1626, a circuit/module for sending 1628, a circuit/module for waiting 1630, a circuit/module for receiving 1632, a circuit/module for determining at least one parameter 1634, a circuit/module for determining whether to communicate 1652, or a circuit/module for adding 1654. In various implementations, the circuit/module for communicating 1620, the circuit/module for determining whether an RF band is available 1622, the circuit/module for reserving 1624, the circuit/module for determining whether a token bucket contains a token 1626, the circuit/module for sending 1628, the circuit/module for waiting 1630, the circuit/module for receiving 1632, the circuit/module for determining at least one parameter 1634, the circuit/module for determining whether to communicate 1652, or the circuit/module for adding 1654 may correspond, at least in part, to the base station 102 of FIG. 1 (e.g., the co-existence manager 112 and/or the scheduler 114), the base station 201 of FIG. 2, or the wireless communication device 302 of FIG. 3 (e.g., the co-existence manager 304).

The circuit/module for communicating 1620 may include circuitry and/or programming (e.g., code for communicating 1636 stored on the storage medium 1604) adapted to perform several functions relating to, for example, communicating on a first RF band. In some aspects, the circuit/module for communicating 1620 may use a first type of RAT (e.g., a 5G RAT) for communicating (e.g., sending and/or receiving) information. In some aspects, the circuit/module for communicating 1620 may communicate on a second RF band during an access block using the first type of RAT as a result of the second RF band being reserved for communication (e.g., 5G communication). In some aspects, the circuit/module for communicating 1620 may send (e.g., send via a DL control channel to a UE) at least one parameter for a token bucket that a base station uses to access the second RF band. The at least one parameter may include, for example, the token fill rate and/or the maximum number of tokens for the token bucket. In some implementations, the circuit/module for communicating 1620 is a transceiver. In some implementations, the communication interface 1602 includes the circuit/module for communicating 1620 and/or the code for communicating 1636.

In implementations where the communicating involves receiving information, the circuit/module for communicating 1620 receives information (e.g., from the communication interface 1602 or some other component of the apparatus 1600), processes (e.g., decodes) the information, and sends the information to another component of the apparatus 1600 (e.g., the memory device 1608 or some other component). In some scenarios (e.g., if the circuit/module for communicating 1620 includes a receiver), the communicating involves the circuit/module for communicating 1620 receiving information directly from a device that transmitted the information.

In implementations where the communicating involves sending information, the circuit/module for communicating 1620 receives information (e.g., from a component of the apparatus 1600), processes (e.g., encodes) the information, and sends the information to another component (e.g., the communication interface 1602) that will transmit the information. In some scenarios (e.g., if the circuit/module for communicating 1620 includes a transmitter), the communicating involves the circuit/module for communicating 1620 transmitting the information directly to another device (e.g., the ultimate destination).

The circuit/module for determining whether an RF band is available 1622 may include circuitry and/or programming (e.g., code for determining whether an RF band is available 1638 stored on the storage medium 1604) adapted to perform several functions relating to, for example, determining, at a time based on a token arrival time, whether a second RF band is available for communication. In some aspects, this determination may include monitoring the second RF band using a second type of RAT (e.g., a Wi-Fi RAT). In some implementations, the circuit/module for determining whether an RF band is available 1622 performs CCA-related operations (e.g., as taught herein) to determine whether an RF band is available. In some implementations, the circuit/module for determining whether an RF band is available 1622 performs Wi-Fi-related operations (e.g., decoding Wi-Fi signals) to determine whether an RF band is available. In some implementations, the circuit/module for determining whether an RF band is available 1622 performs CTS-related operations (e.g., detecting CTS signals) to determine whether an RF band is available. In some implementations, the circuit/module for determining whether an RF band is available 1622 senses energy on a medium and compares the sensed energy to a threshold to determine whether an RF band is available. In some implementations, the circuit/module for determining whether an RF band is available 1622 is or includes a receiver. In some implementations, the communication interface 1602 includes the circuit/module for determining whether an RF band is available 1622 and/or the code for determining whether an RF band is available 1638.

The circuit/module for reserving 1624 may include circuitry and/or programming (e.g., code for reserving 1640 stored on the storage medium 1604) adapted to perform several functions relating to, for example, reserving the second RF band for communication of an access block if the determination indicates that the second RF band is available. In some aspects, the reservation may include sending a first reservation signal using the second type of RAT (e.g., a Wi-Fi RAT). In some implementations, the circuit/module for reserving 1624 performs CTS-related operations (e.g., sending CTS signals) to reserve an RF band. For example, the circuit/module for reserving 1624 may identify an appropriate time slot for sending a CTS (e.g., a slot preceding or within an access block) and then cause a CTS signal to be sent during that time slot. In some implementations, the circuit/module for reserving 1624 is or includes a transmitter. In some implementations, the communication interface 1602 includes the circuit/module for reserving 1624 and/or the code for reserving 1640.

The circuit/module for determining whether a token bucket contains a token 1626 may include circuitry and/or programming (e.g., code for determining whether a token bucket contains a token 1642 stored on the storage medium 1604) adapted to perform several functions relating to, for example, determining whether a token bucket contains a token after completion of communication during an access block. In some implementations, the circuit/module for determining whether a token bucket contains a token 1626 determines that an access block has completed (e.g., according to a 5G schedule for an RF band commonly used by Wi-Fi devices), then reads a value from a memory location corresponding to the token bucket, and then determines whether the value is non-zero.

The circuit/module for sending 1628 may include circuitry and/or programming (e.g., code for sending 1644 stored on the storage medium 1604) adapted to perform several functions relating to, for example, sending information. In some scenarios, the information is at least one token bucket parameter that a base station uses to access an RF band. In some scenarios, the information is a reservation signal. In some implementations, the reservation signal is a CTS. In some scenarios, the information is an indication that at least one parameter has changed. In some implementations, the circuit/module for sending 1622 is or includes a transmitter. In some implementations, the communication interface 1602 includes the circuit/module for sending 1628 and/or the code for sending 1644.

In some aspects, the circuit/module for sending 1628 sends the reservation signal if the token bucket contains a token. In some implementations, the circuit/module for sending 1628 receives an indication that the token bucket contains a token (e.g., the indication is retrieved from the memory device 1608, received from the circuit/module for determining whether a token bucket contains a token 1626, or received from some other component). Upon receipt of this indication, the circuit/module for sending 1628 may send a signal to reserve an RF band for communication. In this regard, the circuit/module for sending 1628 may perform operations similar to those described above for the circuit/module for reserving 1624.

In some aspects, the circuit/module for sending 1628 sends the reservation signal as a result of the receipt of another reservation signal (e.g., from a base station). In some implementations, the circuit/module for sending 1628 receives an indication that another reservation signal was received from a base station (e.g., the indication is retrieved from the memory device 1608, received from the circuit/module for receiving 1632, or received from some other component). Upon receipt of this indication, the circuit/module for sending 1628 may send a signal to reserve an RF band for communication (e.g., as discussed above).

The circuit/module for waiting 1630 may include circuitry and/or programming (e.g., code for waiting 1646 stored on the storage medium 1604) adapted to perform several functions relating to, for example, waiting for arrival of another token if the token bucket does not contain a token. In some implementations, the circuit/module for waiting 1630 receives an indication that the token bucket does not contain a token (e.g., from memory device 1608, the circuit/module for determining whether a token bucket contains a token 1626, or some other component). Upon receipt of that indication, the circuit/module for waiting 1630 may invoke a delay for a period of time (e.g., until the next token arrival time). Following this delay, the circuit/module for waiting 1630 may initiate another check of the token bucket (e.g., by the circuit/module for determining whether a token bucket contains a token 1626).

The circuit/module for receiving 1632 may include circuitry and/or programming (e.g., code for receiving 1648 stored on the storage medium 1604) adapted to perform several functions relating to, for example, receiving information. In some scenarios, the information is a request. In some scenarios, the information is a reservation signal received on the second RF band using the second type of RAT. In some aspects, this determination may include monitoring the second RF band using a second type of RAT (e.g., a Wi-Fi RAT). In some implementations, the circuit/module for receiving 1632 performs Wi-Fi-related operations (e.g., decoding Wi-Fi signals) to receive a reservation signal. In some implementations, the circuit/module for receiving 1632 performs CTS-related operations (e.g., detecting CTS signals) to receive a reservation signal. In some implementations, the circuit/module for receiving 1632 is or includes a receiver. In some implementations, the communication interface 1602 includes the circuit/module for receiving 1632 and/or the code for receiving 1648.

The circuit/module for determining at least one parameter 1634 may include circuitry and/or programming (e.g., code for determining at least one parameter 1650 stored on the storage medium 1604) adapted to perform several functions relating to, for example, determining at least one parameter for a token bucket. In some aspects, the at least one parameter may be a token arrival time. In some aspects, the determination of the at least one parameter is based on a rate of traffic communicated using a first type of RAT and/or a rate of traffic communicated using a second type of RAT. In some implementations, the circuit/module for determining at least one parameter 1634 determines a token arrival rate based on a traffic rate. As one example, the token arrival rate may be defined as X (e.g., 1.1) times the traffic rate. The token arrival rate may be defined in other ways in other implementations. The circuit/module for determining at least one parameter 1634 may then determine a token arrival time (e.g., a particular time slot) based on the token arrival rate and, optionally, other information (e.g., a 5G communication schedule).

In some implementations, the circuit/module for determining at least one parameter 1634 determines the traffic rate. For example, the circuit/module for determining at least one parameter 1634 may obtain information about traffic on a medium and calculate a traffic rate based on that information. This information may be obtained, for example, by directly monitoring the medium (e.g., via a receiver using the necessary RAT) or by receiving the information from another component (e.g., a receiver or the memory device 1608).

The circuit/module for determining whether to communicate 1652 may include circuitry and/or programming (e.g., code for determining whether to communicate 1656 stored on the storage medium 1604) adapted to perform several functions relating to, for example, determining whether to communicate on an RF band during an access block. In some aspects, the circuit/module for determining whether to communicate 1652 may make this determination based on whether the RF band is available for communication. In some implementations, the circuit/module for determining whether to communicate 1652 receives an indication of whether the RF band is available (e.g., retrieved from the memory device 1608, received from the circuit/module for determining whether an RF band is available 1622, or received from some other component). If the RF band is available, the circuit/module for determining whether to communicate 1652 may then commence communication on the RF band (e.g., if a synchronization signal is received). In some implementations, the circuit/module for determining whether to communicate 1652 may reserve the medium (e.g., by sending a CTS).

The circuit/module for adding 1654 may include circuitry and/or programming (e.g., code for adding 1658 stored on the storage medium 1604) adapted to perform several functions relating to, for example, adding a token to the token bucket if the RF band is not available for the communication of the access block. In some implementations, the circuit/module for adding 1654 receives an indication that the RF band is not available (e.g., from memory device 1608, the circuit/module for determining whether an RF band is available 1622, or some other component). Upon receipt of that indication, the circuit/module for adding 1654 may increment a value stored (e.g., in the memory device 1608) as the token bucket count.

As mentioned above, programming stored by the storage medium 1604, when executed by the processor 1610, causes the processor 1610 to perform one or more of the various functions and/or process operations described herein. For example, the storage medium 1604 may include one or more of the code for communicating 1636, the code for determining whether an RF band is available 1638, the code for reserving 1640, the code for determining whether a token bucket contains a token 1642, the code for sending 1644, the code for waiting 1646, the code for receiving 1648, the code for determining at least one parameter 1650, the code for determining whether to communicate 1656, or the code for adding 1658.

First Example Process

Figure 17:
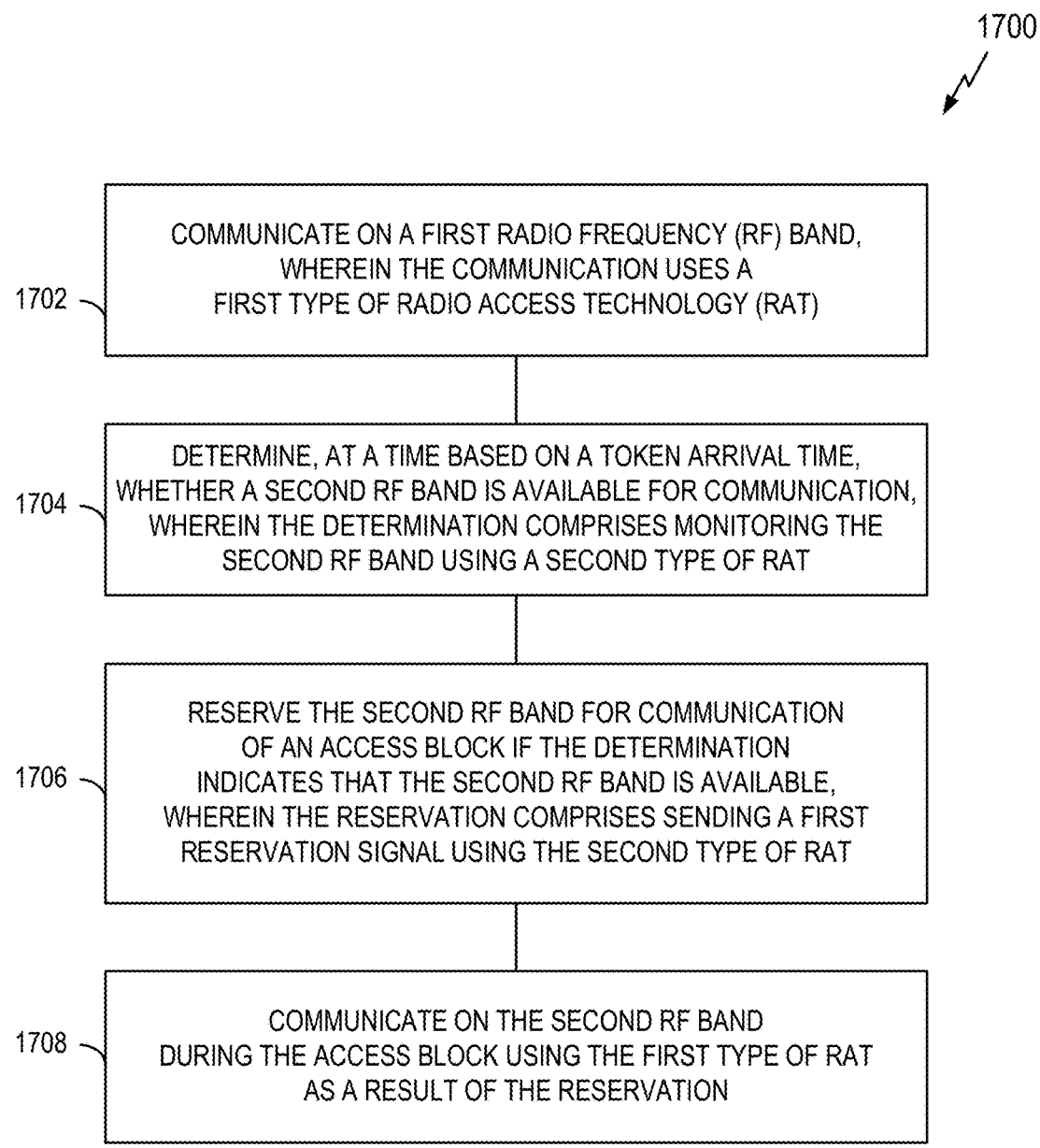
FIG. 17 is a flow diagram illustrating an example of a communication process in accordance with some aspects of the disclosure.

FIG. 17 illustrates a process 1700 for communication in accordance with some aspects of the disclosure. The process 1700 may take place within a processing circuit (e.g., the processor 1610 of FIG. 16), which may be located in a base station, an access terminal, or some other suitable apparatus. In some implementations, the process 1700 represents operations performed, at least in part, by the base station 102 of FIG. 1, the base station 201 of FIG. 2, or the wireless communication device 302 of FIG. 3. Of course, in various aspects within the scope of the disclosure, the process 1700 may be implemented by any suitable apparatus capable of supporting communication-related operations as taught herein.

At block 1702, an apparatus (e.g., a base station) communicates on a first radio frequency (RF) band. In some aspects, this communication may use a first type of radio access technology (RAT). In some aspects, the first type of RAT may be $5^{th}$ Generation Mobile Telecommunications technology. For example, a base station may use 5G technology to communicate with a UE on the first RF band. In some aspects, this communication may involve the base station sending to a UE, via PDCCH, at least one parameter for a token bucket that the base station uses to access a second RF band. The at least one parameter may include, for example, the token fill rate and/or the maximum number of tokens for the token bucket.

In some implementations, the circuit/module for communicating 1620 of FIG. 16 performs the operations of block 1702. In some implementations, the code for communicating 1636 of FIG. 16 is executed to perform the operations of block 1702.

At block 1704, the apparatus determines, at a time based on a token arrival time, whether a second RF band is available for communication. In some aspects, this determination may involve monitoring the second RF band using a second type of RAT. In some aspects, the second type of RAT may be wireless local area network (WLAN) technology. For example, a base station may use Wi-Fi technology to monitor the second RF band.

In the event the second RF band is not currently available for communication, the apparatus may continue determining (e.g., repeatedly determine) whether the second RF band is available for communication. In some aspects, the determination of whether the second RF band is available for communication is performed for up to a defined number of sub-frames of the access block. In some aspects, the determination of whether the second RF band is available for communication is performed for up to a defined amount of time.

In some scenarios, but not necessarily all scenarios, the second RF band may be conventionally used for communication by devices using one type of RAT (e.g., Wi-Fi technology) while the first RF band may be conventionally used by devices for communication using another type of RAT (e.g., 5G technology).

The first and second RF bands might or might not overlap. In some scenarios, the second RF band does not overlap with the first RF band. In some scenarios, the second RF band partially overlaps with the first RF band. In some scenarios, the second RF band is entirely within the first RF band. In some scenarios, the first RF band is entirely within the second RF band.

In some implementations, the circuit/module for determining whether an RF band is available 1622 of FIG. 16 performs the operations of block 1704. In some implementations, the code for determining whether an RF band is available 1638 of FIG. 16 is executed to perform the operations of block 1704.

At block 1706, the apparatus reserves the second RF band for communication of an access block if the determination of block 1704 indicates that the second RF band is available. In some aspects, this reservation may involve sending a first reservation signal using the second type of RAT. In some aspects, the first reservation signal may be a clear-to-send (CTS). In some aspects, the CTS includes an indication that the CTS is associated with the first type of RAT. For example, the CTS may include a 5G address.

The apparatus may send the reservation signal at different times in different implementations. In some aspects, the first reservation signal may precede the access block. In some aspects, the first reservation signal may be within the access block.

In some implementations, the circuit/module for reserving 1624 of FIG. 16 performs the operations of block 1706. In some implementations, the code for reserving 1640 of FIG. 16 is executed to perform the operations of block 1706. In some implementations, a single component (e.g., a circuit/module or code) may perform the operations of blocks 1704 and 1706.

At block 1708, as a result of the reservation, the apparatus communicates on the second RF band during the access block using the first type of RAT. In some aspects, the communicating on the second RF band during the access block includes commencing the communicating on the second RF band by sending a downlink signal. For example, a base station may transmit a downlink signal during the first portion of the first sub-frame of a sub-frame sequence (e.g., for a DL-centric sub-frame or an UL-centric sub-frame).

In some implementations, the circuit/module for communicating 1620 of FIG. 16 performs the operations of block 1708. In some implementations, the code for communicating 1636 of FIG. 16 is executed to perform the operations of block 1708.

Second Example Process

Figure 18:
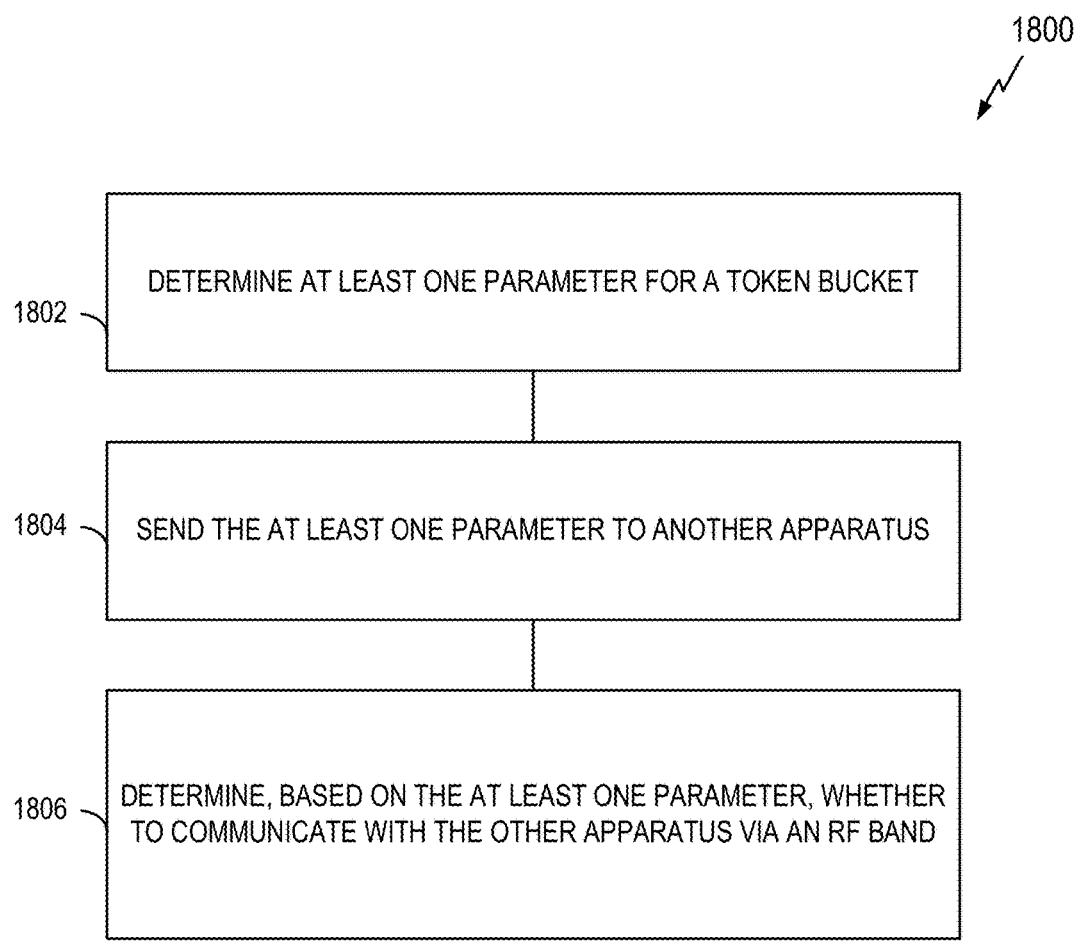
FIG. 18 is a flow diagram illustrating another example of a communication process in accordance with some aspects of the disclosure.

FIG. 18 illustrates a process 1800 for communication in accordance with some aspects of the disclosure. In some implementations, the process 1800 may be performed in addition to (e.g., in conjunction with) the process 1700 of FIG. 17. The process 1800 may take place within a processing circuit (e.g., the processor 1610 of FIG. 16), which may be located in a base station, an access terminal, or some other suitable apparatus. In some implementations, the process 1800 represents operations performed, at least in part, by the base station 102 of FIG. 1, the base station 201 of FIG. 2, or the wireless communication device 302 of FIG. 3. Of course, in various aspects within the scope of the disclosure, the process 1800 may be implemented by any suitable apparatus capable of supporting communication-related operations as taught herein.

At block 1802, an apparatus (e.g., a base station) determines at least one parameter for a token bucket. In some aspects, the determination of the at least one parameter may be based on at least one of: a rate of traffic communicated by the apparatus using a first type of radio access technology (RAT), a rate of traffic communicated by the apparatus using a second type of RAT, or any combination thereof. In some aspects, the first type of RAT may include 5th Generation Mobile Telecommunications technology and the second type of RAT may include wireless local area network (WLAN) technology.

The at least one parameter may take various forms. In some aspects, the at least one parameter may include a token fill rate for the token bucket. In some aspects, the at least one parameter may include a maximum number of tokens for the token bucket. In some aspects, the at least one parameter may include the number of tokens currently in the token bucket. In some aspects, the at least one parameter may include a token arrival time for the token bucket.

In some implementations, the circuit/module for determining at least one parameter 1634 of FIG. 16 performs the operations of block 1802. In some implementations, the code for determining at least one parameter 1650 of FIG. 16 is executed to perform the operations of block 1802.

At block 1804, the apparatus sends the at least one parameter to another apparatus. In some aspects, the sending of the at least one parameter may include broadcasting the at least one parameter via a control channel.

In some implementations, the circuit/module for sending 1628 of FIG. 16 performs the operations of block 1804. In some implementations, the code for sending 1644 of FIG. 16 is executed to perform the operations of block 1804.

At block 1806, the apparatus determines, based on the at least one parameter, whether to communicate with the other apparatus via a radio frequency (RF) band.

In some aspects, the determination of whether to communicate with the other apparatus via the RF band may include determining, at a time based on the token arrival time, whether the RF band is available for communication of an access block. In this case, the process 1800 may further include adding a token to the token bucket if the RF band is not available for the communication of the access block. In some aspects, the determination of whether the RF band is available for the communication of the access block may be performed for up to a defined number of sub-frames of the access block.

In some aspects, the process 1800 may further include sending a reservation signal if the RF band is available, wherein the reservation signal is to reserve the RF band for communication of the access block. In this case, the process 1800 may further include communicating with the other apparatus on the RF band after the reservation signal is sent, wherein the communicating is during the access block.

In some implementations, the circuit/module for determining whether to communicate 1652 of FIG. 16 performs the operations of block 1806. In some implementations, the code for determining whether to communicate 1656 of FIG. 16 is executed to perform the operations of block 1806.

In some aspects, the process 1800 may further include sending an indication that the at least one parameter has changed and receiving a request for the at least one parameter from the other apparatus. In this case, the at least one parameter may be sent (block 1804) in response to the request.

Third Example Process

Figure 19:
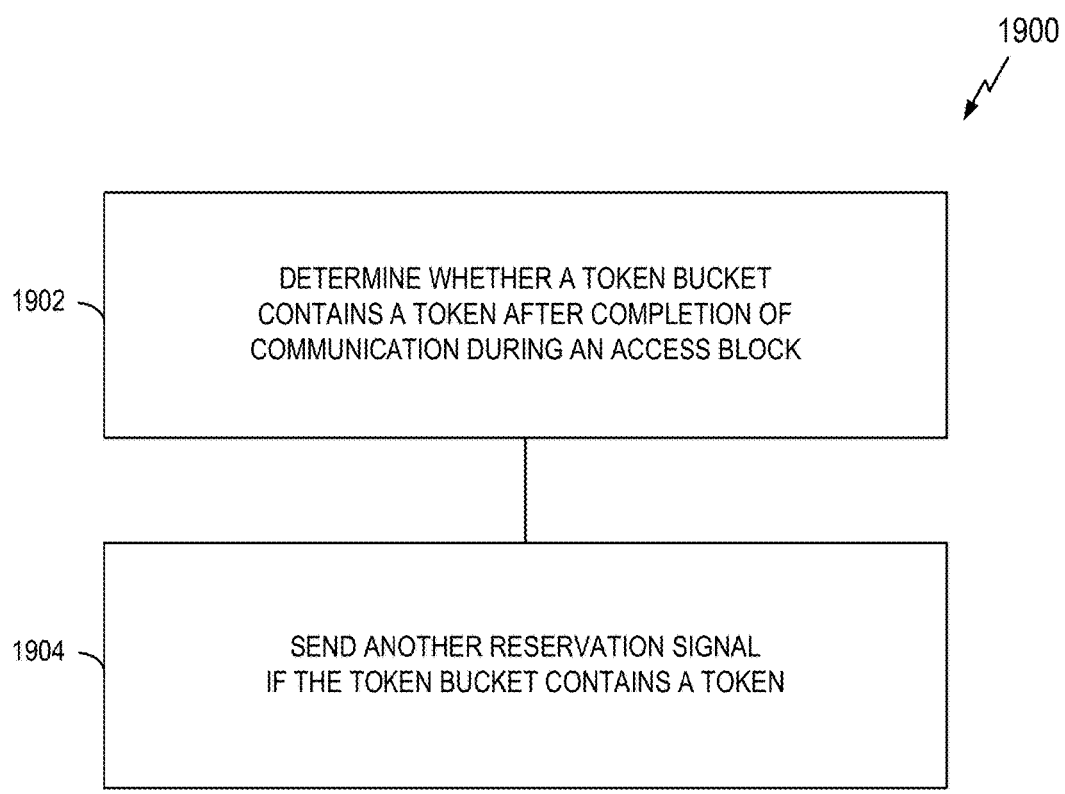
FIG. 19 is a flow diagram illustrating an example of a token bucket-based process in accordance with some aspects of the disclosure.

FIG. 19 illustrates a process 1900 for communication in accordance with some aspects of the disclosure. In some implementations, the process 1900 may be performed in addition to (e.g., in conjunction with) the process 1700 of FIG. 17 and/or the process 1800 of FIG. 18. The process 1900 may take place within a processing circuit (e.g., the processor 1610 of FIG. 16), which may be located in a base station, an access terminal, or some other suitable apparatus. In some implementations, the process 1900 represents operations performed, at least in part, by the base station 102 of FIG. 1, the base station 201 of FIG. 2, or the wireless communication device 302 of FIG. 3. Of course, in various aspects within the scope of the disclosure, the process 1900 may be implemented by any suitable apparatus capable of supporting communication-related operations as taught herein.

At block 1902, an apparatus (e.g., a base station) determines whether a token bucket contains a token after completion of communication during the access block. For example, a base station may invoke this determination if, upon completion of the access block, the base station has more data to send or expects to receive more data (e.g., from a UE).

In some implementations, the circuit/module for determining whether a token bucket contains a token 1626 of FIG. 16 performs the operations of block 1902. In some implementations, the code for determining whether a token bucket contains a token 1642 of FIG. 16 is executed to perform the operations of block 1902.

At block 1904, the apparatus sends another reservation signal if the token bucket contains a token. For example, a base station may send a CTS to immediately contend to access a medium as discussed above in conjunction with the timing diagram 404 of FIG. 4.

In some implementations, the circuit/module for sending 1628, the circuit/module for reserving 1624, or the circuit/module for communicating 1620 of FIG. 16 performs the operations of block 1904. In some implementations, the code for sending 1644, the code for reserving 1640, or the code for communicating 1636 of FIG. 16 is executed to perform the operations of block 1904.

Fourth Example Process

Figure 20:
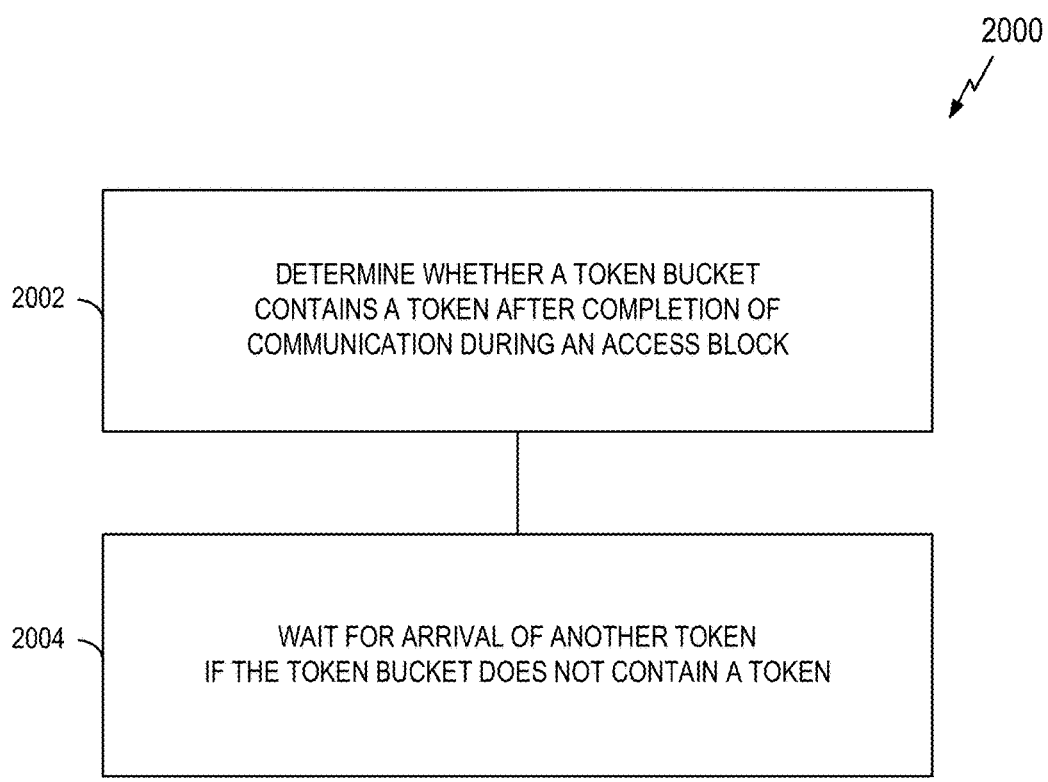
FIG. 20 is a flow diagram illustrating an example of a token bucket-based process in accordance with some aspects of the disclosure.

FIG. 20 illustrates a process 2000 for communication in accordance with some aspects of the disclosure. In some implementations, the process 2000 may be performed in addition to (e.g., in conjunction with) the process 1700 of FIG. 17 and/or the process 1800 of FIG. 18. The process 2000 may take place within a processing circuit (e.g., the processor 1610 of FIG. 16), which may be located in a base station, an access terminal, or some other suitable apparatus. In some implementations, the process 2000 represents operations performed, at least in part, by the base station 102 of FIG. 1, the base station 201 of FIG. 2, or the wireless communication device 302 of FIG. 3. Of course, in various aspects within the scope of the disclosure, the process 2000 may be implemented by any suitable apparatus capable of supporting communication-related operations as taught herein.

At block 2002, an apparatus (e.g., a base station) determines whether a token bucket contains a token after completion of communication during the access block. For example, a base station may invoke this determination if, upon completion of the access block, the base station has more data to send or expects to receive more data (e.g., from a UE).

In some implementations, the circuit/module for determining whether a token bucket contains a token 1626 of FIG. 16 performs the operations of block 2002. In some implementations, the code for determining whether a token bucket contains a token 1642 of FIG. 16 is executed to perform the operations of block 2002.

At block 2004, the apparatus waits for arrival of another token if the token bucket does not contain a token. For example, a base station may wait for a token arrival time to access a medium as discussed above in conjunction with the timing diagram 402 of FIG. 4. In some aspects, if the token bucket does not contain a token, the apparatus may wait for arrival of another token before sending another reservation signal.

In some implementations, the circuit/module for waiting 1630 of FIG. 16 performs the operations of block 2004. In some implementations, the code for waiting 1646 of FIG. 16 is executed to perform the operations of block 2004.

Fifth Example Process

Figure 21:
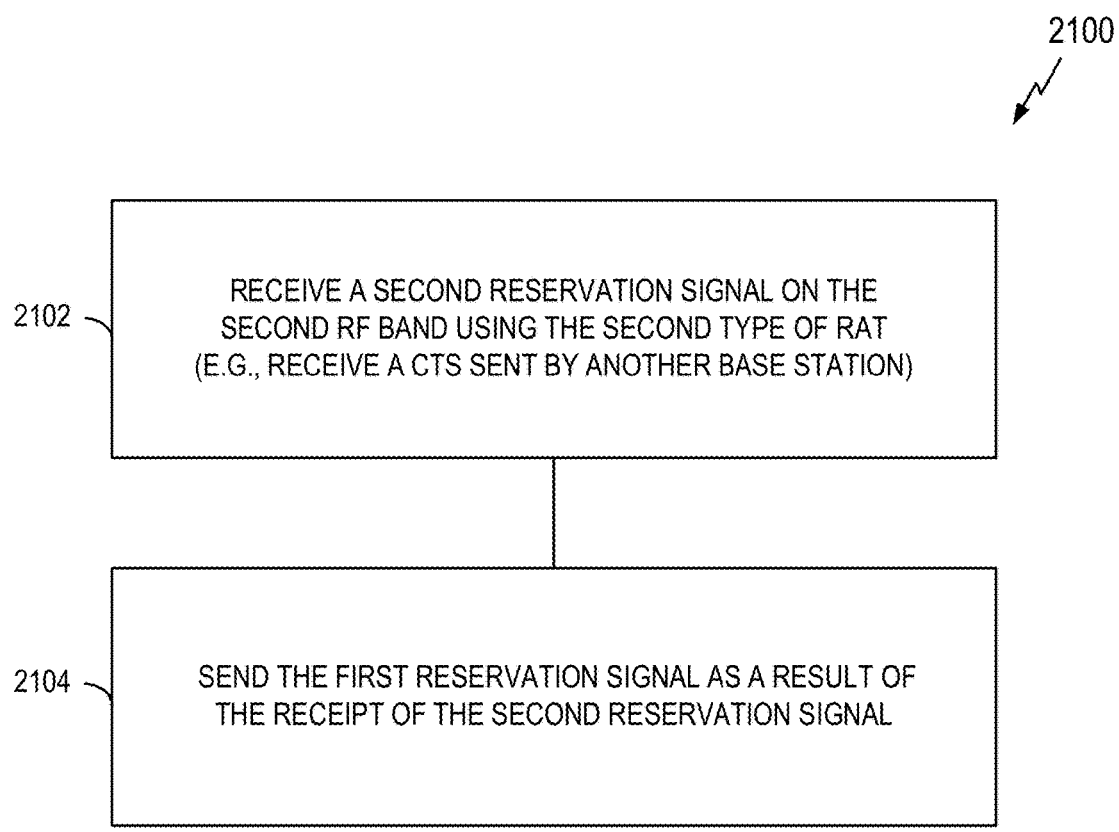
FIG. 21 is a flow diagram illustrating an example of a reservation signal process in accordance with some aspects of the disclosure.

FIG. 21 illustrates a process 2100 for communication in accordance with some aspects of the disclosure. In some implementations, the process 2100 may be performed in addition to (e.g., in conjunction with) the process 1700 of FIG. 17 and/or the process 1800 of FIG. 18. The process 2100 may take place within a processing circuit (e.g., the processor 1610 of FIG. 16), which may be located in a base station, an access terminal, or some other suitable apparatus. In some implementations, the process 2100 represents operations performed, at least in part, by the base station 102 of FIG. 1, the base station 201 of FIG. 2, or the wireless communication device 302 of FIG. 3. Of course, in various aspects within the scope of the disclosure, the process 2100 may be implemented by any suitable apparatus capable of supporting communication-related operations as taught herein.

At block 2102, an apparatus (e.g., a base station) receives a second reservation signal on the second RF band using the second type of RAT. For example, a first base station may receive a CTS that was transmitted by a second base station as discussed above in conjunction with FIG. 15. In some aspects, a first access block (e.g., associated with the first reservation signal) overlaps another access block that is associated with the second reservation signal. For example, these access blocks could correspond to the access blocks 1510 and 1512 of FIG. 15.

In some implementations, the circuit/module for receiving 1632 or the circuit/module for determining whether an RF band is available 1622 of FIG. 16 performs the operations of block 2102. In some implementations, the code for receiving 1648 or the code for determining whether an RF band is available 1638 of FIG. 16 is executed to perform the operations of block 2102.

At block 2104, the apparatus sends the first reservation signal as a result of the receipt of the second reservation signal. For example, the first base station mentioned above may transmit a CTS in response to the receipt of the CTS from the second base station as discussed above in conjunction with FIG. 15.

In some implementations, the circuit/module for reserving 1624 or the circuit/module for sending 1628 of FIG. 16 performs the operations of block 2104. In some implementations, the code for reserving 1640 or the code for sending 1644 of FIG. 16 is executed to perform the operations of block 2104.

Sixth Example Process

Figure 22:
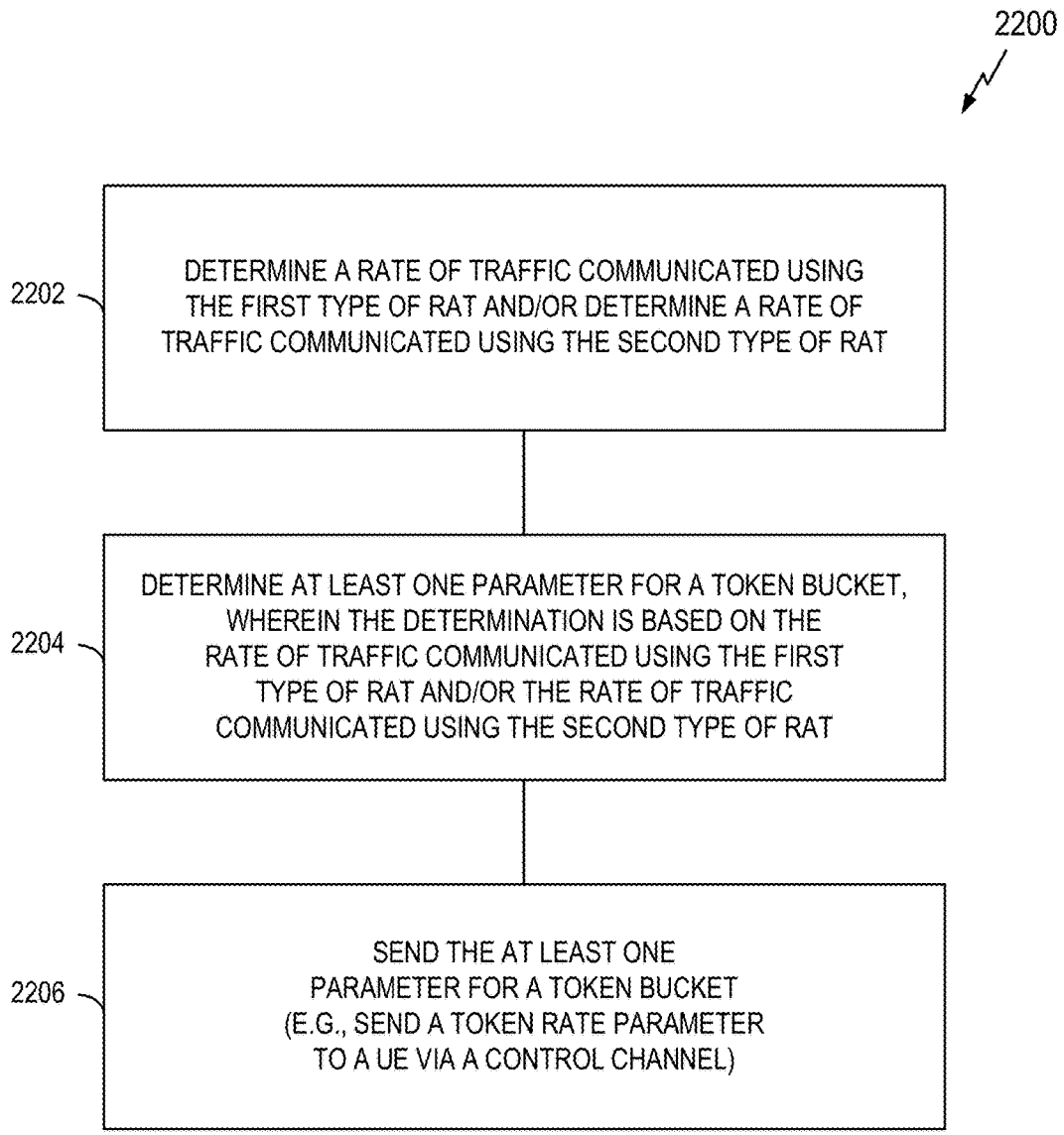
FIG. 22 is a flow diagram illustrating an example of a token bucket-related process in accordance with some aspects of the disclosure.

FIG. 22 illustrates a process 2200 for communication in accordance with some aspects of the disclosure. In some implementations, the process 2200 may be performed in addition to (e.g., in conjunction with) the process 1700 of FIG. 17 and/or the process 1800 of FIG. 18. The process 2200 may take place within a processing circuit (e.g., the processor 1610 of FIG. 16), which may be located in a base station, an access terminal, or some other suitable apparatus. In some implementations, the process 2200 represents operations performed, at least in part, by the base station 102 of FIG. 1, the base station 201 of FIG. 2, or the wireless communication device 302 of FIG. 3. Of course, in various aspects within the scope of the disclosure, the process 2200 may be implemented by any suitable apparatus capable of supporting communication-related operations as taught herein.

At block 2202, an apparatus (e.g., a base station) determines a rate of traffic communicated using the first type of RAT and/or determines a rate of traffic communicated using the second type of RAT. For example, a base station may monitor this traffic and thereby measure the corresponding traffic rate. As another example, a base station may receive an indication of this rate from at least one other entity (e.g., at least one network entity and/or at least one other base station).

In some implementations, the circuit/module for determining at least one parameter 1634, the circuit/module for communicating 1620, or the circuit/module for determining whether an RF band is available 1622 of FIG. 16 performs the operations of block 2202. In some implementations, the code for determining at least one parameter 1650, the code for communicating 1636, or the code for determining whether an RF band is available 1638 of FIG. 16 is executed to perform the operations of block 2202.

At block 2204, the apparatus determines at least one parameter for a token bucket, wherein the determination of the at least one parameter is based on the rate of traffic communicated using the first type of RAT and/or the rate of traffic communicated using the second type of RAT determined at block 2202. For example, the token arrival rate may be set to be at least 10% higher than a traffic arrival rate.

In some implementations, the circuit/module for determining at least one parameter 1634 of FIG. 16 performs the operations of block 2204. In some implementations, the code for determining at least one parameter 1650 of FIG. 16 is executed to perform the operations of block 2204.

At block 2206, the apparatus sends the at least one parameter for a token bucket that was determined at block 2204 (or determined in some other manner). For example, a base station may send an indication of the token arrival rate to a UE via a control channel (e.g., PDCCH). Accordingly, token bucket operations of the UE can be synchronized with token bucket operations of the base station.

In some implementations, the circuit/module for sending 1628 or the circuit/module for communicating 1620 of FIG. 16 performs the operations of block 2206. In some implementations, the code for sending 1644 or the code for communicating 1636 of FIG. 16 is executed to perform the operations of block 2206.

Second Example Apparatus

Figure 23:
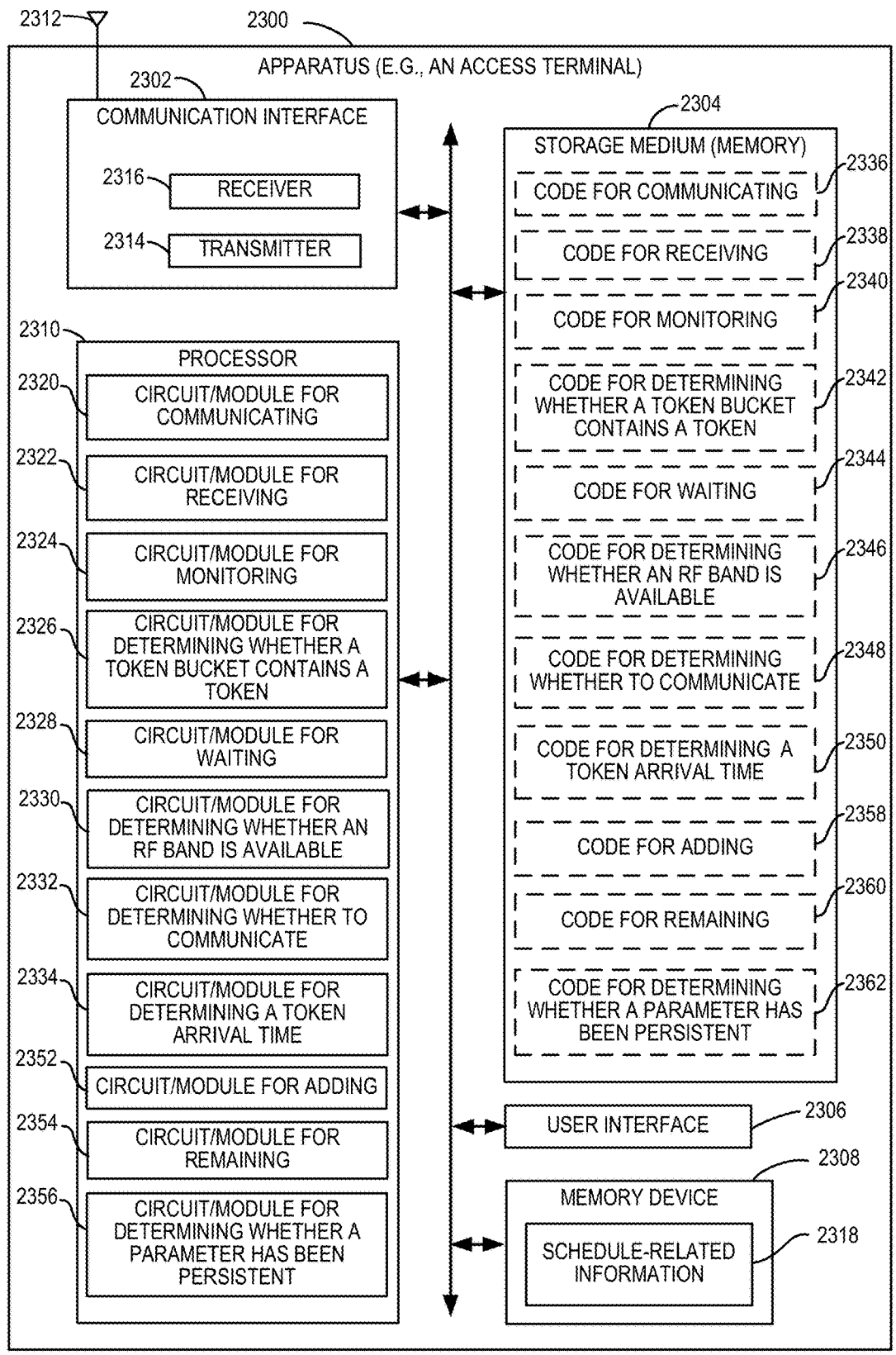
FIG. 23 illustrates a block diagram of another example hardware implementation for an apparatus (e.g., an electronic device) that can support communication in accordance with some aspects of the disclosure.

FIG. 23 is an illustration of an apparatus 2300 that may support scheduling according to one or more aspects of the disclosure. The apparatus 2300 could embody or be implemented within an access terminal (e.g., a user equipment), a base station, or some other type of device that supports wireless communication. In various implementations, the apparatus 2300 could embody or be implemented within a mobile device, an access point, or some other type of device. In various implementations, the apparatus 2300 could embody or be implemented within a mobile phone, a smart phone, a tablet, a portable computer, a server, a personal computer, a sensor, an entertainment device, a medical device, or any other electronic device having circuitry.

The apparatus 2300 includes a communication interface (e.g., at least one transceiver) 2302, a storage medium 2304, a user interface 2306, a memory device 2308 (e.g., storing schedule-related information 2318), and a processor 2310 (e.g., a processing circuit). In various implementations, the user interface 2306 may include one or more of: a keypad, a display, a speaker, a microphone, a touchscreen display, of some other circuitry for receiving an input from or sending an output to a user. The communication interface 2302 may be coupled to one or more antennas 2312, and may include a transmitter 2314 and a receiver 2316. In general, the components of FIG. 23 may be similar to corresponding components of the apparatus 1600 of FIG. 16.

According to one or more aspects of the disclosure, the processor 2310 may be adapted to perform any or all of the features, processes, functions, operations and/or routines for any or all of the apparatuses described herein. For example, the processor 2310 may be configured to perform any of the steps, functions, and/or processes described with respect to FIGS. 1-15 and 24-30. As used herein, the term "adapted" in relation to the processor 2310 may refer to the processor 2310 being one or more of configured, used, implemented, and/or programmed to perform a particular process, function, operation and/or routine according to various features described herein.

The processor 2310 may be a specialized processor, such as an application specific integrated circuit (ASIC) that serves as a means for (e.g., structure for) carrying out any one of the operations described in conjunction with FIGS. 1-15 and 24-30. The processor 2310 may serve as one example of a means for transmitting and/or a means for receiving. In various implementations, the processing 2310 may incorporate the functionality of the UE 104 of FIG. 1, the wireless communication node 216, 222, or 230 of FIG. 2, or the IoE device 236 or 242 of FIG. 2.

According to at least one example of the apparatus 2300, the processor 2310 may include one or more of a circuit/module for communicating 2320, a circuit/module for receiving 2322, a circuit/module for monitoring 2324, a circuit/module for determining whether a token bucket contains a token 2326, a circuit/module for waiting 2328, a circuit/module for determining whether an RF band is available 2330, a circuit/module for determining whether to communicate 2332, a circuit/module for determining a token arrival time 2334, a circuit/module for adding 2352, a circuit/module for remaining 2354, or a circuit/module for determining whether a parameter has been persistent 2356. In various implementations, the circuit/module for communicating 2320, the circuit/module for receiving 2322, the circuit/module for monitoring 2324, the circuit/module for determining whether a token bucket contains a token 2326, the circuit/module for waiting 2328, the circuit/module for determining whether an RF band is available 2330, the circuit/module for determining whether to communicate 2332, the circuit/module for determining a token arrival time 2334, the circuit/module for adding 2352, the circuit/module for remaining 2354, or the circuit/module for determining whether a parameter has been persistent 2356 may correspond, at least in part, to the UE 104 of FIG. 1, the wireless communication node 216, 222, or 230 of FIG. 2, or the IoE device 236 or 242 of FIG. 2.

The circuit/module for communicating 2320 may include circuitry and/or programming (e.g., code for communicating 2336 stored on the storage medium 2304) adapted to perform several functions relating to, for example, communicating information (e.g., on a first RF band). In some aspects, the circuit/module for communicating 2320 may use a first type of RAT (e.g., a 5G RAT) for communicating (e.g., sending and/or receiving) information. In some aspects, the circuit/module for communicating 2320 may communicate on a second RF band during an access block using the first type of RAT if a signal is detected on the second RF band. In some implementations, the circuit/module for communicating 2320 is a transceiver. In some implementations, the communication interface 2302 includes the circuit/module for communicating 2320 and/or the code for communicating 2336.

In implementations where the communicating involves receiving information, the circuit/module for communicating 2320 receives information (e.g., from the communication interface 2302 or some other component of the apparatus 2300), processes (e.g., decodes) the information, and sends the information to another component of the apparatus 2300 (e.g., the memory device 2308 or some other component). In some scenarios (e.g., if the circuit/module for communicating 2320 includes a receiver), the communicating involves the circuit/module for communicating 2320 receiving information directly from a device that transmitted the information.

In implementations where the communicating involves sending information, the circuit/module for communicating 2320 receives information (e.g., from a component of the apparatus 2300), processes (e.g., encodes) the information, and sends the information to another component (e.g., the communication interface 2302) that will transmit the information. In some scenarios (e.g., if the circuit/module for communicating 2320 includes a transmitter), the communicating involves the circuit/module for communicating 2320 transmitting the information directly to another device (e.g., the ultimate destination).

In some implementations, the sent information includes a request for a current version of at least one parameter. For example, this request may be sent as a result of receiving an indication from another apparatus that the at least one parameter has changed. As another example, this request may be sent if the at least one parameter is older than an age limit (e.g., a parameter has been persistent for a threshold period of time).

The circuit/module for receiving 2322 may include circuitry and/or programming (e.g., code for receiving 2338 stored on the storage medium 2304) adapted to perform several functions relating to, for example, receiving information. In some aspects, the information includes a communication schedule and token bucket information. In some aspects, the information includes at least one parameter for a token bucket that a base station uses to access the second RF band. In some aspects, the information includes an indication that at least one parameter has changed. In some aspects, the information may be received via a DL control channel. The at least one parameter may include, for example, the token fill rate and/or the maximum number of tokens for the token bucket. In some aspects, the monitoring may involve use of the first type of RAT (e.g., a 5G RAT) or some other type of RAT. In some implementations, the circuit/module for receiving 2322 is or includes a receiver. In some implementations, the communication interface 2302 includes the circuit/module for receiving 2322 and/or the code for receiving 2338. In some implementations, the circuit/module for communicating 2320 provides the functionality of the circuit/module for receiving 2322. In some implementations, the code for communicating 2336 provides the functionality of the code for receiving 2338.

The circuit/module for monitoring 2324 may include circuitry and/or programming (e.g., code for monitoring 2340 stored on the storage medium 2304) adapted to perform several functions relating to, for example, monitoring, at a time based on token bucket information, for a signal on a second RF band. In some aspects, the monitoring may involve use of the first type of RAT (e.g., a 5G RAT). In some implementations, the circuit/module for monitoring 2324 may invoke monitoring for another signal if the token bucket contains a token. In some implementations, the circuit/module for monitoring 2324 may invoke the monitoring at a time associated with arrival of a token for the token bucket. In either case, the circuit/module for monitoring 2324 may monitor for a synchronization signal from a base station. In some implementations, the circuit/module for monitoring 2324 senses energy on a medium and compares the sensed energy to a threshold to determine whether a signal has been received. In some implementations, the circuit/module for monitoring 2324 is or includes a receiver. In some implementations, the communication interface 2302 includes the circuit/module for monitoring 2324 and/or the code for monitoring 2340. In some implementations, the circuit/module for communicating 2320 provides the functionality of the circuit/module for monitoring 2324. In some implementations, the code for communicating 2336 provides the functionality of the code for monitoring 2340.

The circuit/module for determining whether a token bucket contains a token 2326 may include circuitry and/or programming (e.g., code for determining whether a token bucket contains a token 2342 stored on the storage medium 2304) adapted to perform several functions relating to, for example, determining whether a token bucket contains a token after completion of communication during an access block. In some implementations, the circuit/module for determining whether a token bucket contains a token 2326 determines that an access block has completed (e.g., according to a 5G schedule for an RF band commonly used by Wi-Fi devices), then reads a value from a memory location corresponding to the token bucket, and then determines whether the value is non-zero.

The circuit/module for waiting 2328 may include circuitry and/or programming (e.g., code for waiting 2344 stored on the storage medium 2304) adapted to perform several functions relating to, for example, waiting for arrival of another token if the token bucket does not contain a token. In some implementations, the circuit/module for waiting 2328 receives an indication that the token bucket does not contain a token (e.g., from memory device 2308, the circuit/module for determining whether a token bucket contains a token 2326, or some other component). Upon receipt of this indication, the circuit/module for waiting 2328 may invoke a delay for a period of time (e.g., until the next token arrival time). Following this delay, the circuit/module for waiting 2328 may initiate another check of the token bucket (e.g., by the circuit/module for determining whether a token bucket contains a token 2326).

The circuit/module for determining whether an RF band is available 2330 may include circuitry and/or programming (e.g., code for determining whether an RF band is available 2346 stored on the storage medium 2304) adapted to perform several functions relating to, for example, determining whether a second RF band is available for communication. In some aspects, this determination may include monitoring the second RF band using a second type of RAT (e.g., a Wi-Fi RAT). In some implementations, the circuit/module for determining whether an RF band is available 2330 performs CCA-related operations (e.g., as taught herein) to determine whether an RF band is available. In some implementations, the circuit/module for determining whether an RF band is available 2330 performs Wi-Fi-related operations (e.g., decoding Wi-Fi signals) to determine whether an RF band is available. In some implementations, the circuit/module for determining whether an RF band is available 2330 performs CTS-related operations (e.g., detecting CTS signals) to determine whether an RF band is available. In some implementations, the circuit/module for determining whether an RF band is available 2330 senses energy on a medium and compares the sensed energy to a threshold to determine whether an RF band is available. In some implementations, the circuit/module for determining whether an RF band is available 2330 is or includes a receiver. In some implementations, the communication interface 2302 includes the circuit/module for determining whether an RF band is available 2330 and/or the code for determining whether an RF band is available 2346.

The circuit/module for determining whether to communicate 2332 may include circuitry and/or programming (e.g., code for determining whether to communicate 2348 stored on the storage medium 2304) adapted to perform several functions relating to, for example, determining whether to communicate on an RF band during an access block. In some aspects, the circuit/module for determining whether to communicate 2332 may make this determination based on at least one received parameter (e.g., a token bucket parameter such as a token arrival time). In some aspects, the circuit/module for determining whether to communicate 2332 may make this determination based on whether a signal (e.g., a synchronization signal) was received on the second RF band. In some aspects, the circuit/module for determining whether to communicate 2332 may make this determination based on whether the second RF band is available for communication. In some implementations, the circuit/module for determining whether to communicate 2332 receives an indication of whether the second RF band is available (e.g., retrieved from the memory device 2308, received from the circuit/module for determining whether an RF band is available 2330, or received from some other component). If the second RF band is available, the circuit/module for determining whether to communicate 2332 may then commence communication on the second RF band (e.g., if a synchronization signal is received). In some implementations, the circuit/module for determining whether to communicate 2332 may reserve the medium (e.g., by sending a CTS).

The circuit/module for determining a token arrival time 2334 may include circuitry and/or programming (e.g., code for determining a token arrival time 2350 stored on the storage medium 2304) adapted to perform several functions relating to, for example, determining a token arrival time based on at least one token bucket parameter. In some aspects, the circuit/module for determining a token arrival time 2334 identifies a particular time slot in which the next token will arrive based on the token arrival rate and, optionally, other information (e.g., a 5G communication schedule).

The circuit/module for adding 2352 may include circuitry and/or programming (e.g., code for adding 2358 stored on the storage medium 2304) adapted to perform several functions relating to, for example, adding a token to the token bucket if a signal is not received. In some implementations, the circuit/module for adding 2352 receives an indication of whether a signal was received (e.g., from memory device 2308, the circuit/module for monitoring 2324, or some other component). Upon receipt of that indication, the circuit/module for adding 2352 may increment a value stored (e.g., in the memory device 2308) as the token bucket count if the indication indicates, for example, that a signal was not received on the RF band prior the end of the access block.

The circuit/module for remaining 2354 may include circuitry and/or programming (e.g., code for remaining 2360 stored on the storage medium 2304) adapted to perform several functions relating to, for example, remaining in a wake state to monitor for another signal. In some implementations, the circuit/module for adding 2352 determines whether the token bucket contains a token (e.g., by reading the memory device 2308, or receiving an indication from the circuit/module for determining whether a token bucket contains a token 2326, or some other component) after completion of the communicating (e.g., upon receipt of an indication of completion from the circuit/module for monitoring 2324, or some other component). If the token bucket contains a token, the circuit/module for remaining 2352 may keep the apparatus 2300 in a wake state (e.g., for the duration of the next access block).

The circuit/module for determining whether a parameter has been persistent 2356 may include circuitry and/or programming (e.g., code for determining whether a parameter has been persistent 2362 stored on the storage medium 2304) adapted to perform several functions relating to, for example, determining whether the at least one parameter has been persistent for a threshold period of time. In some aspects, the circuit/module for determining whether a parameter has been persistent 2356 maintains an age value for each parameter. The circuit/module for determining whether a parameter has been persistent 2356 may (e.g., periodically) compare the age value for a given parameter (e.g., by retrieving this value from the memory device 2308) with the corresponding threshold (e.g., retrieves from the memory device 2308). The circuit/module for determining whether a parameter has been persistent 2356 may the output an indication of this determination (e.g., to the memory device 2308, or some other component). In some implementation, this indication is sent to the circuit/module for communicating 2320 for purposes of determining whether to send to another apparatus a request for a current version of a parameter.

As mentioned above, programming stored by the storage medium 2304, when executed by the processor 2310, causes the processor 2310 to perform one or more of the various functions and/or process operations described herein. For example, the storage medium 2304 may include one or more of the code for communicating 2336, the code for receiving 2338, the code for monitoring 2340, the code for determining whether a token bucket contains a token 2342, the code for waiting 2344, the code for determining whether an RF band is available 2346, the code for determining whether to communicate 2348, the code for determining a token arrival time 2350, the code for adding 2358, the code for remaining 2360, or the coding for determining whether a parameter has been persistent 2362.

Seventh Example Process

Figure 24:
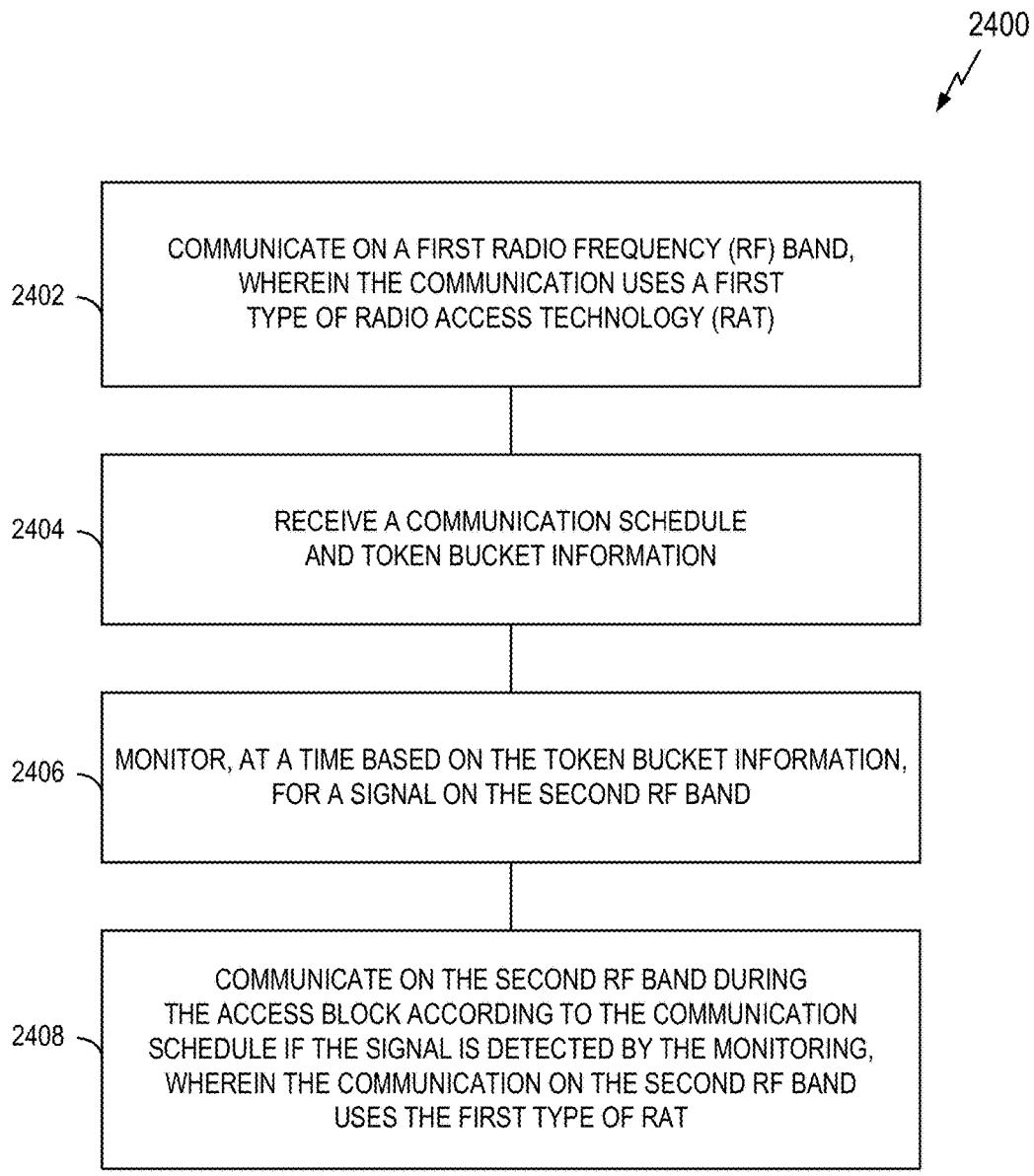
FIG. 24 is a flow diagram illustrating another example of a communication process in accordance with some aspects of the disclosure.

FIG. 24 illustrates a process 2400 for communication in accordance with some aspects of the disclosure. The process 2400 may take place within a processing circuit (e.g., the processor 2310 of FIG. 23), which may be located in an access terminal (e.g., a UE), a base station, or some other suitable apparatus. In some implementations, the process 2400 represents operations performed, at least in part, by the UE 104 of FIG. 1, the wireless communication node 216, 222, or 230 of FIG. 2, or the IoE device 236 or 242 of FIG. 2. Of course, in various aspects within the scope of the disclosure, the process 2400 may be implemented by any suitable apparatus capable of supporting scheduling-related operations.

At block 2402, an apparatus (e.g., a UE) communicates on a first radio frequency (RF) band. In some aspects, the communication may use a first type of radio access technology (RAT). In some aspects, the first type of RAT may be $5^{th}$ Generation Mobile Telecommunications technology. For example, a UE may use 5G technology to communicate with a base station on the first RF band.

In some implementations, the circuit/module for communicating 2320 of FIG. 23 performs the operations of block 2402. In some implementations, the code for communicating 2336 of FIG. 23 is executed to perform the operations of block 2402.

At block 2404, the apparatus receives a communication schedule and token bucket information. For example, a UE may receive this information from a serving base station via PDCCH. In some aspects, the communication schedule may be associated with a token bucket as discussed herein. For example, a UE may use a token bucket and designated token arrival times to control when the UE wakes to communicate during the access block. In some aspects, the received token bucket information may include at least one parameter for a token bucket that a base station uses to access a second RF band. The at least one parameter may include, for example, the token fill rate and/or the maximum number of tokens for the token bucket.

In some implementations, the circuit/module for receiving 2322 or the circuit/module for communicating 2320 of FIG. 23 performs the operations of block 2404. In some implementations, the code for receiving 2338 or the code for communicating 2336 of FIG. 23 is executed to perform the operations of block 2404.

At block 2406, the apparatus monitors, at a time based on the token bucket information (e.g., based on a token arrival time), for a signal on a second RF band. For example, a UE may wake up to monitor for a designated synchronization sequence on the second RF band, where the synchronization sequence indicates that communication will follow during the access block.

The signal may take different forms in different implementations. In some aspects, the signal may be or include a synchronization signal (e.g., sequence). In some aspects, the signal may be or include a clear-to-send (CTS). In some aspects, the signal may include an indication that the signal is associated with the first type of RAT. For example, the CTS may include a 5G address.

In the event the signal on the second RF band is not detected, the apparatus may continue monitoring (e.g., repeatedly monitor) the second RF band. In some aspects, the monitoring is performed for up to a defined number of sub-frames of the access block. In some aspects, the monitoring is performed for up to a defined amount of time.

In some scenarios, but not necessarily all scenarios, the second RF band may be conventionally used for communication by devices using one type of RAT (e.g., Wi-Fi technology) while the first RF band may be conventionally used by devices for communication using another type of RAT (e.g., 5G technology).

The first and second RF bands might or might not overlap. In some scenarios, the second RF band does not overlap with the first RF band. In some scenarios, the second RF band partially overlaps with the first RF band. In some scenarios, the second RF band is entirely within the first RF band. In some scenarios, the first RF band is entirely within the second RF band.

In some implementations, the circuit/module for monitoring 2324 of FIG. 23 performs the operations of block 2406. In some implementations, the code for monitoring 2340 of FIG. 23 is executed to perform the operations of block 2406.

At block 2408, the apparatus communicates on the second RF band during the access block according to the communication schedule if the signal is detected by the monitoring of block 2406. Here, the communication on the second RF band may use the first type of RAT. For example, a UE may use 5G technology to communicate on the second RF band during the access block. In some aspects, the communicating on the second RF band during the access block includes commencing the communicating on the second RF band in response to receipt of a downlink signal on the second RF band using the first type of RAT.

In some implementations, the circuit/module for communicating 2320 of FIG. 23 performs the operations of block 2402. In some implementations, the code for communicating 2336 of FIG. 23 is executed to perform the operations of block 2402.

Eighth Example Process

Figure 25:
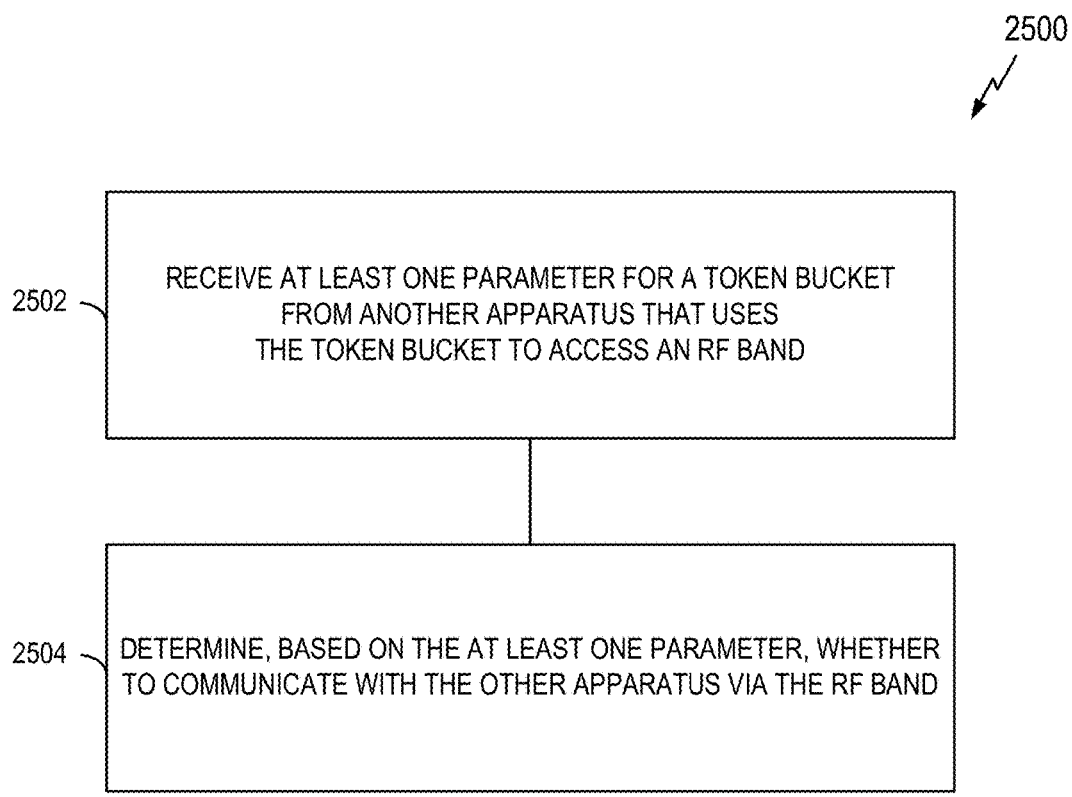
FIG. 25 is a flow diagram illustrating another example of a communication process in accordance with some aspects of the disclosure.

FIG. 25 illustrates a process 2500 for communication in accordance with some aspects of the disclosure. In some implementations, the process 2500 may be performed in addition to (e.g., in conjunction with) the process 2400 of FIG. 24. The process 2500 may take place within a processing circuit (e.g., the processor 2310 of FIG. 23), which may be located in an access terminal (e.g., a UE), a base station, or some other suitable apparatus. In some implementations, the process 2500 represents operations performed, at least in part, by the UE 104 of FIG. 1, the wireless communication node 216, 222, or 230 of FIG. 2, or the IoE device 236 or 242 of FIG. 2. Of course, in various aspects within the scope of the disclosure, the process 2500 may be implemented by any suitable apparatus capable of supporting scheduling-related operations.

At block 2502, an apparatus (e.g., a UE) receives at least one parameter for a token bucket from another apparatus that uses the token bucket to access a radio frequency (RF) band. In some aspects, the at least one parameter may be received via a control channel The at least one parameter may take various forms. In some aspects, the at least one parameter may include a token fill rate for the token bucket. In some aspects, the at least one parameter may include a maximum number of tokens for the token bucket. In some aspects, the at least one parameter may include the number of tokens currently in the token bucket.

In some implementations, the circuit/module for receiving 2322 of FIG. 23 performs the operations of block 2502. In some implementations, the code for receiving 2338 of FIG. 23 is executed to perform the operations of block 2502.

At block 2504, the apparatus determines, based on the at least one parameter, whether to communicate with the other apparatus via the RF band.

In some aspects, the determination of whether to communicate with the other apparatus via the RF band may include monitoring, at a time based on the token bucket information, for a signal on a RF band from the other apparatus. In some aspects, the process 2500 may further include communicating with the other apparatus on the RF band during an access block if the signal is received on the second RF band. In some aspects, the monitoring may be performed for up to a defined number of sub-frames of the access block. In some aspects, the process 2500 may further include adding a token to the token bucket if the signal is not received on the RF band prior the end of the access block.

In some implementations, the circuit/module for determining whether to communicate 2332 of FIG. 23 performs the operations of block 2504. In some implementations, the code for determining whether to communicate 2348 of FIG. 23 is executed to perform the operations of block 2504.

In some aspects, the process 2500 may further include determining whether the token bucket contains a token after completion of communicating with the other apparatus on the RF band during the access block. In this case, the process 2500 may further include remaining in a wake state to monitor for another signal if the token bucket contains a token after completion of the communicating or the process 2500 may further include waiting for arrival of another token if the token bucket does not contain a token after completion of the communicating.

In some aspects, the process 2500 may further include receiving an indication from the other apparatus that the at least one parameter has changed. In this case, the process 2500 may further include sending a request for a current version of the at least one parameter to the other apparatus in response to the receipt of the indication.

In some aspects, the process 2500 may further include determining whether the at least one parameter has been persistent for a threshold period of time. In this case, the process 2500 may further include sending a request for a current version of the at least one parameter to the other apparatus as a result of the determination of whether the at least one parameter has been persistent for the threshold period of time.

Ninth Example Process

Figure 26:
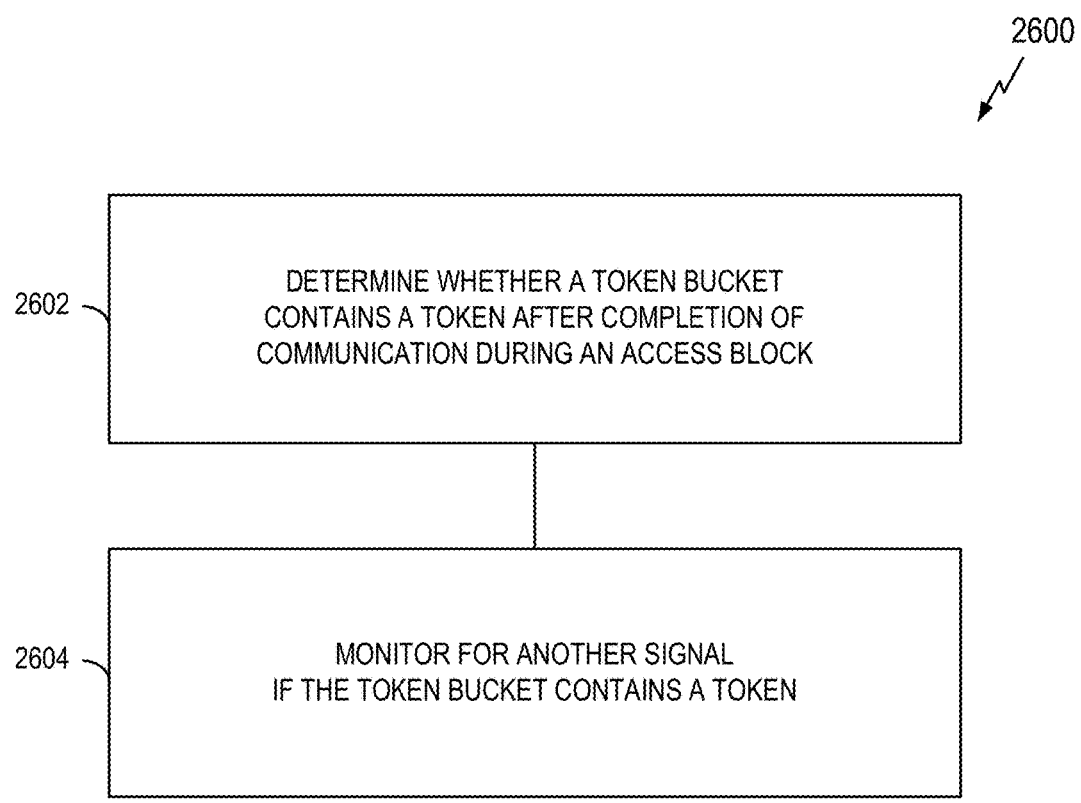
FIG. 26 is a flow diagram illustrating an example of a token bucket-based process in accordance with some aspects of the disclosure.

FIG. 26 illustrates a process 2600 for communication in accordance with some aspects of the disclosure. In some implementations, the process 2600 may be performed in addition to (e.g., in conjunction with) the process 2400 of FIG. 24 and/or the process 2500 of FIG. 25. The process 2600 may take place within a processing circuit (e.g., the processor 2310 of FIG. 23), which may be located in an access terminal (e.g., a UE), a base station, or some other suitable apparatus. In some implementations, the process 2600 represents operations performed, at least in part, by the UE 104 of FIG. 1, the wireless communication node 216, 222, or 230 of FIG. 2, or the IoE device 236 or 242 of FIG. 2. Of course, in various aspects within the scope of the disclosure, the process 2600 may be implemented by any suitable apparatus capable of supporting scheduling-related operations.

At block 2602, an apparatus (e.g., a UE) determines whether a token bucket contains a token after completion of communication during the access block. For example, a UE may invoke this determination if, upon completion of the access block, the UE has more data to send or expects to receive more data (e.g., from a base station).

In some implementations, the circuit/module for determining whether a token bucket contains a token 2326 of FIG. 23 performs the operations of block 2602. In some implementations, the code for determining whether a token bucket contains a token 2342 of FIG. 23 is executed to perform the operations of block 2602.

At block 2604, the apparatus monitors for another signal if the token bucket contains a token. For example, a UE may immediately monitor for a CTS from a serving base station to determine whether the base station is immediately contending to access a medium as discussed above in conjunction with the timing diagram 404 of FIG. 4.

In some implementations, the circuit/module for monitoring 2324 of FIG. 23 performs the operations of block 2604. In some implementations, the code for monitoring 2340 of FIG. 23 is executed to perform the operations of block 2604.

Tenth Example Process

Figure 27:
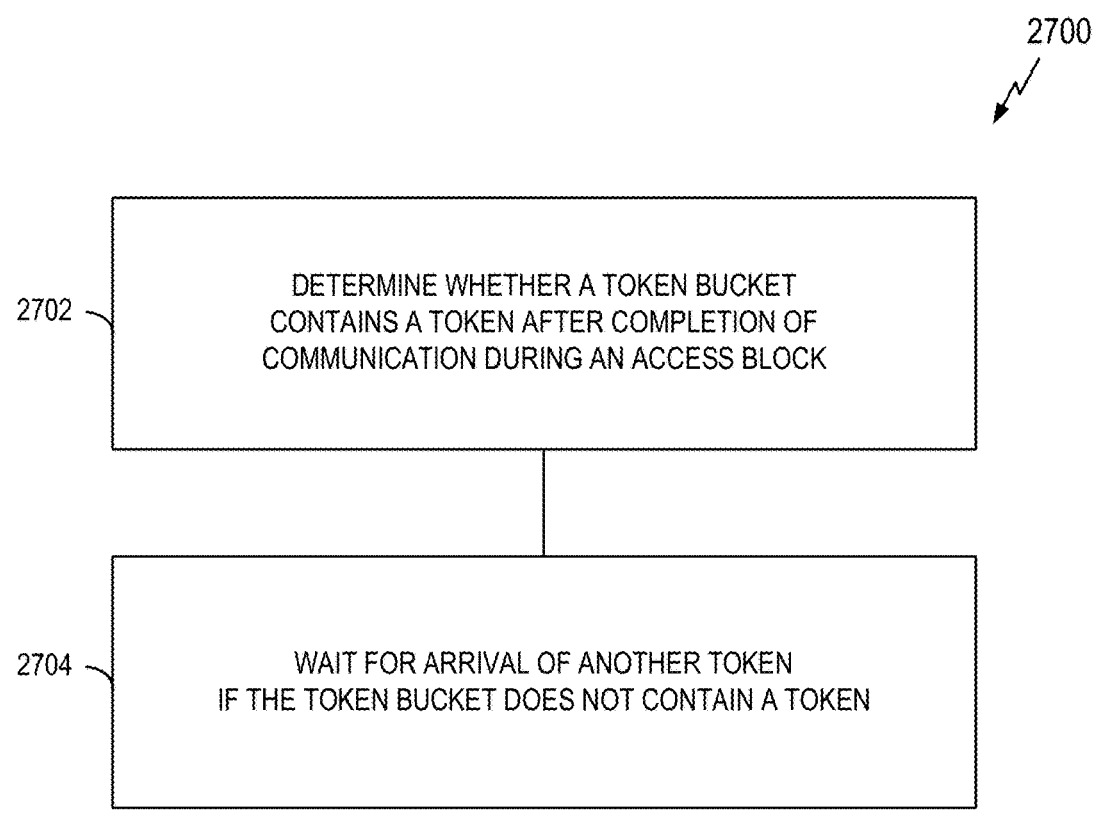
FIG. 27 is a flow diagram illustrating an example of a token bucket-based process in accordance with some aspects of the disclosure.

FIG. 27 illustrates a process 2700 for communication in accordance with some aspects of the disclosure. In some implementations, the process 2700 may be performed in addition to (e.g., in conjunction with) the process 2400 of FIG. 24 and/or the process 2500 of FIG. 25. The process 2700 may take place within a processing circuit (e.g., the processor 2310 of FIG. 23), which may be located in an access terminal (e.g., a UE), a base station, or some other suitable apparatus. In some implementations, the process 2700 represents operations performed, at least in part, by the UE 104 of FIG. 1, the wireless communication node 216, 222, or 230 of FIG. 2, or the IoE device 236 or 242 of FIG. 2. Of course, in various aspects within the scope of the disclosure, the process 2700 may be implemented by any suitable apparatus capable of supporting scheduling-related operations.

At block 2702, an apparatus (e.g., a UE) determines whether a token bucket contains a token after completion of communication during the access block. For example, a UE may invoke this determination if, upon completion of the access block, the UE has more data to send or expects to receive more data (e.g., from a base station).

In some implementations, the circuit/module for determining whether a token bucket contains a token 2326 of FIG. 23 performs the operations of block 2702. In some implementations, the code for determining whether a token bucket contains a token 2342 of FIG. 23 is executed to perform the operations of block 2702.

At block 2704, the apparatus waits for arrival of another token if the token bucket does not contain a token. For example, a UE may wait for a token arrival time to access a medium as discussed above in conjunction with the timing diagram 402 of FIG. 4.

In some implementations, the circuit/module for waiting 2328 of FIG. 23 performs the operations of block 2704. In some implementations, the code for waiting 2344 of FIG. 23 is executed to perform the operations of block 2704.

Eleventh Example Process

Figure 28:
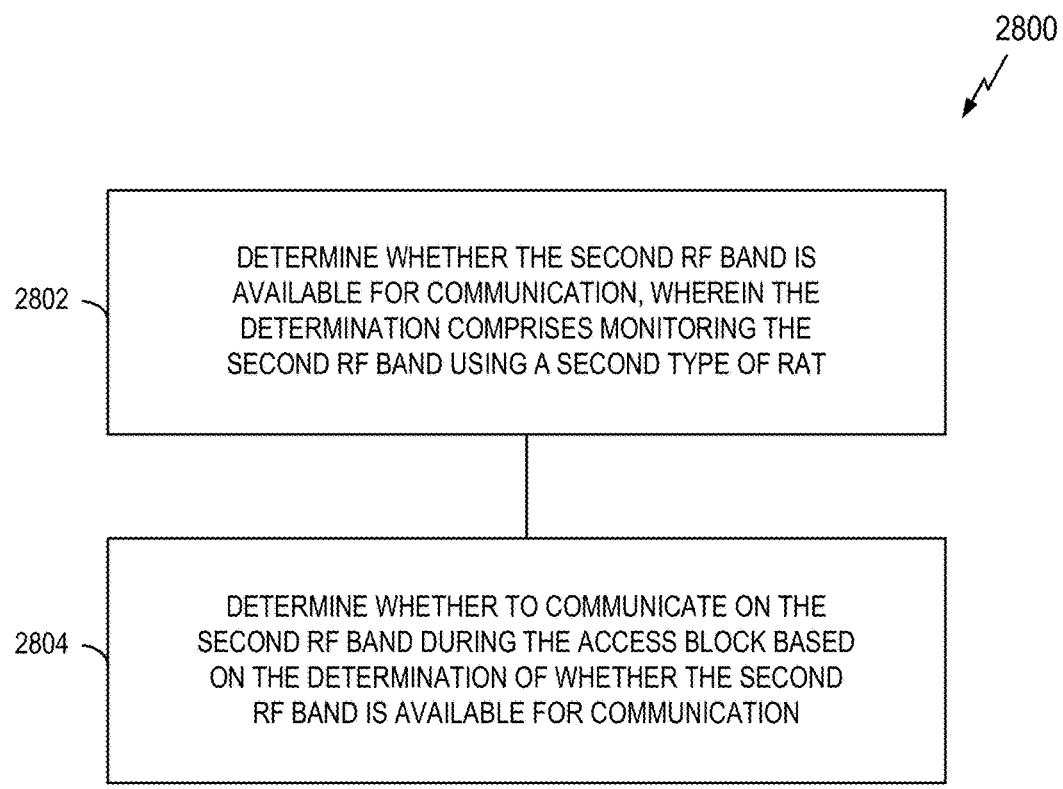
FIG. 28 is a flow diagram illustrating another example of a communication process in accordance with some aspects of the disclosure.

FIG. 28 illustrates a process 2800 for communication in accordance with some aspects of the disclosure. In some implementations, the process 2800 may be performed in addition to (e.g., in conjunction with) the process 2400 of FIG. 24 and/or the process 2500 of FIG. 25. The process 2800 may take place within a processing circuit (e.g., the processor 2310 of FIG. 23), which may be located in an access terminal (e.g., a UE), a base station, or some other suitable apparatus. In some implementations, the process 2800 represents operations performed, at least in part, by the UE 104 of FIG. 1, the wireless communication node 216, 222, or 230 of FIG. 2, or the IoE device 236 or 242 of FIG. 2. Of course, in various aspects within the scope of the disclosure, the process 2800 may be implemented by any suitable apparatus capable of supporting scheduling-related operations.

At block 2802, an apparatus (e.g., a UE) determines whether the second RF band is available for communication. In some aspects, this determination may include monitoring the second RF band using a second type of RAT. For example, a UE may sense energy on the second RF band and/or attempt to decode any Wi-Fi signals on the second RF band.

In some implementations, the circuit/module for determining whether an RF band is available 2330 or the circuit/module for monitoring 2324 of FIG. 23 performs the operations of block 2802. In some implementations, the code for determining whether an RF band is available 2346 or the code for monitoring 2340 of FIG. 23 is executed to perform the operations of block 2802.

At block 2804, the apparatus determines whether to communicate on the second RF band during the access block based on the determination of block 2802. For example, a UE may elect to commence 5G communication during the access block if the interference on the second RF band is below a threshold interference level.

In some implementations, the circuit/module for determining whether to communicate 2332 of FIG. 23 performs the operations of block 2804. In some implementations, the code for determining whether to communicate 2348 of FIG. 23 is executed to perform the operations of block 2804.

Twelfth Example Process

Figure 29:
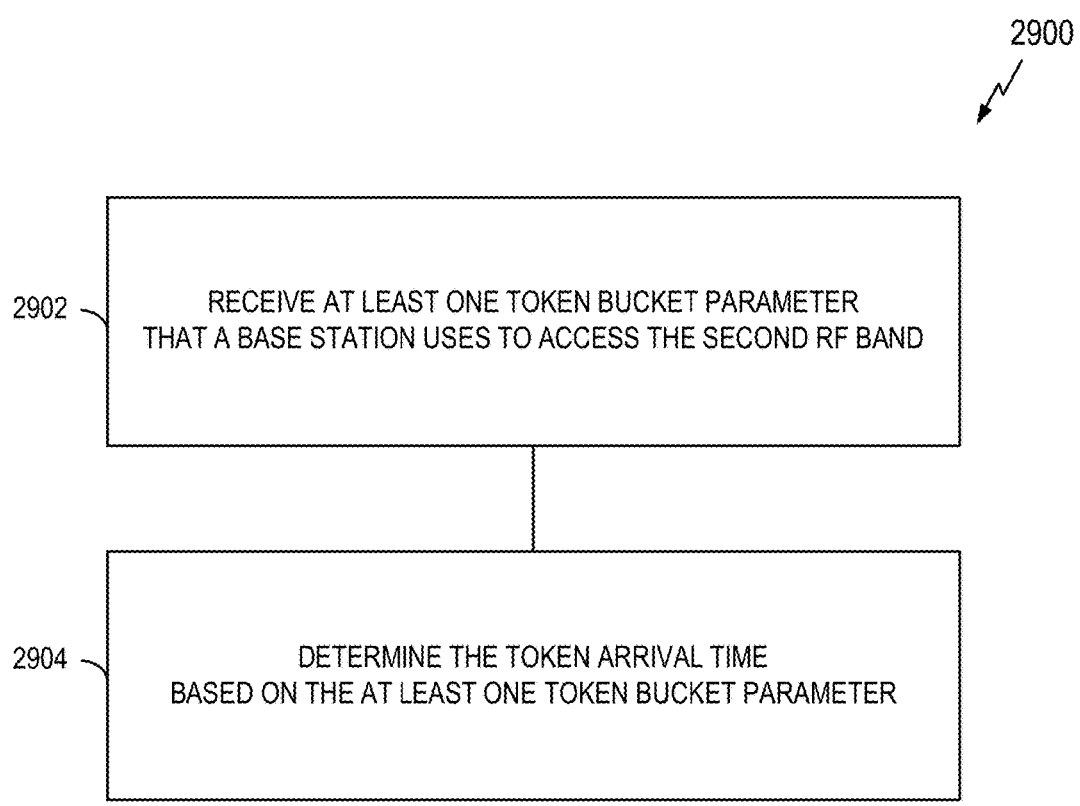
FIG. 29 is a flow diagram illustrating an example of a token bucket-related process in accordance with some aspects of the disclosure.

FIG. 29 illustrates a process 2900 for communication in accordance with some aspects of the disclosure. In some implementations, the process 2900 may be performed in addition to (e.g., in conjunction with) the process 2400 of FIG. 24 and/or the process 2500 of FIG. 25. The process 2900 may take place within a processing circuit (e.g., the processor 2310 of FIG. 23), which may be located in an access terminal (e.g., a UE), a base station, or some other suitable apparatus. In some implementations, the process 2900 represents operations performed, at least in part, by the UE 104 of FIG. 1, the wireless communication node 216, 222, or 230 of FIG. 2, or the IoE device 236 or 242 of FIG. 2. Of course, in various aspects within the scope of the disclosure, the process 2900 may be implemented by any suitable apparatus capable of supporting scheduling-related operations.

At block 2902, an apparatus (e.g., a UE) receives at least one token bucket parameter that a base station uses to access the second RF band. For example, a UE may receive from a base station indications of the token fill rate and/or the maximum number of tokens the base station uses for its token bucket. In some implementations this information is received via a control channel (e.g., via a PDCCH).

In some implementations, the circuit/module for receiving 2322 or the circuit/module for communicating 2320 of FIG. 23 performs the operations of block 2902. In some implementations, the code for receiving 2338 or the code for communicating 2336 of FIG. 23 is executed to perform the operations of block 2902.

At block 2904, the apparatus determines the token arrival time based on the at least one token bucket parameter. For example, a UE may determine the token arrival time based on the timing of a scheduled access block and the token fill rate. Accordingly, token bucket operations of the UE can be synchronized with token bucket operations of a serving base station.

In some implementations, the circuit/module for determining a token arrival time 2334 of FIG. 23 performs the operations of block 2904. In some implementations, the code for determining a token arrival time 2350 of FIG. 23 is executed to perform the operations of block 2904.

Thirteenth Example Process

Figure 30:
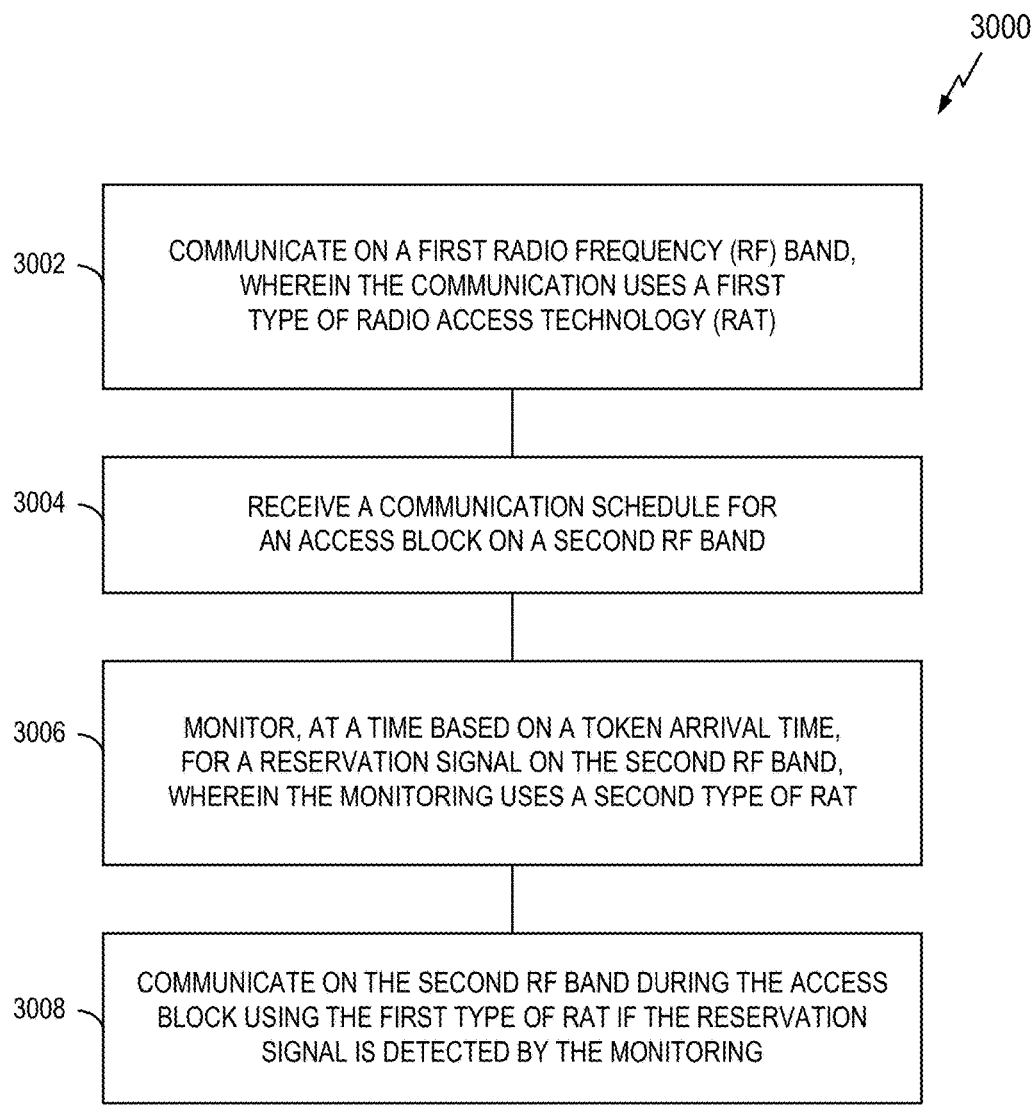
FIG. 30 is a flow diagram illustrating an example of a scheduling and token bucket process in accordance with some aspects of the disclosure.

FIG. 30 illustrates a process 3000 for communication in accordance with some aspects of the disclosure. The process 3000 may take place within a processing circuit (e.g., the processor 2310 of FIG. 23), which may be located in an access terminal (e.g., a user equipment), a base station, or some other suitable apparatus. In some implementations, the process 3000 represents operations performed, at least in part, by the UE 104 of FIG. 1, the wireless communication node 216, 222, or 230 of FIG. 2, or the IoE device 236 or 242 of FIG. 2. Of course, in various aspects within the scope of the disclosure, the process 3000 may be implemented by any suitable apparatus capable of supporting scheduling-related operations.

At block 3002, an apparatus (e.g., a user equipment) communicates on a first radio frequency (RF) band, wherein the communication uses a first type of radio access technology (RAT). In some implementations, the circuit/module for communicating 2320 of FIG. 23 performs the operations of block 3002. In some implementations, the code for communicating 2336 of FIG. 23 is executed to perform the operations of block 3002.

At block 3004, the apparatus receives a communication schedule for an access block on a second RF band. In some aspects, the communication schedule may be associated with a token bucket as discussed herein. In some implementations, the circuit/module for receiving 2322 of FIG. 23 performs the operations of block 3004. In some implementations, the code for receiving 2338 of FIG. 23 is executed to perform the operations of block 3004.

At block 3006, the apparatus monitors, at a time based on a token arrival time for the token bucket, for a reservation signal on the second RF band, wherein the monitoring uses a second type of RAT. In some implementations, the circuit/module for monitoring 2324 of FIG. 23 performs the operations of block 3006. In some implementations, the code for monitoring 2340 of FIG. 23 is executed to perform the operations of block 3006.

At block 3008, the apparatus communicates on the second RF band during the access block using the first type of RAT if the reservation signal is detected by the monitoring. In some implementations, the circuit/module for communicating 2320 of FIG. 23 performs the operations of block 3008. In some implementations, the code for communicating 2336 of FIG. 23 is executed to perform the operations of block 3008.

Example Network

Figure 31:
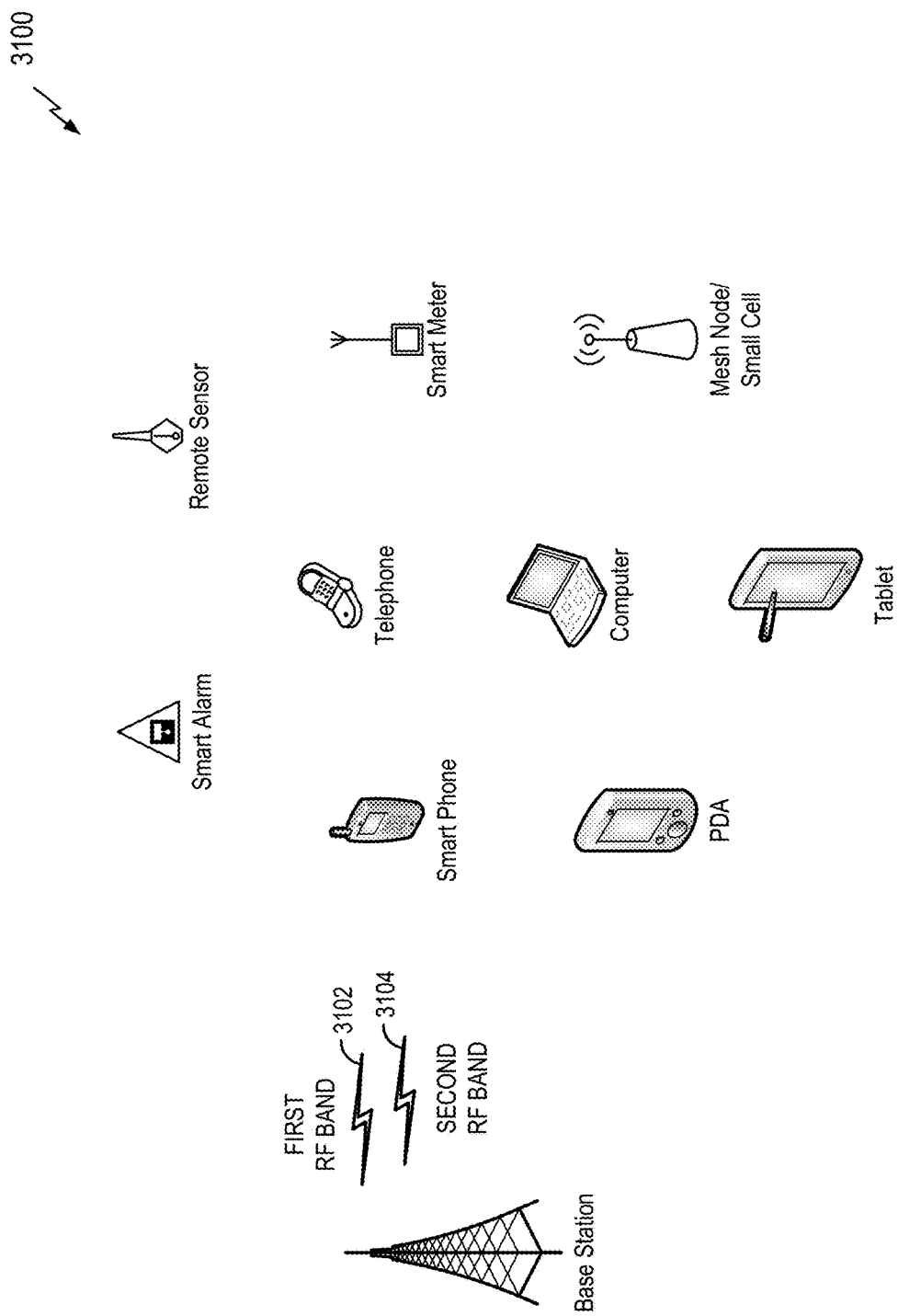
FIG. 31 is a schematic diagram of a wireless communication network within which one or more aspects of the disclosure may be implemented.

FIG. 31 is a schematic illustration of a wireless communication network 3100 including multiple communication entities as it may appear in some aspects of the disclosure. A wireless communication device of the network 3100 may communicate using a first RF band 3102 and a second RF band 3104 in accordance with the teachings herein. As described herein, a wireless communication device (e.g., as illustrated in FIGS. 1-3) may reside in, or be a part of, a base station, a smart phone, a small cell, or other entity. Subordinate entities or mesh nodes may reside in, or be a part of, a smart alarm, a remote sensor, a smart phone, a telephone, a smart meter, a PDA, a personal computer, a mesh node, and/or a tablet computer. Of course, the illustrated devices or components are merely examples, and any suitable node or device may appear within a wireless communication network within the scope of the present disclosure.

Additional Aspects

Of course, these examples are merely provided to illustrate certain concepts of the disclosure. Those of ordinary skill in the art will comprehend that these are merely exemplary in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to UMTS systems such as W-CDMA, TD-SCDMA, and TD-CDMA. Various aspects may also be applied to systems using Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard used will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover any of: a; b; c; a and b; a and c; b and c; a, b and c; 2a; 2b; 2c; 2A and b; and so on. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication for an apparatus, comprising:
   maintaining a token bucket at the apparatus;
   determining at least one parameter of the token bucket, wherein the at least one parameter indicates a token quantity in the token bucket;
   sending the at least one parameter to another apparatus;
   determining, based on the at least one parameter, a time to communicate with the other apparatus via a radio frequency (RF) band; and
   communicating with the other apparatus at the determined time.

2. The method of claim 1, wherein the at least one parameter comprises a token fill rate for the token bucket.

3. The method of claim 1, wherein the at least one parameter comprises a maximum number of tokens for the token bucket.

4. The method of claim 1, wherein the at least one parameter comprises a token arrival time for the token bucket.

5. The method of claim 4, wherein the determination of the time to communicate with the other apparatus via the RF band comprises:
   determining, at a time based on the token arrival time, whether the RF band is available for communication of an access block.

6. The method of claim 5, further comprising:
   adding a token to the token bucket if the RF band is not available for the communication of the access block.

7. The method of claim 5, wherein the determination of whether the RF band is available for the communication of the access block is performed for up to a defined number of sub-frames of the access block.

8. The method of claim 5, further comprising:
   sending a reservation signal if the RF band is available, wherein the reservation signal is to reserve the RF band for communication of the access block; and
   communicating with the other apparatus on the RF band after the reservation signal is sent, wherein the communicating is during the access block.

9. The method of claim 8, further comprising:
   determining whether the token bucket contains a token after completion of the communicating with the other apparatus on the RF band during the access block.

10. The method of claim 9, further comprising:
    if the token bucket contains a token, sending another reservation signal without waiting for arrival of another token.

11. The method of claim 9, further comprising:
    if the token bucket does not contain a token, waiting for arrival of another token before sending another reservation signal.

12. The method of claim 1, wherein:
    the determination of the at least one parameter is based on at least one of: a rate of traffic communicated by the apparatus using a first type of radio access technology (RAT), a rate of traffic communicated by the apparatus using a second type of RAT, or any combination thereof.

13. The method of claim 1, wherein the sending of the at least one parameter comprises:
broadcasting the at least one parameter via a control channel.

14. An apparatus for wireless communication comprising:
a memory; and
a processor coupled to the memory,
the processor and the memory configured to:
maintain a token bucket at the apparatus;
determine at least one parameter of the token bucket, wherein the at least one parameter indicates a token quantity in the token bucket;
send the at least one parameter to another apparatus;
determine, based on the at least one parameter, a time to communicate with the other apparatus via a radio frequency (RF) band; and
communicate with the other apparatus at the determined time.

15. A method of wireless communication for an apparatus, comprising:
receiving, from another apparatus, at least one parameter of a token bucket at the other apparatus, wherein the at least one parameter indicates a token quantity in the token bucket;
determining, based on the at least one parameter, a time to wake up; and
communicating with the other apparatus via a radio frequency (RF) band after waking up.

16. The method of claim 15, wherein the at least one parameter comprises a token fill rate for the token bucket.

17. The method of claim 15, wherein the at least one parameter comprises a maximum number of tokens for the token bucket.

18. The method of claim 15, further comprising:
determining a token arrival time based on the at least one token bucket parameter.

19. The method of claim 15, wherein the communication with the other apparatus comprises:
monitoring the RF band, at another time based on the token bucket information, for a signal from the other apparatus.

20. The method of claim 19, further comprising:
communicating with the other apparatus on the RF band during an access block if the signal is received on the second RF band.

21. The method of claim 19, wherein the monitoring is performed for up to a defined number of sub-frames of the access block.

22. The method of claim 19, further comprising:
adding a token to the token bucket if the signal is not received on the RF band prior the end of the access block.

23. The method of claim 19, further comprising:
determining whether the token bucket contains a token after completion of the communicating with the other apparatus on the RF band during the access block.

24. The method of claim 23, further comprising:
remaining in a wake state to monitor for another signal if the token bucket contains a token after completion of the communicating.

25. The method of claim 23, further comprising:
waiting for arrival of another token if the token bucket does not contain a token after completion of the communicating.

26. The method of claim 15, further comprising:
receiving an indication from the other apparatus that the at least one parameter has changed; and
sending a request for a current version of the at least one parameter to the other apparatus in response to the receipt of the indication.

27. The method of claim 15, further comprising:
determining whether the at least one parameter has been persistent for a threshold period of time; and
sending a request for a current version of the at least one parameter to the other apparatus as a result of the determination of whether the at least one parameter has been persistent for the threshold period of time.

28. An apparatus for wireless communication comprising:
a memory; and
a processor coupled to the memory,
the processor and the memory configured to:
receive, from another apparatus, at least one parameter of a token bucket at the other apparatus, wherein the at least one parameter indicates a token quantity in the token bucket;
determine, based on the at least one parameter, a time to wake up; and
communicate with the other apparatus via a radio frequency (RF) band after waking up.

* * * * *